(12) United States Patent
Tamaki et al.

(10) Patent No.: US 7,209,846 B2
(45) Date of Patent: Apr. 24, 2007

(54) QUALITY CONTROL SYSTEM FOR MANUFACTURING INDUSTRIAL PRODUCTS

(75) Inventors: Kenji Tamaki, Kawasaki (JP); Youichi Nonaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/171,394

(22) Filed: Jul. 1, 2005

(65) Prior Publication Data

US 2006/0047454 A1   Mar. 2, 2006

(30) Foreign Application Priority Data

Aug. 27, 2004   (JP) .............................. 2004-247708

(51) Int. Cl.
 *G06F 19/00* (2006.01)
(52) U.S. Cl. ........................................ 702/84; 700/109
(58) Field of Classification Search ................ 702/84
 See application file for complete search history.

(56) References Cited

U.S. PATENT DOCUMENTS

| 5,479,361 A * | 12/1995 | Kurtzberg et al. ............. 702/84 |
| 6,148,268 A * | 11/2000 | Wu et al. ....................... 702/84 |
| 6,446,017 B1 * | 9/2002 | Skidmore ...................... 702/81 |
| 6,542,830 B1 * | 4/2003 | Nakazato et al. ............. 702/35 |
| 6,606,574 B2 * | 8/2003 | Takanabe ...................... 702/84 |

FOREIGN PATENT DOCUMENTS

| JP | 2000-252180 | 9/2000 |
| JP | 2002-110493 | 4/2002 |
| JP | 2002-251212 | 9/2002 |
| JP | 2003-114713 | 4/2003 |

OTHER PUBLICATIONS

"Chemometrics, Data Analysis for the Laboratory and Chemical Plant", Wiley (2003), pp. 412-415.
"Graphical Models" Oxford University Press (1996), Steffen L. Lauritzen, p. 1 and pp. 123-157.

* cited by examiner

*Primary Examiner*—John Barlow
*Assistant Examiner*—Jonathan Moffat
(74) *Attorney, Agent, or Firm*—Antonelli, Terry, Stout & Kraus, LLP.

(57) ABSTRACT

In a quality control system for manufacturing industrial products, the product quality history and the manufacturing process history are collected and collated to calculate the correlation magnitude between the two histories. The candidates for the cause of quality variation hidden in the manufacturing processes are listed, and the correlation magnitude between all combinations of the variates of the manufacturing process history are calculated. Further, by utilizing the manufacturing sequence history used for an input plan, a causation connecting structure model between the manufacturing processes of the manufacturing line is automatically generated and automatically analyzed thereby to automatically extract the fundamental cause of quality variation from the candidates for the cause of quality variation. By doing so, the cause of quality variation of industrial products manufactured through a complicated process can be traced in a complicated connecting structure in the manufacturing history data.

10 Claims, 41 Drawing Sheets

MANUFACTURING BOM (BILL OF MATERIAL)

FIG. 5A

| EDGE No. | GRAPH TYPE | STARTING POINT | FINAL POINT | COUPLING STRENGTH | SELECTED STATE |
|---|---|---|---|---|---|
| 1 (421) | DIRECTED | PROCESS A (431) | PRODUCT QUALITY (411) | $R_A$ | |
| 2 (422) | DIRECTED | PROCESS B (432) | PRODUCT QUALITY (411) | $R_B$ | |
| 3 (423) | DIRECTED | PROCESS C (433) | PRODUCT QUALITY (411) | $R_C$ | |
| 4 (424) | DIRECTED | PROCESS D (434) | PRODUCT QUALITY (411) | $R_D$ | |

FIG. 5B

| EDGE No. | GRAPH TYPE | STARTING POINT | FINAL POINT | COUPLING STRENGTH | SELECTED STATE |
|---|---|---|---|---|---|
| 1 (421) | DIRECTED | PROCESS A (431) | PRODUCT QUALITY (411) | $R_A$ | × (NO RELATION) |
| 2 (422) | DIRECTED | PROCESS B (432) | PRODUCT QUALITY (411) | $R_B$ | ○ (CORRELATION) |
| 3 (423) | DIRECTED | PROCESS C (433) | PRODUCT QUALITY (411) | $R_C$ | × (NO RELATION) |
| 4 (424) | DIRECTED | PROCESS D (434) | PRODUCT QUALITY (411) | $R_D$ | ○ (CORRELATION) |

FIG. 6A

| EDGE No. | GRAPH TYPE | STARTING POINT | FINAL POINT | COUPLING STRENGTH | SELECTED STATE |
|---|---|---|---|---|---|
| 1 (441) | UNDIRECTED | PROCESS A (PROVISIONAL) (431) | PROCESS B (PROVISIONAL) (432) | $r_{AB \cdot CD}$ | |
| 2 (442) | UNDIRECTED | PROCESS A (PROVISIONAL) (431) | PROCESS C (PROVISIONAL) (433) | $r_{AC \cdot BD}$ | |
| 3 (443) | UNDIRECTED | PROCESS A (PROVISIONAL) (431) | PROCESS D (PROVISIONAL) (434) | $r_{AD \cdot BC}$ | |
| 4 (451) | UNDIRECTED | PROCESS B (PROVISIONAL) (432) | PROCESS C (PROVISIONAL) (433) | $r_{BC \cdot DA}$ | |
| 5 (452) | UNDIRECTED | PROCESS B (PROVISIONAL) (432) | PROCESS D (PROVISIONAL) (434) | $r_{BD \cdot AC}$ | |
| 6 (461) | UNDIRECTED | PROCESS C (PROVISIONAL) (433) | PROCESS D (PROVISIONAL) (434) | $r_{CD \cdot AB}$ | |

| EDGE No. | GRAPH TYPE | STARTING POINT | FINAL POINT | COUPLING STRENGTH | SELECTED STATE |
|---|---|---|---|---|---|
| 1 (441) | UNDIRECTED | PROCESS A (PROVISIONAL) (431) | PROCESS B (PROVISIONAL) (432) | $r_{AB \cdot CD}$ | × (NO RELATION) |
| 2 (442) | UNDIRECTED | PROCESS A (PROVISIONAL) (431) | PROCESS C (PROVISIONAL) (433) | $r_{AC \cdot BD}$ | ○ (CORRELATION) |
| 3 (443) | UNDIRECTED | PROCESS A (PROVISIONAL) (431) | PROCESS D (PROVISIONAL) (434) | $r_{AD \cdot BC}$ | × (NO RELATION) |
| 4 (451) | UNDIRECTED | PROCESS B (PROVISIONAL) (432) | PROCESS C (PROVISIONAL) (433) | $r_{BC \cdot DA}$ | × (NO RELATION) |
| 5 (452) | UNDIRECTED | PROCESS B (PROVISIONAL) (432) | PROCESS D (PROVISIONAL) (434) | $r_{BD \cdot AC}$ | ○ (CORRELATION) |
| 6 (461) | UNDIRECTED | PROCESS C (PROVISIONAL) (433) | PROCESS D (PROVISIONAL) (434) | $r_{CD \cdot AB}$ | × (NO RELATION) |

| EDGE No. | GRAPH TYPE | STARTING POINT | FINAL POINT | COUPLING STRENGTH | SELECTED STATE |
|---|---|---|---|---|---|
| 1 (441) | DIRECTED | PROCESS A (431) | PROCESS B (432) | $r_{AB \cdot CD}$ | × (NO RELATION) |
| 2 (442) | DIRECTED | PROCESS A (431) | PROCESS C (433) | $r_{AC \cdot BD}$ | ◎ (CAUSATION) |
| 3 (443) | DIRECTED | PROCESS A (431) | PROCESS D (434) | $r_{AD \cdot BC}$ | × (NO RELATION) |
| 4 (451) | UNDIRECTED | PROCESS B (PROVISIONAL) (432) | PROCESS C (PROVISIONAL) (433) | $r_{BC \cdot DA}$ | × (NO RELATION) |
| 5 (452) | UNDIRECTED | PROCESS B (PROVISIONAL) (432) | PROCESS D (PROVISIONAL) (434) | $r_{BD \cdot AC}$ | ○ (CORRELATION) |
| 6 (461) | UNDIRECTED | PROCESS C (PROVISIONAL) (433) | PROCESS D (PROVISIONAL) (434) | $r_{CD \cdot AB}$ | × (NO RELATION) |

| EDGE No. | GRAPH TYPE | STARTING POINT | FINAL POINT | COUPLING STRENGTH | SELECTED STATE |
|---|---|---|---|---|---|
| 1 (441) | DIRECTED | PROCESS A (431) | PROCESS B (432) | $r_{AB \cdot CD}$ | × (NO RELATION) |
| 2 (442) | DIRECTED | PROCESS A (431) | PROCESS C (433) | $r_{AC \cdot BD}$ | ◎ (CAUSATION) |
| 3 (443) | DIRECTED | PROCESS A (431) | PROCESS D (434) | $r_{AD \cdot BC}$ | × (NO RELATION) |
| 4 (451) | DIRECTED | PROCESS B (432) | PROCESS C (433) | $r_{BC \cdot DA}$ | × (NO RELATION) |
| 5 (452) | DIRECTED | PROCESS B (432) | PROCESS D (434) | $r_{BD \cdot AC}$ | ◎ (CAUSATION) |
| 6 (461) | UNDIRECTED | PROCESS C (PROVISIONAL) (433) | PROCESS D (PROVISIONAL) (434) | $r_{CD \cdot AB}$ | × (NO RELATION) |

| EDGE No. | GRAPH TYPE | STARTING POINT | FINAL POINT | COUPLING STRENGTH | SELECTED STATE |
|---|---|---|---|---|---|
| 1 (441) | DIRECTED | PROCESS A (431) | PROCESS B (432) | $r_{AB \cdot CD}$ | × (NO RELATION) |
| 2 (442) | DIRECTED | PROCESS A (431) | PROCESS C (433) | $r_{AC \cdot BD}$ | ◎ (CAUSATION) |
| 3 (443) | DIRECTED | PROCESS A (431) | PROCESS D (434) | $r_{AD \cdot BC}$ | × (NO RELATION) |
| 4 (451) | DIRECTED | PROCESS B (432) | PROCESS C (433) | $r_{BC \cdot DA}$ | × (NO RELATION) |
| 5 (452) | DIRECTED | PROCESS B (432) | PROCESS D (434) | $r_{BD \cdot AC}$ | ◎ (CAUSATION) |
| 6 (461) | DIRECTED | PROCESS C (433) | PROCESS D (434) | $r_{CD \cdot AB}$ | × (NO RELATION) |

FIG. 9

| EDGE No. | GRAPH TYPE | STARTING POINT | FINAL POINT | COUPLING STRENGTH | SELECTED STATE |
|---|---|---|---|---|---|
| 1 (421) | DIRECTED | PROCESS A (431) | PRODUCT QUALITY (411) | $R_A$ | × (NO RELATION) |
| 2 (422) | DIRECTED | PROCESS B (431) | PRODUCT QUALITY (411) | $R_B$ | ◎ (CAUSATION) |
| 3 (423) | DIRECTED | PROCESS C (431) | PRODUCT QUALITY (411) | $R_C$ | × (NO RELATION) |
| 4 (424) | DIRECTED | PROCESS D (431) | PRODUCT QUALITY (411) | $R_D$ | ○ (CORRELATION) |

GENERATE CORRELATION NETWORK MODEL FOR QUALITY VARIATION CORRELATION ANALYSIS

CALCULATE QUALITY CORRELATION MAGNITUDE BETWEEN PRODUCT QUALITY HISTORY DATA AND MANUFACTURING HISTORY DATA

GENERATE CORRELATION NETWORK MODEL WITH QUALITY VARIATION CORRELATION MAGNITUDE AS GRAPH COUPLING STRENGTH

GENERATE CAUSAL NETWORK MODEL FOR QUALITY VARIATION CAUSATION ANALYSIS

CALCULATE CORRELATION MAGNITUDE BETWEEN MANUFACTURING HISTORY DATA FOR ALL COMBINATIONS OF TWO PROCESSES

GENERATE CAUSAL NETWORK MODEL WITH INTER-PROCESS CORRELATION MAGNITUDE AS GRAPH COUPLING STRENGTH

EXTRACT INTER-PROCESS CAUSATION

SELECT SIGNIFICANT GRAPH OF INTERNAL NETWORK
MODEL BASED ON GRAPH COUPLING STRENGTH $$(r_{BD \cdot AC} \cong r_{AC \cdot BD} \gg r_{AB \cdot CD} \cong r_{BC \cdot DA} \ r_{CD \cdot AB} \cong r_{AD \cdot BC})$$

ATTACH CAUSATION ARROW TO SELECTION GRAPH OF INTERNAL
NETWORK MODEL BASED ON TIME PRIORITY INFORMATION

FIG. 17
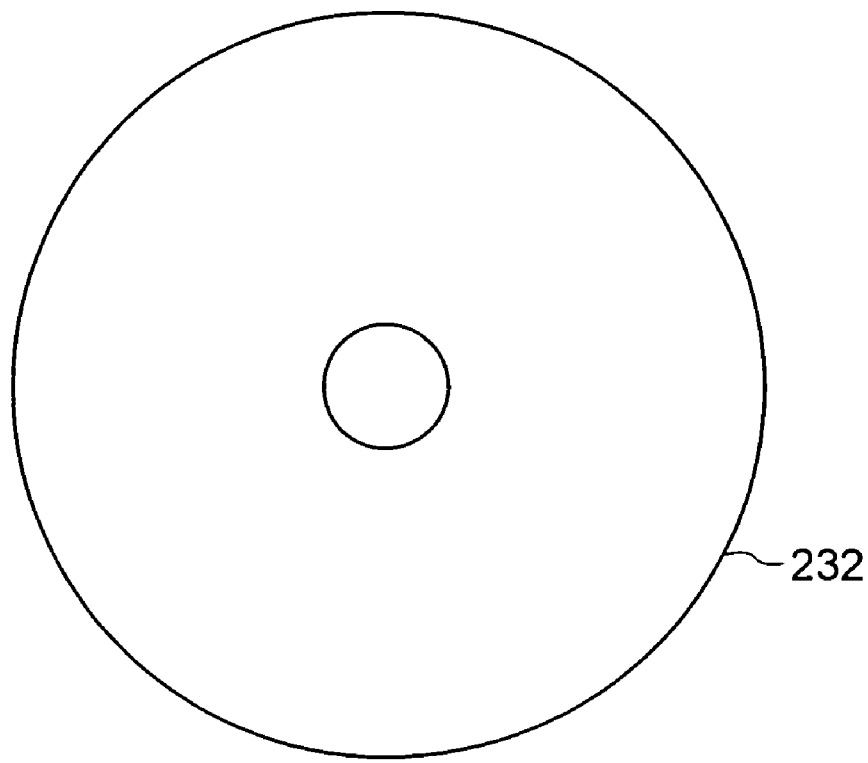
TOP PLAN VIEW OF PRODUCT
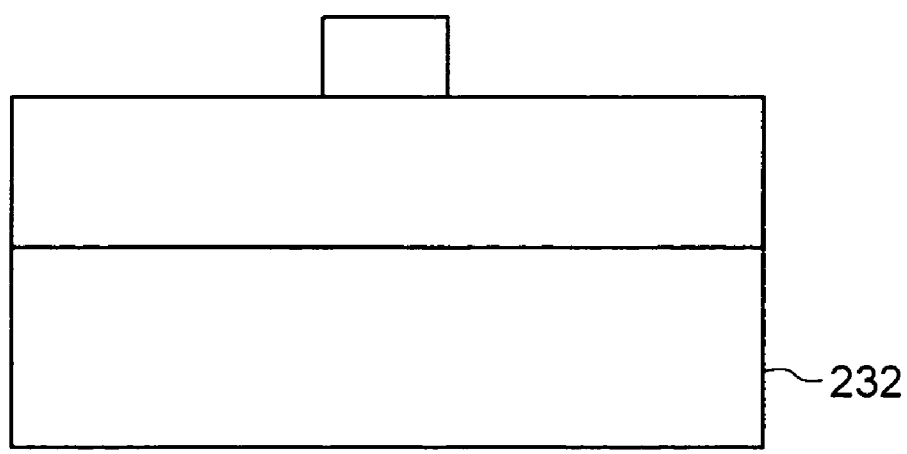
SIDE VIEW OF PRODUCT

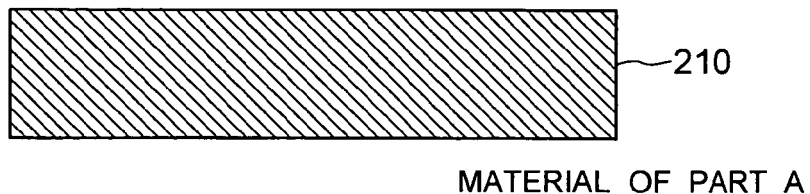
FIG. 19A  MATERIAL OF PART A
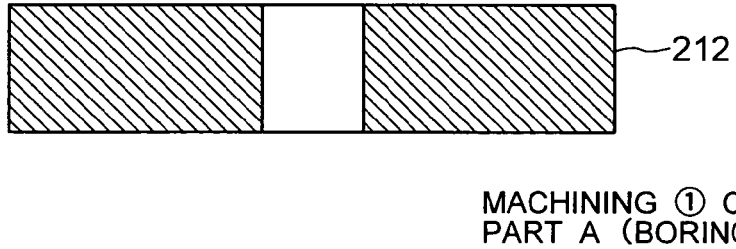
FIG. 19B  MACHINING ① OF PART A (BORING)
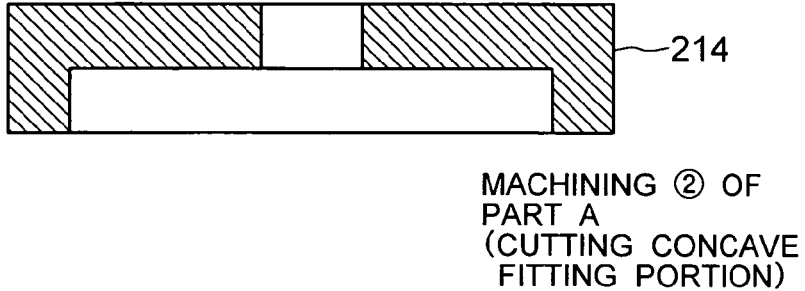
FIG. 19C  MACHINING ② OF PART A (CUTTING CONCAVE FITTING PORTION)

INSPECTION OF PROCESSING ① OF PART A
(MANUFACTURING HISTORY DATA)

INSPECTION OF PROCESSING ② OF PART A
(MANUFACTURING HISTORY DATA)

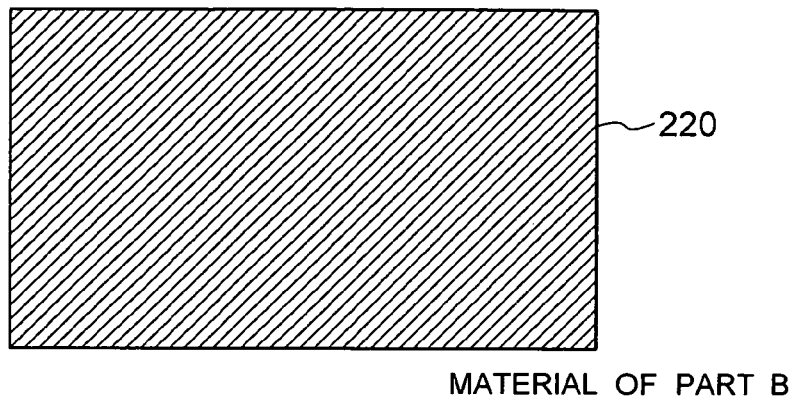
FIG. 21A  MATERIAL OF PART B
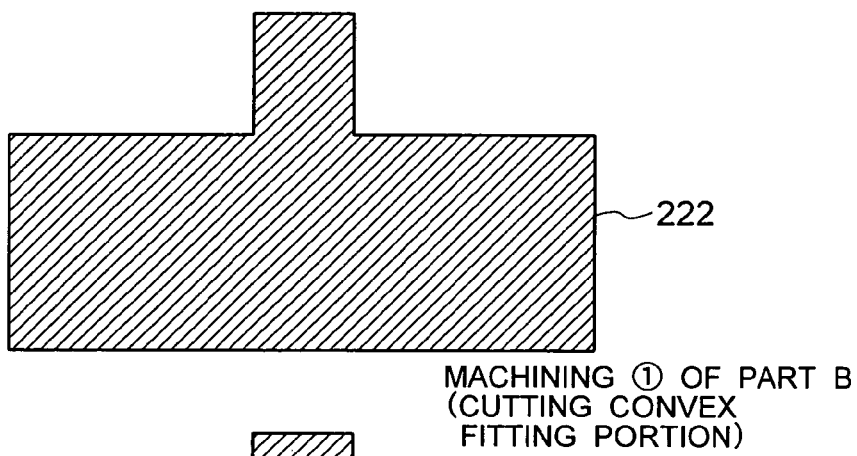
FIG. 21B  MACHINING ① OF PART B (CUTTING CONVEX FITTING PORTION)
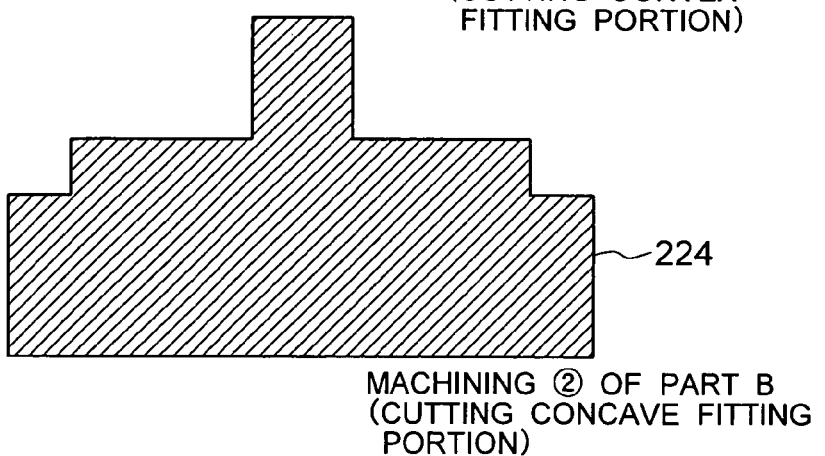
FIG. 21C  MACHINING ② OF PART B (CUTTING CONCAVE FITTING PORTION)

INSPECTION OF PROCESSING ① OF PART B
(MANUFACTURING HISTORY DATA)

INSPECTION OF PROCESSING ② OF PART B
(MANUFACTURING HISTORY DATA)

MANUFACTURING BOM (BILL OF MATERIAL)

MANUFACTURING HISTORY DATA OF PROCESS A①

MANUFACTURING HISTORY DATA OF PROCESS A②

MANUFACTURING HISTORY DATA OF PROCESS B①

MANUFACTURING HISTORY DATA OF PROCESS B②

PRODUCT QUALITY HISTORY DATA

INITIAL STATE OF QUALITY VARIATION CAUSE
ANALYSIS NETWORK MODEL

GENERATION OF CORRELATION NETWORK MODEL FOR QUALITY
VARIATION CORRELATION ANALYSIS AND SELECTION OF CANDIDATES
FOR PROCESSES CAUSING QUALITY VARIATION

GENERATION OF CAUSAL NETWORK MODEL FOR QUALITY VARIATION CAUSATION ANALYSIS AND EXTRACTION OF INTER-PROCESS CAUSATION CORRELATION

EXTRACTION OF PROCESS CAUSING QUALITY VARIATION

FIG. 39

| INDIVIDUAL ID INFORMATION | PRODUCT QUALITY HISTORY | PROCESS A MANUFACTURING HISTORY | | | PROCESS B MANUFACTURING HISTORY | | | PROCESS C MANUFACTURING HISTORY | | | PROCESS D MANUFACTURING HISTORY | |
|---|---|---|---|---|---|---|---|---|---|---|---|---|
| | | WORKER 11 | WORKER 12 | WORKER 13 | WORKER 21 | WORKER 22 | | WORKER 31 | WORKER 32 | WORKER 33 | WORKER 41 | WORKER 42 |
| ID001 | 100 | 0 | 1 | 0 | 1 | 0 | | 0 | 0 | 1 | 0 | 1 |
| ID002 | 120 | 0 | 0 | 1 | 0 | 1 | | 0 | 1 | 0 | 1 | 0 |
| ID003 | 101 | 1 | 0 | 0 | 0 | 1 | | 1 | 0 | 0 | 0 | 1 |
| ... | ... | ... | ... | ... | ... | ... | | ... | ... | ... | ... | ... |

PRODUCT a — 30a
PRODUCT b — 30b
PRODUCT c — 30c

FIG. 43

| 31 | 32 | 33s1 | 33s2 | 33s3 | 33s4 | 33s5 | 33s6 | 33s7 |
|---|---|---|---|---|---|---|---|---|
| INDIVIDUAL ID INFORMATION | PRODUCT QUALITY HISTORY | MATERIAL SUPPLIER | MATERIAL TRANSPORT MEANS | PARTS MANUFACTURING LINE | PARTS TRANSPORT MEANS | PRODUCT MANUFACTURING LINE | PRODUCT TRANSPORT MEANS | INSPECTION WAREHOUSE |
| ID001 | 100 | 510 | 541 (VEHICLE) | 521 | 542 (VESSEL) | 530 | 543 (AIRPLANE) | 551 |
| ID002 | 50 | 510 | 543 (AIRPLANE) | 522 | 543 (AIRPLANE) | 530 | 543 (AIRPLANE) | 551 |
| ID003 | 100 | 510 | 541 (VEHICLE) | 521 | 542 (VESSEL) | 530 | 543 (AIRPLANE) | 552 |
| ID004 | 50 | 510 | 543 (AIRPLANE) | 522 | 543 (AIRPLANE) | 530 | 543 (AIRPLANE) | 552 |
| ... | ... | ... | ... | ... | ... | ... | ... | ... |

SUPPLY CHAIN ELEMENT No.

PRODUCT a — 30a
PRODUCT b — 30b
PRODUCT c — 30c
30

QUALITY CONTROL SYSTEM FOR MANUFACTURING INDUSTRIAL PRODUCTS

INCORPORATION BY REFERENCE

The present application claims priority from Japanese application JP2004-247708 filed on Aug. 27, 2004, the content of which is hereby incorporated by reference into this application.

BACKGROUND OF THE INVENTION

This invention relates to a product quality control system for controlling the manufacture of products, or in particular to a quality control system for products manufactured through a plurality of processes and supply chain elements.

A method and an apparatus for controlling the product quality on a semiconductor manufacturing line are disclosed in JP-A-2002-110493 (Patent Document 1) and JP-A-2000-252180 (Patent Document 2). These patents relate to a method and an apparatus for controlling the product quality based on the analysis of the causation connection of the product quality data and the manufacturing data. The product quality data to be analyzed is the electrical characteristics and yield of the semiconductor wafer, while the manufacturing data refers to the history of the manufacturing equipment, the manufacturing specification, the in-line measurement and the equipment route for the manufacturing processes and steps. As a method to analyze the causation connection, the multistage multivariate analysis ($Y=A \cdot X$) is used with the product quality data as an object variable (Y) and the manufacturing data as an explanatory variable (X).

Specifically, first, in order to avoid the problem of incalculability and insufficient accuracy due to the multiple collinear phenomenon caused by the simultaneous change in a plurality of elements of the explanatory variable, the elements of the explanatory variable are divided into a few number of predetermined groups. Then, the multiple linear regression analysis ($Yi=A \cdot Xi$) is applied to all the division groups, and the elements of the explanatory variable are reduced in each division group by the forward-backward stepwise selection. The explanatory variables thus reduced are subjected again to the multiple linear regression analysis repeatedly in multiple stages to extract an abnormal element.

As a product quality control technique for the manufacturing process of steel or the like, a method to analyze the causes of the defect of the manufacturing data from the product quality data is disclosed in JP-A-2003-114713 (Patent Document 3). The product quality data dealt with in Patent Document 3 concerns only the quality defect. Also, the multivariate process data is handled as the manufacturing data to be analyzed. In Patent Document 3, the principal component analysis of the manufacturing data is used as a method to analyze the causes of the quality defect. Specifically, the multivariate process data is converted into a few number of principal component scores due to linear combination by the principal component analysis. Then, the residual and the distance are calculated, and in the case where the calculation result is not included in the permissible range, the degree of contribution of each process data is calculated to extract a causative process data.

On the other hand, a technique for the automobile manufacturing line is described in JP-A-2002-251212 (Patent Document 4). Patent Document 4 discloses a method and a system for determining whether the substandard quality of high-ranked parts (module or product) manufactured by combining a plurality of types of low-ranked parts is caused by the defects of the low-ranked parts or the assembly process. The product quality data to be analyzed in Patent Document 4 is the vehicle body assembled by the completed product maker.

The information used for the low-ranked parts is the dimensions and the shape of the front and rear door units assembled by the assembler. The information on the lowest-ranked parts is the dimensions and shape of the door units handled by the parts maker. The cause of the substandard quality is determined by collation between the product and the quality data in each tier of the parts hierarchy, and as long as the parts are conforming in all the tiers of the hierarchy, it is determined that the substandard quality is caused by the assembly at the completed product maker.

A plurality of calculation methods of the correlation model ($Y=A \cdot X$) of the object variable (Y) and the explanatory variable (X) based on the projection method to avoid the incalculability problem and the insufficient accuracy due to the multiple collinear phenomenon caused by the simultaneous change of a plurality of the elements of the explanatory variable are described in "Chemometrics, Data Analysis for the Laboratory and Chemical Plant", WILEY (2003), pp. 412–415 (Nonpatent Document 1).

On the other hand, a graphical modeling method constituting one of the multivariate analysis methods in the statistical science is discussed in "Graphical Models", OXFORD UNIVERSITY PRESS (1996), Steffen L. Lauritzen, p. 1 and pp. 123–157 (Nonpatent Document 2). Specifically, an outline of the mathematic foundation of the method to visually express an approximation model of a complicated connecting structure between a plurality of variates in the real world by a mathematic graph and search and verify the particular model from the partial correlation coefficient.

SUMMARY OF THE INVENTION

An industrial product is assembled from a plurality of parts produced through different processes. A category of industrial products generally called "the digital home electric appliance" recently placed on the market, for example, is a set-top box product assembled from key devices including a system LSI (SoC: System on Chip), a display panel and a hard disk drive (HDD).

Each key device making up a product and the end product are manufactured through a number of processes in a number of factories at a number of places in the world. The production of key devices requires the complicated, accurate process of many steps. The system LSI, for example, is produced through more than several hundred steps. Even in the case where a product quality failure occurs, therefore, it is very difficult to specify the very process causing the defect.

For the manufacturing process including a few number of steps such as the processing of some foods, it is not a difficult job to manually search for a change point by tracing the manufacturing history in the case of a quality failure.

In the manufacture of industrial products, on the other hand, an information system has been constructed in which an individual identification number such as the lot number or the serial number is attached to each material, part, product in progress and a product to trace the manufacturing history data. In the future, more finely-detailed manufacturing history data is expected to be collected by the widespread use and utilization of an RF (Radio Frequency) ID tag for the manufacturing line or the supply chain.

Even in the case where a means capable of tracing the manufacturing history data becomes available, however, it has been impossible or a time-consuming difficult job to manually trace the cause of product quality variation from a multiplicity of manufacturing processes of key devices. Also, the future will see an even greater difficulty due to an increased size and detail of the manufacturing history data.

Further, in order to meet a variety of market demands, it is now a widespread practice to produce many items of products each in a small quantity on each manufacturing line, and the resultant variation and complication of the manufacturing processes with the product type further increases the difficulty of manually tracing the cause of the quality deterioration.

For the complicated processes difficult to analyze manually, a statistical automatic analysis method using a computer is effective to analyze the cause of product quality variations. In the conventional statistical automatic analysis method using the computer, however, the fundamental cause cannot be automatically traced even though candidates for the cause of product quality variation can be listed automatically. Industrial products are manufactured not independently in parallel processes but rather continuously through a serial process. Therefore, the quality variation in the upperstream processes is congested and propagated to the downstream processes in the production line.

The technique described Patent Documents 1 and 2 concerns a method in which the manufacturing history data strongly connected to the product quality history data is extracted by the multiple linear regression analysis ($Y=A \cdot X$), where Y is an object variable indicating the product quality history data and X an explanatory variable indicating the manufacturing history data. The semiconductor manufacturing line is mainly configured of a continuous chain of serial steps and has many variates in the processes. Thus, a multiple collinear phenomenon is caused with simultaneously changing variates, thereby making it generally difficult to solve the multiple linear regression formula directly for the reason of stability of the mathematical calculations.

As a result, the multistage multivariate analysis method is employed in which the elements of the manufacturing history data are divided into a predetermined small number of groups, and by applying the multiple linear regression analysis ($Y_i=A \cdot X_i$) to all the division groups, the elements of the manufacturing history data are reduced within each division group by the forward-backward stepwise selection. The manufacturing history data thus reduced are combined and the application of the multiple linear regression analysis is repeated in a multiplicity of stages. The conventional method, though always capable of carrying out the calculation of the multiple linear regression model formula, remains a technique in which the candidates for the cause of product quality variation are listed based only on the correlation magnitude ($Y=A \cdot X$) of the product quality history data (Y) and the manufacturing history data (X).

The technique described in Patent Document 3 assumes only the presence or absence of the quality variation as the product quality history data, and is used for identifying the product type that has caused the quality variation. In this technique, the multivariate process data involved in the manufacture of the product that has developed the quality variation is used as the manufacturing history data (X), which is expressed by the residual E and the projection P on the principal component score T using the principal component analysis (PCA: principal component analysis) ($X=T \cdot P+E$), a kind of the projection method, and the variation component of the process data is extracted by the inverse transform from the deviation component of the statistical distance of the score T and the residual E to the contribution of the process data of the manufacturing history data (X).

The projection of the manufacturing history data (X) on the principal component score by the principal component analysis is an condensation, and to summarize the operation thereof, a plurality of the simultaneous variation components of the manufacturing history data (X) are projected and integrated on the same score, and after extraction of the score, inversely transformed to the contribution of a plurality of simultaneous variation components of the manufacturing history data (X). This technique, therefore, is nothing but a means to efficiently search for the variation of the manufacturing history data (X) as a whole.

The technique described in Patent Document 4 specifies the cause of product quality variation in the parts maker, the intermediate assembly maker and the final assembly maker constituting different supply chain elements. This technique, however, is intended for a few number of large parts and large products such as doors and bodies of automotive vehicles, and the method of tracing the cause of defects is limited to a visual collation of the quality information of each tier of the parts and the products.

In view of this, the construction of a product quality control system has been demanded in which the complicated connecting structure in the manufacturing history data is searched to reach the fundamental cause of quality variation in addition to simply listing the candidates for the cause of product quality variation.

The object of this invention is to provide a product quality control system in which not only the candidates for the cause of variation in the product quality history data (Y) is listed from the manufacturing history data (X) but also the complicated connecting structure in the manufacturing history data (X) is searched to arrive at the fundamental cause of quality variation.

In order to achieve this object, according to this invention, there is provided a product quality control system for controlling the quality of the product manufactured through a plurality of manufacturing processes and at least one inspection process, comprising a manufacturing sequence information management apparatus for storing and managing the information on the order in which materials and parts used for manufacture of a product and a product in progress are input into each manufacturing process, a manufacturing management apparatus for storing the products, the materials and parts thereof and a product in progress uniquely with corresponding individual identification information and giving an instruction to manufacture the product based on the individual identification information, the sequence information supplied from the manufacturing sequence information management apparatus and a product manufacturing plan, and a causation analysis apparatus of quality variation for analyzing the cause of product quality variation based on the manufacturing history data corresponding to the individual identification information collected by the manufacturing history data collection apparatus arranged in each manufacturing process and the product quality history data corresponding to the individual identification information measured in the inspection process, wherein the causation analysis apparatus of quality variation includes a correlation analysis module of quality variation for calculating by collation the statistical correlation magnitude between the quality history data and the manufacturing history data using the individual identification information and automatically extracting the candidates for at least one manufacturing process likely to provide the cause of product quality variation based on the statistical correlation magnitude, and a causation analysis module of quality variation for calculating by collation the statistical mutual correlation magnitude between the manufacturing history data using the individual identification information, and based on the statistical mutual correlation magnitude and the sequence information thus obtained, determining the connecting structure information between the manufacturing processes, and automatically determining the manufacturing process providing the cause of product quality variation from the variation causing process candidates.

According to this invention, not only the candidates for the manufacturing processes causing the product quality variation are listed based on the correlation magnitude between the time-series product quality history and the manufacturing process history but also the complicated causal connecting structure between the manufacturing process variates is automatically searched the fundamental cause of the quality variation can be determined.

Also, the candidates of the internal element units of the production system for the cause of product quality variation are listed based on the correlation magnitude between the time-series product quality history and the manufacturing process history on the one hand, and the fundamental cause of quality variation is determined by automatically searching the complicated causal connecting structure between the variates of the internal element units of the production system on the other hand.

Further, the candidates of the supply chain component elements for the product quality variation are listed based on the correlation magnitude between the time-series product quality history and the supply chain component element history on the one hand, and the complicated causal connecting structure between the variates of the supply chain component elements is automatically searched thereby to determine the fundamental cause of quality variation is determined on the other hand.

These and other features, objects and advantages of the present invention will become apparent from the following description when taken in conjunction with the accompanying drawings.

BRIEF DESCRIPTION OF THE DRAWINGS

FIGS. 5A, 5B are diagrams for explaining the internal expression of a correlation network model graph in a computer and the extraction of process candidates causing the quality variation;

FIGS. 6A, 6B are diagrams for explaining the internal expression of a causal network model graph in a computer and the extraction of the inter-process mutual correlation;

FIGS. 7A, 7B are diagrams for explaining the internal expression of a causal network model graph in a computer and the extraction of the inter-process mutual correlation;

FIG. 8 is a diagram for explaining the internal expression of a causal network model graph in a computer and the extraction of the inter-process mutual correlation;

FIG. 9 is a diagram for explaining the internal expression of the correlation network model graph in a computer and the result of determining the process causing the quality variation;

FIG. 17 is a schematic diagram showing the contour of a product;

FIGS. 19A, 19B, 19C are process diagrams showing the cross section and the processing steps of a part A;

FIGS. 21A, 21B, 21C are process diagrams showing the cross section and the processing steps of a part B;

FIG. 39 is a diagram showing a comparison table for collating the product quality history with the production worker route information as manufacturing history;

FIG. 43 is a diagram showing a comparison table for collating the product quality history with the component elements of the supply chain.

DESCRIPTION OF THE EMBODIMENTS

Figure 1:
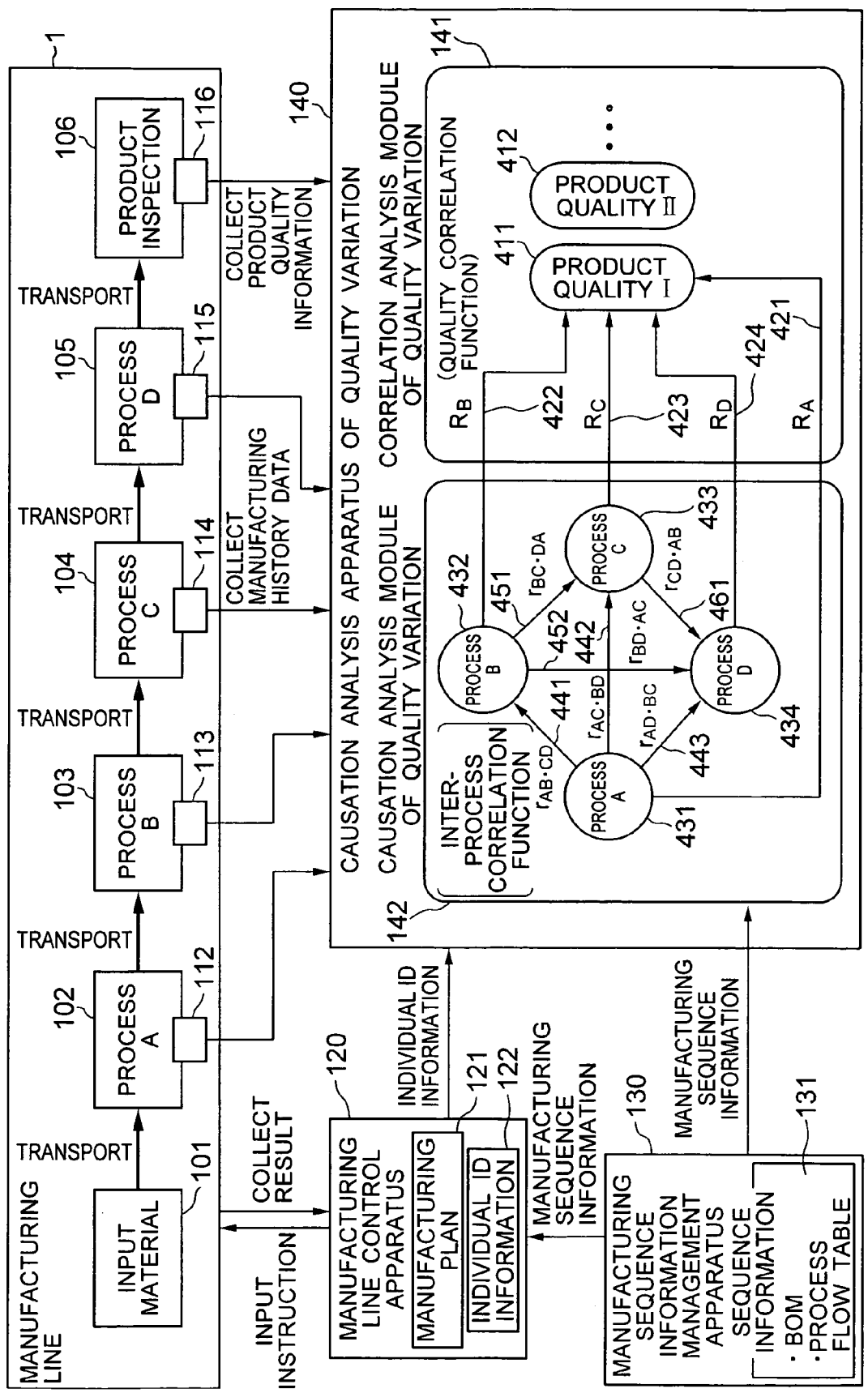
FIG. 1 is a diagram for explaining a product quality control system capable of analyzing the cause of quality variation in the manufacturing processes.

Before explaining a plurality of embodiments of the invention, the configuration features of a product quality control system according to the invention are explained below.

The product quality control system according to the invention is used on a manufacturing line having at least two manufacturing processes for processing and assembling materials, parts or products in progress, and an inspection means for conducting the product quality inspection, and configured of (1) a manufacturing line control apparatus, (2) a manufacturing sequence information management apparatus, (3) a manufacturing history data collection apparatus, (4) a quality history data collection apparatus and (5) a causation analysis apparatus of quality variation.

In the manufacturing line control apparatus (1), an input plan and an input result of materials, parts or products in progress into the manufacturing processes are controlled based on the individual identification information uniquely corresponding to the materials, parts, products in progress or products. The correlation between the materials, parts, products in progress and products is also controlled, like the parent-child relation, by collating the individual identification information unique to each of the materials, the parts, the products in progress and the products with each other. This manufacturing line control apparatus is generally included in the conventional product quality control system.

In the manufacturing sequence information management apparatus (2), on the other hand, the order in which the materials, parts or the products in progress are input into the manufacturing processes by the manufacturing line control apparatus and the information on the input destination are stored beforehand for each part type and supplied to the other apparatuses described above. Especially, the manufacturing line control apparatus (1) controls the input plan based on the manufacturing sequence information. Specifically, the manufacturing sequence information management apparatus is also included generally in the conventional product quality control system. In order to make it possible to automatically generate a causal network model of a complicated connecting structure between a plurality of variates in the manufacturing history data, however, the causation analysis apparatus of quality variation (5) also utilizes the manufacturing sequence information.

The manufacturing sequence information may include a BOM (bill of material), for example. The BOM is the information on a hierarchical parts configuration ranging from low-ranked materials and parts to high-ranked products in progress and end products. As far as a product having a comparatively simple configuration is concerned, the BOM itself indicates the manufacturing sequence.

For a product having complicated manufacturing processes, on the other hand, a manufacturing BOM may be prepared in advance in which the hierarchical parts configuration is accurately collated with the sequence of manufacturing processes with incidental conditions attached for production. Also, for a process product such as a semiconductor, the process sequence information generally called the process flow is prepared and can be used with the manufacturing sequence information management apparatus according to the invention.

In the manufacturing history data collection apparatus (3), the manufacturing history data constituting arbitrary time-series information subject to change with the processing and assembling operation in the manufacturing process are collected from the manufacturing process while attaching the individual identification information thereto, and supplied to the causation analysis apparatus of quality variation (5) described below.

The manufacturing history data can be a quality measurement value or an inspection value of a part or a product in progress after being processed in a predetermined manufacturing process. As an alternative, the manufacturing history data may be the manufacturing execution equipment route information configured of the machine identification numbers assigned to the manufacturing equipments through which each individual material, part, product in progress or product is passed in each manufacturing process.

Further, the manufacturing history data may be a designated set value of the operation specification of the manufacturing equipment used in a manufacturing process, a physical quantity measurement value of the operating condition of the manufacturing equipment used in the manufacturing process or the production worker route information configured of the identification number assigned to the production worker who has processed each individual material, part, product in progress or product in each manufacturing process.

In the quality history data collection apparatus (4), the time-series quality history data for the product quality are collected with the individual identification information attached thereto, and supplied to the causation analysis apparatus of quality variation (5) described below.

The causation analysis apparatus of quality variation is configured of two processors including a correlation analysis module of quality variation (5-1) and a causation analysis module of quality variation (5-2) described below.

In the correlation analysis modules of quality variation (5-1), the time-series product quality history data used as an object variable (Y) and the time-series manufacturing history data used as an explanatory variable (X) are collated and compared with each other using the individual identification information attached thereto. In this way, the correlation magnitude between them is determined thereby to list candidates for the cause of product quality variation.

According to this invention, the method of determining the correlation magnitude is not limited. As long as the multiple linear regression between the object variable (Y) and the explanatory variable (X) is solved using the projection method described in Nonpatent Document 1, however, the correlation magnitude can always be determined while avoiding the incalculability problem and insufficient accuracy due to the multiple collinear phenomenon caused by the simultaneous change in a plurality of the elements of the explanatory variable.

The simple operation of the correlation analysis module of quality variation to determine the correlation magnitude between the product quality history and the manufacturing history has been used in the prior art as described in the section of the background art. For a product manufactured through complicated manufacturing processes, however, the conventional correlation analysis module of quality variation can at most list the candidates for the cause of quality variation but cannot trace the fundamental cause based on the correlation magnitude between the product quality history and the manufacturing history.

The causation analysis module of quality variation (5-2), on the other hand, performs the operation in which a complicated connecting structure between a plurality of process variates of the time-series manufacturing history data in terms of the explanatory variable (X) is expressed by a network model based on a directed graph including vertexes and edges, which network model is automatically searched and analyzed, thereby automatically tracing the fundamental cause from the candidates for the cause of quality variation listed above.

In order to search a network model automatically, the presence or absence and the direction of an edge along which the change in the variates of a manufacturing process is congested and propagated are determined. The presence or absence of the edge along which the variation propagates is determined by checking the correlation magnitude for all sets of variates of the manufacturing process. The correlation magnitude can be determined from the path function of the covariance structure analysis of the statistical analysis method described in the section of the background art above or the partial correlation function for graphical modeling. The direction of the edge for variation propagation cannot be determined by the calculation of the statistical values between the variates of the manufacturing process.

In the statistical analysis method described in the section of the background art, a model is visually expressed and then the analysis operator proceeds to verify the legitimacy of the hypothesis about the model by trials and errors using the dialog functions of the computer. This method, however, requires a skilled analysis operator, and therefore the fundamental cause of product quality variation cannot be automatically traced for a variety of products flowing through the ever-changing complicated manufacturing process.

In view of this, according to this invention, the manufacturing sequence information used by the manufacturing line control apparatus to control the input plan is utilized for automatic generation of the network model with the direction of variation propagation determined along edges indicating a complicated connecting structure between a plurality of process variates of the manufacturing history data.

As described above, the causation analysis apparatus of quality variation (5) is configured of two modules including the correlation analysis module of quality variation (5-1) and the causation analysis module of quality variation (5-2). Therefore, not only the candidates for the cause of product quality variation are listed but also the complicated connecting structure between the variates of the manufacturing process is determined, thereby making it possible to trace the fundamental cause.

In the product quality control system according to the invention capable of determining the manufacturing process causing the product quality variation on a manufacturing line having at least two manufacturing processes to process and assemble materials, parts or products in progress, two or more element units in the production equipment may be analyzed in place of the manufacturing processes. Then, the physical quantity measurement value indicating the operating condition of the element units in the production equipment can be used as the manufacturing history data and the order in which the element units of the production equipment are operated is stored in the manufacturing sequence information management apparatus in advance. By doing so, the element unit of the production equipment which has caused the product quality variation can be analyzed using the same means.

At the same time, in the correlation analysis module of quality variation (5-1) making up the causation analysis apparatus of quality variation (5), the statistical correlation values between the time-series quality history data obtained from the quality history data collection apparatus and the time-series physical quantity measurement value of the operating condition of the element units in the production equipment obtained from the manufacturing history data collection apparatus are calculated by comparison and collation using predetermined individual identification information. Then, based on the statistical correlation magnitude thus obtained, at least one candidate of the element unit in the production equipment which has caused the quality variation is automatically listed. In the causation analysis module of quality variation (5-2), on the other hand, the statistical correlation values between the individual physical quantity measurement value of the operating condition of at least two element units in the production equipment are calculated by collation and comparison using predetermined individual identification information. Based on the statistical correlation magnitude thus obtained and the order in which the elements units in the production equipment are operated, obtained from the manufacturing sequence information management apparatus, the connecting structure model between the element units in the production equipment is obtained so that the element unit in the production equipment that constitutes the fundamental cause of product quality variation is extracted automatically from the candidates described above.

In the product quality control system according to the invention capable of tracing the manufacturing process causing the product quality variation on a manufacturing line having at least two manufacturing processes to process and assemble materials, parts or products in progress, the elements making up a supply chain of parts or products, instead of the manufacturing processes, can be analyzed. In that case, the manufacturing history data is configured of the supply chain route information including identification numbers assigned to the supply chain component elements through which the individual materials, parts, products in progress or products are passed, and the order in which they pass through the supply chain component elements is stored in the manufacturing sequence information management apparatus. Then, a particular supply chain component element causing the product quality variation can be analyzed using the same means.

The supply chain component elements are specifically defined as a production factory or line in which materials, parts or products in progress are processed and assembled or transportation means or route through which the materials, parts or the products in progress are transported.

In this case, in the correlation analysis module of quality variation (5-1) making up the causation analysis apparatus of quality variation (5), the statistical correlation magnitude between the time-series quality history data obtained from the quality history data collection apparatus and the time-series supply chain route information obtained from the manufacturing history data collection apparatus is calculated by collation and comparison using the predetermined individual identification information. Also, at least one candidate for the supply chain component element that has caused the quality variation is automatically listed based on the statistical correlation magnitude thus obtained. In the causation analysis module of quality variation (5-2), on the other hand, the statistical correlation magnitude between the individual supply chain route information of two or more supply chain component elements is calculated by collation and comparison using the predetermined individual identification information. Based on the statistical correlation magnitude thus obtained and the order in which the supply chain component elements are passed, obtained from the manufacturing sequence information management apparatus, a connecting structure model between the internal component elements of the supply chain is acquired. In this way, a particular supply chain component element constituting the fundamental cause of product quality variation is pinned down automatically from the candidates.

In the process, an RF ID tag or the like having a sensor built therein may be attached to individual materials, parts, products in progress or products, and such environmental information as the temperature, humidity, atmosphere, vibration of or the time elapsed by the materials, parts, products in progress or the products are collected to make up the manufacturing history data. In this way, the environmental change of the supply chain component element that has caused the product quality variation can be automatically extracted.

Embodiment 1

The basic form of the product quality control system according to a first embodiment of this invention is explained below with reference to FIGS. 1, 2, 3, 4, 11 and 16.

Figure 2:
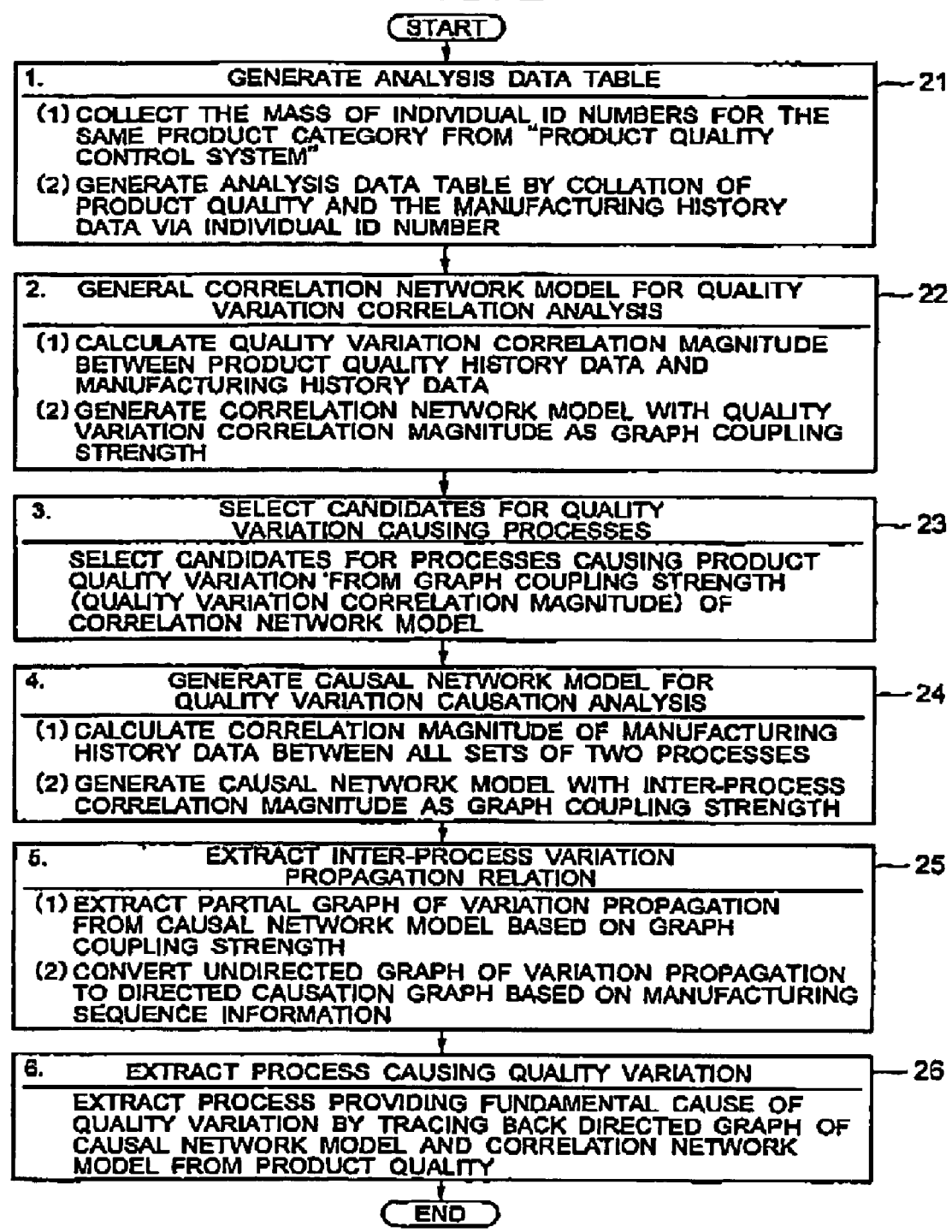
FIG. 2 is a diagram for explaining the steps of analyzing the cause of quality variation in the manufacturing processes.
Figure 3:
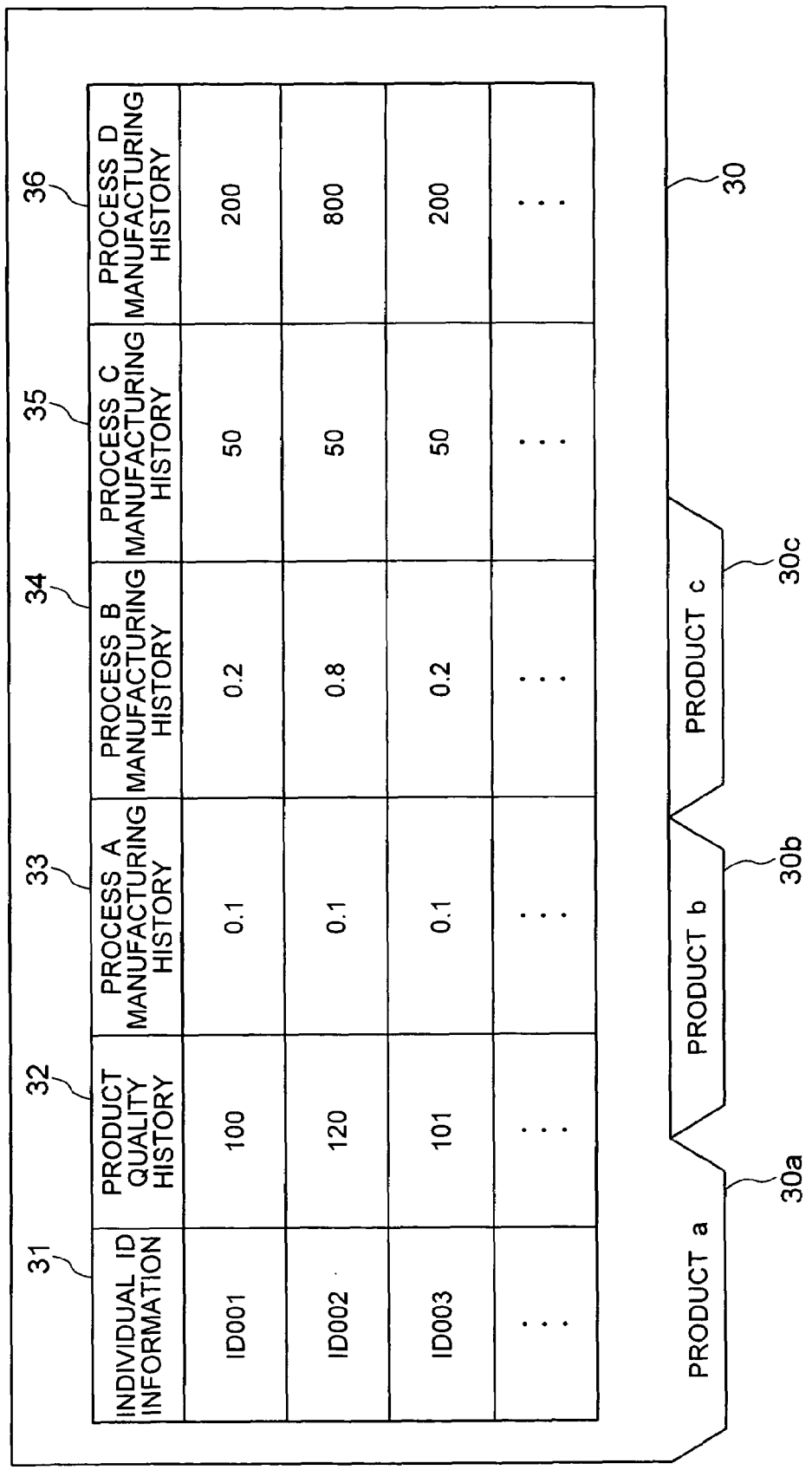
FIG. 3 is a correlation diagram showing a comparison table collating the product quality history with the manufacturing history.
Figure 4:
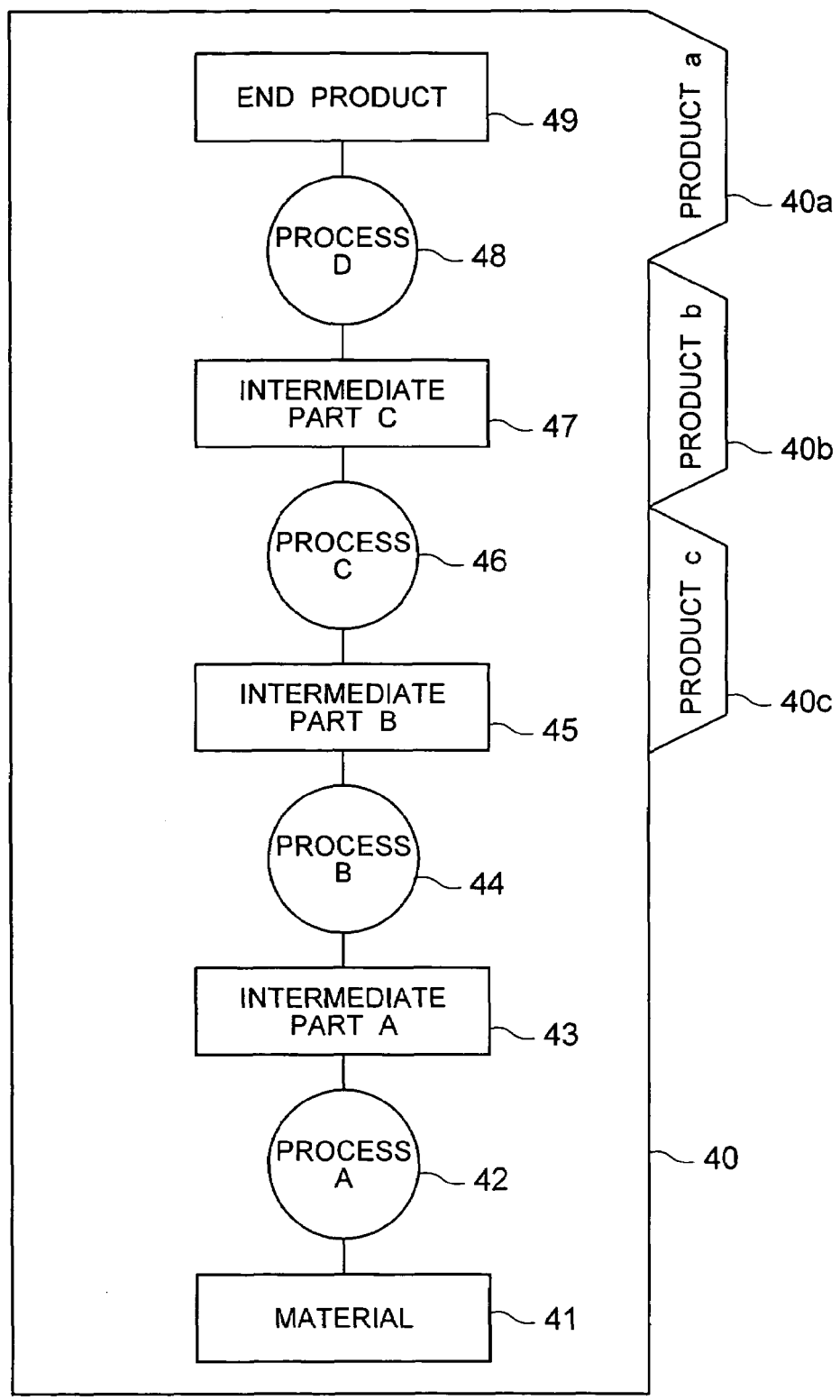
FIG. 4 is a diagram showing a manufacturing BOM.

FIG. 1 is a diagram for explaining the product quality control system according to an embodiment of the invention. FIG. 2 is a diagram for explaining the steps of the process. FIG. 3 is a diagram for explaining an analysis data table for collating and comparing the product quality history data and the manufacturing history data to each other. FIG. 4 is a diagram for explaining the manufacturing BOM (bill of material) providing the manufacturing sequence information. FIG. 16 is a diagram for explaining a computer system to package the product quality control system according to the invention. FIGS. 11 to 15 are diagrams for explaining in detail the method of analyzing the cause of quality variation by a statistical network model.

First, the product quality control system according to an embodiment of the invention is explained with reference to FIG. 1.

The product quality control system according to the invention is configured of a manufacturing line control apparatus 120 for controlling a manufacturing line 1, a manufacturing sequence information management apparatus 130 for controlling the manufacturing sequence information, and a causation analysis apparatus of quality variation 140 for analyzing the cause of quality variation based on the information from the manufacturing line 1, the manufacturing line control apparatus 120 and the manufacturing sequence information management apparatus 130.

The manufacturing line 1 starts with an input process 101 for dispatching materials or parts to the production line, and through four processing or assembling processes including a process A102, a process B103, a process C104 and a process D105, manufactures a product, and ends with a production inspection process 106 at which the product is finally inspected. In FIG. 1, all the manufacturing processes are connected in series, to which form the invention is not limited. The four processes 102, 103, 104, 105 include manufacturing history data collection apparatuses 112, 113, 114, 115, respectively. The parts inspection process 106 has a quality history data collection apparatus 116.

The manufacturing history data is subject to change during production and can be set arbitrarily. In the case where a given manufacturing process includes a plurality of production equipments, for example, the machine number that has executed the process can be used as the manufacturing history data. In the case where a given process includes a means for measuring the quality of the processing result, on the other hand, the particular quality measurement value can be used as the manufacturing history data.

Also, in the case where a production equipment executes the process of a given process in accordance with an externally designated set value of the operation specification, the designated set value of the operation specification can be used as the manufacturing history data. Further, in the case where the production equipment for processing a given process includes a means for measuring the physical quantity of the operating condition as of the processing time, the particular measurement value of the operating condition can be used as the manufacturing history data.

The manufacturing line control apparatus 120 starts to input a material at the material input process 101 of the manufacturing line 1 in accordance with a production plan 121 stored in a storage means (not shown). The input operation at the material input process 101 and subsequent processes 102, 103, 104, 105 through the product inspection process 106 is performed according to an input plan formed based on the manufacturing sequence information 131 acquired from the manufacturing sequence information management apparatus 130.

The manufacturing line control apparatus 120 controls the input plan and the input result as to when the material is input, in accordance with the individual identification information 122. The individual identification information 122 is the control number employed uniquely to each individual material, part, product in progress or product.

The individual identification information can be attached using a tag carrying a number code directly on the individual or on the package or the transport pallet thereof. The tag can be implemented by paper or by writing into a rewritable semiconductor memory device.

The causation analysis apparatus of quality variation 140 includes a correlation analysis module of quality variation 141 and a causation analysis module of quality variation 142 not only to extract the candidates for the cause of product quality variation but also to trace the fundamental cause.

The causation analysis apparatus of quality variation 140 is supplied with the product quality history data from the quality history data collection apparatus 116, the manufacturing history data from the manufacturing history data collection apparatuses 112, 113, 114, the individual identification information from the manufacturing line control apparatus 120 and the manufacturing sequence information from the manufacturing sequence information management apparatus 130, and outputs a process constituting the fundamental cause of product quality variation.

The correlation analysis module of quality variation 141 analyzes the correlation between the product quality history data 411, 412 acquired from the quality history data collection apparatus 116 and the manufacturing history data 431, 432, 433, 434 acquired from the manufacturing history data collection apparatuses 112, 113, 114, 115, and extracts the candidates for the process causing the product quality variation from the correlation magnitudes 421, 422, 423, 424.

Generally, in the manufacturing line having a chain of serially connected processes, the individual that has caused the quality variation in a given process is sent to subsequent processes with the result that the quality variation indicated in the quality history data is often propagated by congestion. In the correlation analysis, in the case where the quality variation in a given process is propagated by congestion, a plurality of processes that have received the congestion and propagation of the particular quality variation are also extracted undesirably. It is, therefore, difficult to pin down a single candidate for the process causing the quality variation simply by use of the correlation analysis.

In view of this, according to this embodiment, the process providing the cause of quality variation is determined in the manner described below. First, the causation analysis module of quality variation 142 analyzes the correlation between the manufacturing history data 431, 432, 433, 434 of processes A to D acquired by the manufacturing history data collection apparatuses 112, 113, 114, 115 and determines the correlation magnitudes 441, 442, 443, 451, 452, 461 thereby to clarify the presence or absence of congestion and propagation of the manufacturing history variation between the processes.

Next, from the manufacturing sequence information acquired from the manufacturing sequence information management apparatus 130, the time priority between the manufacturing processes is determined to clarify the direction of the congestion and propagation of the manufacturing history variation. In accordance with the presence or absence and the direction of the propagation by congestion of the manufacturing history variation between the manufacturing processes, a process providing the fundamental cause of quality variation is finally determined from the candidates for the processes considered the cause of quality variation extracted by the correlation analysis module of quality variation 141.

Next, an example of a hardware configuration of the product quality control system according to the invention is explained with reference to FIG. 16.

FIG. 16 is a diagram showing a computer system used for the product quality control system according to an embodiment of the invention. As shown in FIG. 16, the manufacturing line control apparatus (120 in FIG. 1) is implemented by a manufacturing line control computer 920, a production plan data storage unit 921 and an individual identification data storage unit 922, and the process of giving an instruction to input an individual to a process and collecting the achievement thereof is implemented by the computer 920 executing a program.

Also, the manufacturing sequence information management apparatus (130 in FIG. 1) is implemented by a manufacturing sequence information control computer 930 and a manufacturing sequence information storage unit 931, while the process of supplying the appropriate manufacturing sequence information corresponding to the product type is executed in accordance with the program of the computer 930. Further, the manufacturing sequence information, which may be required to be acquired from a product design system or a process design system, is acquired in accordance with the program (not shown) of the manufacturing sequence information control computer 930.

The cause analysis apparatus of quality variation (140 in FIG. 1) is implemented by the quality variation cause analysis computer 920, the manufacturing history data storage unit 941 and the quality history data storage unit 942, while the quality variation correlation analysis process and the quality variation causation analysis process are executed in accordance with the program of the computer 940.

The computers 920, 930, 940 and the control computer of the manufacturing line 1 are connected by a computer network 900. An input instruction is issued, the achievement collected and the manufacturing history data and the product quality data acquired through the computer network 900.

With reference to FIGS. 2 to 7, 11 to 15, the specific process executed by the causation analysis apparatus of quality variation 140 shown in FIG. 1 is described in detail.

FIG. 2 is a diagram for explaining the processes executed by the causation analysis apparatus of quality variation 140. First, step 1 is explained.

(Step 1)

At step 1 (21 in FIG. 2) of the quality variation cause analysis process in FIG. 2, the causation analysis apparatus of quality variation (140 in FIG. 1) implemented by the computer 940 and a program generates an analysis data table and stores it in the storage unit (not shown) of the computer 940.

More specifically, the causation analysis apparatus of quality variation 140 first acquires, from the product quality control system 120, a production achievement table (not shown) with a chronological arrangement, by product type, of the individual identification information (normally, ID numbers) of the products manufactured based on a production plan 121. Then, using the individual identification information as a search key, the product quality information and the manufacturing history data are searched thereby to generate an analysis data table.

An example of the analysis data table is shown in FIG. 3. The analysis data table 30 includes product type tags 30a, 30b, 30c which can be switched by product type. The first column 31 of the analysis data table 30 contains the description of the individual identification data, whereby the product quality data described in the second column 32 and the manufacturing history data described in the third and subsequent columns 33, 34, 35 are connected to each other.

Next, step 2 is explained.

(Step 2)

At step 2 (22 in FIG. 2) of the quality variation cause analysis process shown in FIG. 2, the correlation analysis module of quality variation (141 in FIG. 1) of the causation analysis apparatus of quality variation (140 in FIG. 1) generates a quality variation correlation network model. The correlation analysis module of quality variation 141 generates a quality variation correlation network model as a directed graph with the product quality information at final vertexes (411, 412 in FIG. 1) and the manufacturing history data by manufacturing process as starting vertexes (431, 432, 433 in FIG. 1) which vertexes are connected by edges (421, 422, 423, 424 in FIG. 1) with arrows.

Incidentally, in the correlation analysis module of quality variation 141, the flow along the arrows from the vertexes 431, 432, 433, 434 of the manufacturing history data as candidates for the cause of quality variation to the vertexes 411, 412 of the resultant product quality information is regarded as a natural fact in the manufacture of industrial products.

Figure 11A:
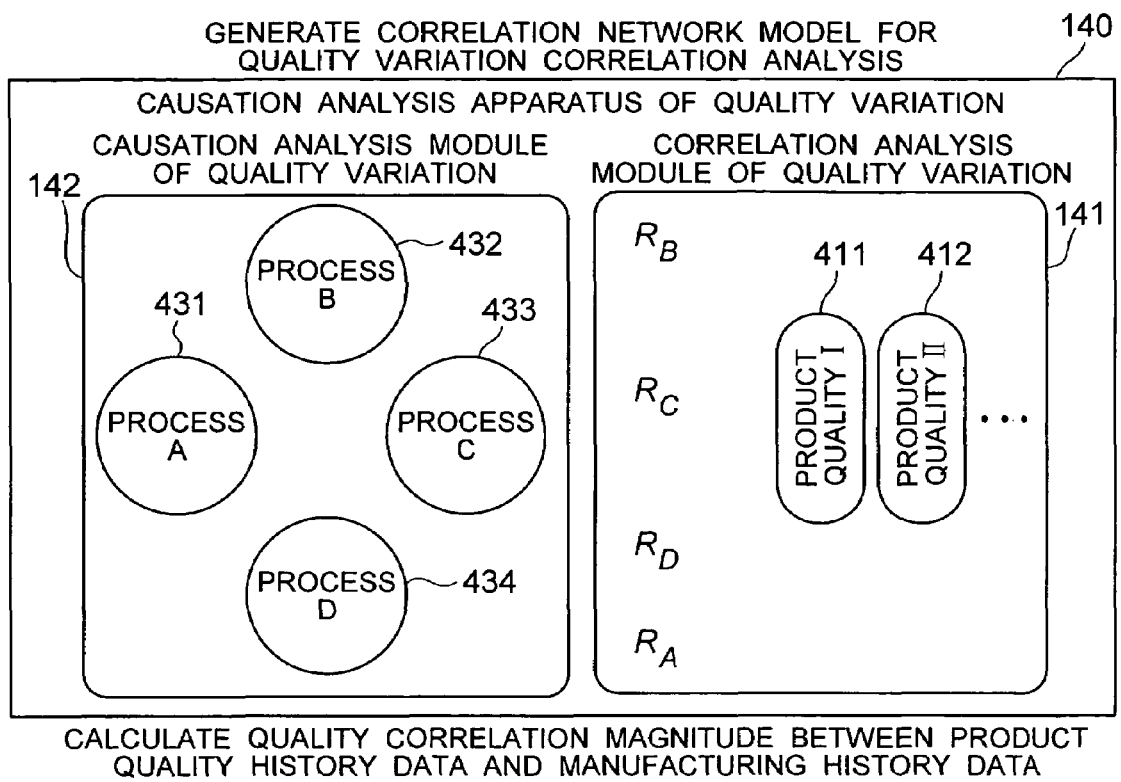
FIGS. 11A, 11B are diagrams for explaining the generation of a correlation network model for analyzing the quality variation correlation.
Figure 11B:
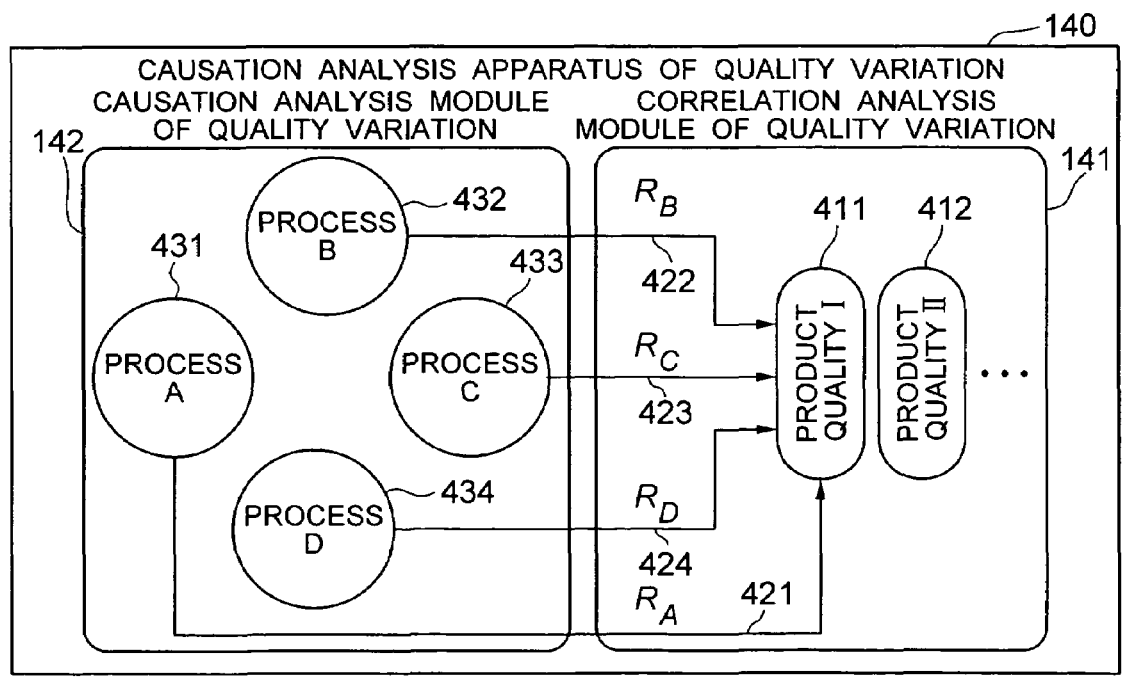
Figure 12:
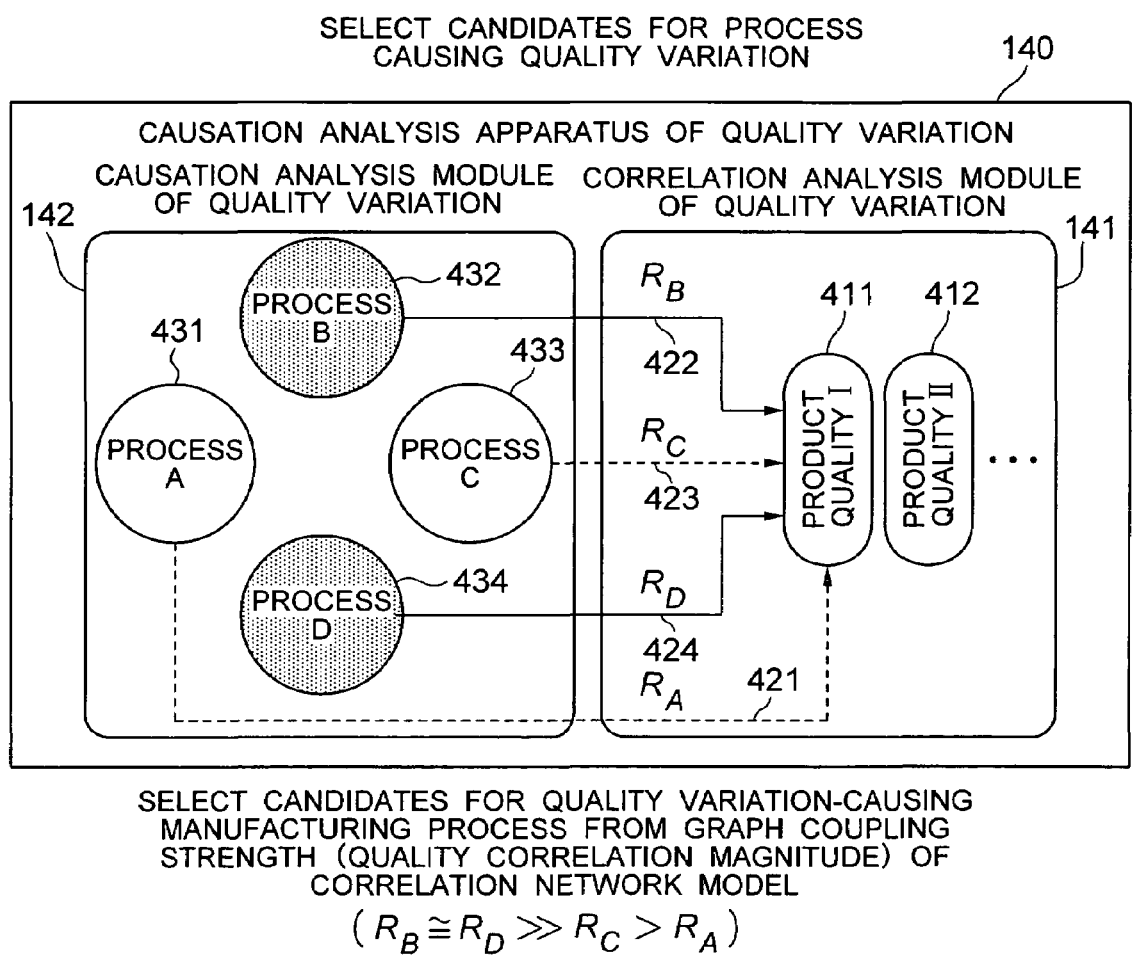
FIG. 12 is a diagram for explaining the extraction of candidates for the process causing the quality variation using a correlation network model.

The details of step 2 (22 in FIG. 2) for generating the correlation network model for quality variation correlation analysis executed by the correlation analysis module of quality variation 141 are explained with reference to FIGS. 11A, 11B. The correlation analysis module of quality variation 141 first calculates the quality variation correlation magnitudes $R_A$, $R_B$, $R_C$, $R_D$ between the product quality information 411 (process for the product quality information 412 are not shown) and the manufacturing history data 431, 432, 433, 434 using the product quality data column 32 and the manufacturing history data columns 33, 34, 35, 36 of the analysis data table 30. For example, the data stored in the product quality data column 32 of the analysis data table 30 shown in FIG. 3 are assumed to be $$Y = [y_1\ y_2\ \ldots\ y_n] \quad (1)$$

and the data stored in the process A manufacturing history data column 33 is assumed to be $$X = [x_1\ x_2\ \ldots\ x_n] \quad (2).$$

Then, the correlation analysis module of quality variation 141 calculates the quality variation correlation magnitude $R_A$ as a correlation function from $$\left.\begin{array}{l} R_A = r_{xy} \\ r_{xy} = \dfrac{s_{xy}}{s_x s_y} \\ s_{xy} = \dfrac{(x_1 - \bar{x})(y_1 - \bar{y}) + (x_2 - \bar{x})(y_2 - \bar{y}) + \cdots + (x_n - \bar{x})(y_n - \bar{y})}{n - 1} \\ s_x = \sqrt{\dfrac{(x_1 - \bar{x})^2 + (x_2 - \bar{x})^2 + \cdots + (x_n - \bar{x})^2}{n - 1}} \\ \bar{x} = \dfrac{x_1 + x_2 + \cdots + x_n}{n} \\ s_y = \sqrt{\dfrac{(y_1 - \bar{y})^2 + (y_2 - \bar{y})^2 + \cdots + (y_n - \bar{y})^2}{n - 1}} \\ \bar{y} = \dfrac{y_1 + y_2 + \cdots + y_n}{n} \end{array}\right\} \quad (3)$$

Also, with regard to the other quality variation correlation magnitudes $R_B$, $R_C$, $R_D$, the correlation function between the data stored in the manufacturing history data columns 34, 35, 36 and the data stored in the product quality data column 32 of the analysis data table shown in FIG. 3 is calculated.

The correlation function assumes a value as large as almost the maximum value 1 in the case where the product quality data column 32 and the process A manufacturing history data column 33 tend to change in synchronism with each other, and assumes a value as small as almost the minimum value 0 in the case where the product quality data column 32 and the process A manufacturing history data column 33 tend to change independently of each other. Thus, the correlation function can be used as an index of the quality variation correlation magnitude.

In spite of this, the quality variation correlation magnitude is not limited to the correlation function. As an alternative, for example, the regression formula for estimating the product quality history data from the manufacturing history data is constructed by the least squares method or the projection method to determine the quality variation correlation magnitude from the comparison of the regression coefficients.

Next, at step 2 (22 in FIG. 2), the correlation analysis module of quality variation 141 generates a correlation network model by drawing, with arrows, the edges 421, 422, 423, 424 having the quality variation correlation magnitudes $R_A$, $R_B$, $R_C$, $R_D$ as a graph coupling strength from the vertexes 431, 432, 433, 434 of the manufacturing history data toward the vertex 411 of the product quality data.

A specific computer process is explained. The computer 940 implementing the correlation analysis module of quality variation 141 stores the correlation network model shown in FIG. 11B as a quality variation correlation graph data table 50 shown in FIGS. 5A, 5B in a storage unit (not shown).

Arbitrary control numbers for the edges 421, 422, 423, 424 are employed and stored in the edge number column 51 of the quality variation correlation graph data table 50. A symbol indicating a directed graph with a determined causal direction is stored in the graph type column 52. Names indicating the vertexes 431, 432, 433, 434 of the manufacturing history data are stored in the starting point column 53. A name indicating the vertex 411 of the product quality information is stored in the final point column 54. The coupling strength column 55, on the other hand, has stored therein numerical values indicating the correlation magnitude between the starting and final points. The selected state column 56 is for storing the selected state as a candidate for the cause and remains empty as of process 2.

Next, step 3 is explained.

(Step 3)

At step 3 (33 in FIG. 2) of the quality variation cause analysis process shown in FIG. 2, the correlation analysis module of quality variation (141 in FIG. 1) of the causation analysis apparatus of quality variation (140 in FIG. 1) selects the candidates for the process causing the quality variation from the manufacturing history. The detailed process for selecting the candidates for the process causing the change in the product quality 411 from the manufacturing processes A431, B432, C433, D434 based on the graph coupling strength (quality variation correlation magnitudes $R_A$, $R_B$, $R_C$, $R_D$) of the correlation network model is explained with reference to FIG. 12.

This embodiment deals with the case in which the relation holds that $$R_B \cong R_D \gg R_C > R_A \quad (4)$$

between the quality variation correlation magnitudes $R_A$, $R_B$, $R_C$, $R_D$, although the invention is not limited to this relation.

This relation shows a case in which, of all the four quality variation correlation magnitudes, the correlation magnitude $R_B$ from process B432 to the product quality 411 and the correlation magnitude $R_D$ from process D434 to the product quality 411 are equivalent to or sufficiently larger than the other relations, while the correlation magnitude $R_C$ from process A433 to the product quality 411 is sufficiently smaller than the other correlation magnitudes and the correlation magnitude $R_A$ from process A431 to the product quality 411 is still smaller. The relative magnitude, however, can be automatically determined quantitatively by setting an appropriate threshold (not shown).

Based on the relative magnitude of the correlation magnitudes described above, the correlation analysis module of quality variation 141 extracts the edge 422 from process B432 to the product quality 411 and the edge 424 from process D434 to the product quality 411 out of the four edges 421, 422, 423, 424 of the quality variation correlation network model as candidates for the causation connection to the quality variation from the process causing the quality variation (indicated by solid lines in FIG. 12), and as shown in FIG. 5B, the "○ (correlation)" state is noted in the selected state column 56 of the quality variation correlation graph data table 50. On the other hand, the edge 423 from process C433 to the product quality 411 and the edge 421 from process A431 to the product quality 411 are deleted from the causation candidates (indicated by dashed line in FIG. 12) and the "X (no relation)" state is noted in the selected state column 56 of the quality variation correlation graph data table 50 as shown in FIG. 5B.

As shown in this example, in an ordinary manufacturing line having a chain of many serially connected processes, it is not always possible to determine a single manufacturing process causing the quality variation from the quality variation correlation network model alone.

Next, step 4 is explained.

(Step 4)

At step 4 (23 in FIG. 2) of the process executed by the causation analysis apparatus of quality variation shown in FIG. 2, the causation analysis module of quality variation (142 in FIG. 1) of the causation analysis apparatus of quality variation (140 in FIG. 1) generates a causal network model. The causation analysis module of quality variation 142 generates the quality variation causal network model as a directed graph in which the manufacturing history data by manufacturing process are expressed as vertexes (431, 432, 433, 434 in FIG. 1) all of which are assigned as starting and final points connected by edges (441, 442, 443, 451, 452, 461 in FIG. 1) to each other. Unlike the correlation network model generated by the correlation analysis module of quality variation (141 in FIG. 1) described above, however, the directions of the arrows attached to the edges connecting the vertexes (431, 432, 433, 434 in FIG. 1) of the manufacturing history data by the manufacturing process of the causal network model are not determined automatically.

The causation analysis module of quality variation 142, therefore, acquires the manufacturing sequence information relating to the time priority of the processes (which process is executed before which process) of the production line from the manufacturing sequence information control unit (130 in FIG. 1) thereby to determine the direction of the causal network model arrow automatically. The manufacturing sequence information is generally different for a different product type and cannot be stored in advance in the causation analysis module of quality variation (142 in FIG. 1).

Figure 13A:
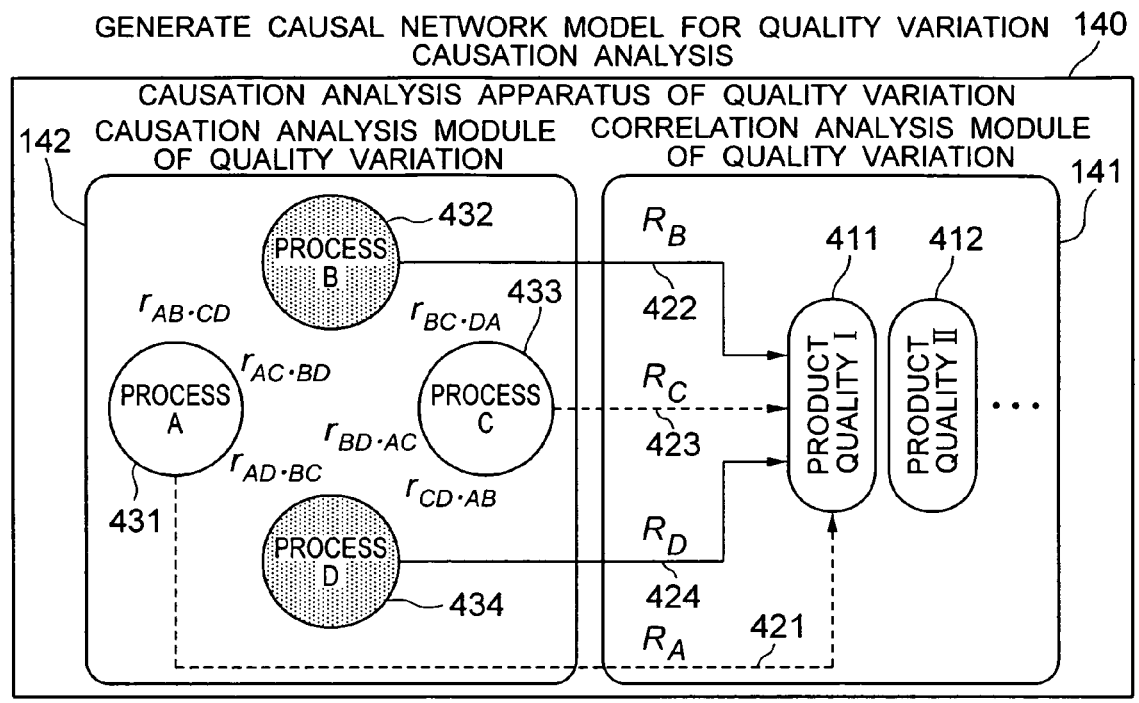
FIGS. 13A, 13B are diagrams for explaining the generation of a causal network model for analyzing the cause of quality variation.

The detailed process of generating the causal network model for quality variation causation analysis executed by the causation analysis module of quality variation 142 at step 4 (23 in FIG. 2) is explained with reference to FIG. 13. The causation analysis module of quality variation 142 first calculates the mutual correlation magnitudes $r_{AB \cdot CD}$, $r_{AC \cdot BD}$, $r_{AD \cdot BC}$, $r_{BC \cdot DA}$, $r_{BD \cdot AC}$, $r_{CD \cdot AB}$ of the manufacturing history data between two processes using the manufacturing history data columns 33, 34, 35, 36 of the analysis data table 30. For example, the data stored in the manufacturing history data columns 33, 34, 35, 36 for the processs of the analysis data table 30 of FIG. 3 are given as $$Xi = [x_{i1} \ x_{i2} \ \ldots \ x_{in}] \quad (5)$$

and the correlation matrix as $$\left. \begin{array}{l} RM = (r_{ij}) \\ r_{ij} = \dfrac{s_{ij}}{\sqrt{s_{ii} \cdot s_{jj}}} \\ s_{ij} = \dfrac{(x_{i1} - \bar{x})(x_{j1} - \bar{y}) + (x_{i2} - \bar{x})(x_{j2} - \bar{y}) + \cdots + (x_{in} - \bar{x})(x_{jn} - \bar{y})}{n - 1} \end{array} \right\} \quad (6)$$

Then, the causation analysis module of quality variation 142 calculates the correlation magnitude $r_{AB \cdot CD}$ of the manufacturing history data between process A and process B free of the effect from processes C and D as a partial correlation function from the following equation:

$$\left. \begin{array}{l} r_{AB \cdot CD} = -\dfrac{\rho^{AB}}{\sqrt{\rho^{AA} \cdot \rho^{BB}}} \\ \begin{bmatrix} \rho^{AA} & \rho^{AB} & \rho^{AC} & \rho^{AD} \\ \rho^{AB} & \rho^{BB} & \rho^{BC} & \rho^{BD} \\ \rho^{AC} & \rho^{BC} & \rho^{CC} & \rho^{CD} \\ \rho^{AD} & \rho^{BD} & \rho^{CD} & \rho^{DD} \end{bmatrix} = (RM)^{-1} \end{array} \right\} \quad (7)$$

Also for the mutual correlation magnitudes $r_{AC \cdot BD}$, $r_{AD \cdot BC}$, $r_{BC \cdot DA}$, $r_{BD \cdot AC}$, $r_{CD \cdot AB}$ of the manufacturing history data between the other process, the partial correction function is calculated by a similar method. Nevertheless, the inter-process correlation magnitude is not limited to the partial correlation function. As an alternative, the regression formula for estimating the corresponding product quality history data is constructed from the manufacturing history data of the other process using the least squares method or the projection method, and the correlation magnitude between the process is determined from the correlation function between the predictive errors of the regression formula.

Next, at step 4 (24 in FIG. 2), the causation analysis module of quality variation 142 generates a causal network model by drawing, without arrows, the edges 441, 442, 443, 451, 452, 461 having the inter-process mutual correlation magnitudes $r_{AB \cdot CD}$, $r_{AC \cdot BD}$, $r_{AD \cdot BC}$, $r_{BC \cdot DA}$, $r_{BD \cdot AC}$, $r_{CD \cdot AB}$ as a graph coupling strength between all the vertexes 431, 432, 433, 434 of the manufacturing history data. At this process, the causation analysis module of quality variation 142 has yet to acquire the manufacturing sequence information on the time priority (which process is executed before which process) between the process, and therefore the correlation magnitudes are generated as an undirected graph without arrows along the edges.

Figure 13B:
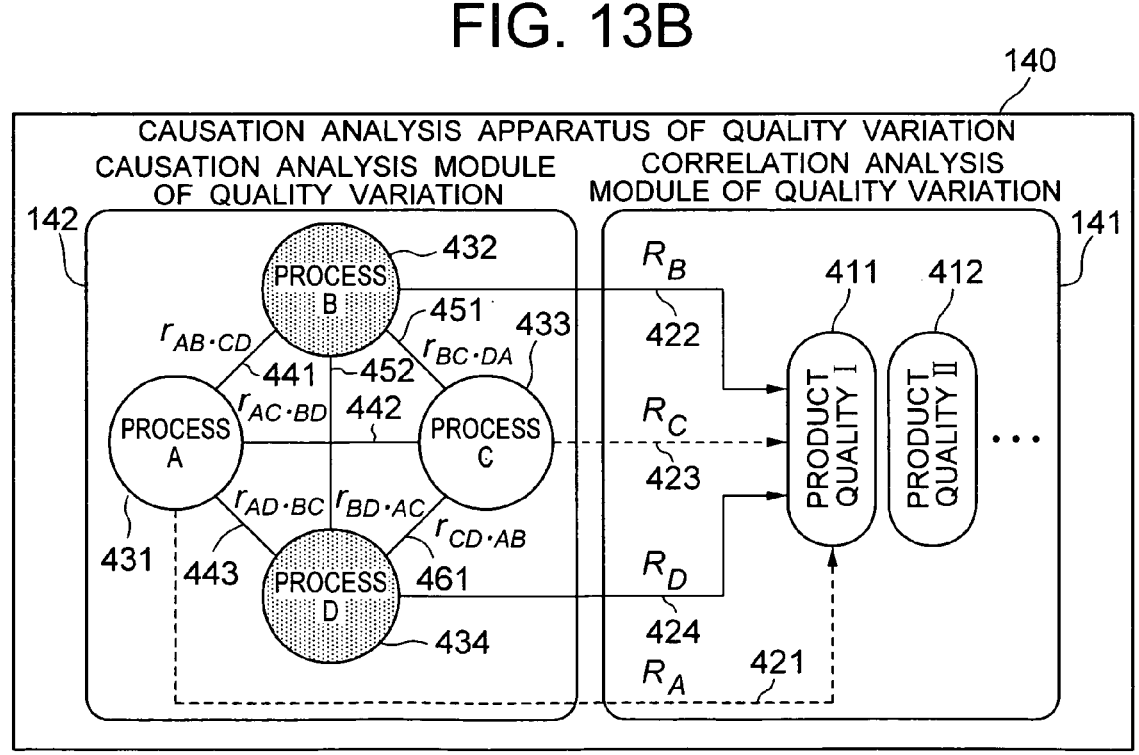

The computer process is specifically described. The correlation network model shown in FIG. 13B is generated as a quality variation causation graph data table 60 specifically shown in FIG. 6A by a computer 940 implementing the causation analysis module of quality variation 142 and stored in a storage unit (not shown).

Arbitrary control numbers corresponding to the edges 441, 442, 443, 451, 452, 461 are employed and stored in the edge number column 61 of the graph data table 60. A symbol indicating an undirected graph in which the causation directions are not yet determined is stored in the graph type column 62. The names indicating the vertexes 431, 432, 433, 434 of the manufacturing history data located on the left and right sides of each edge are stored in the starting point column 63 and the final point column 64.

As of step 4, the causal network model is provided as an undirected graph, and the sequence of the starting and final points is meaningless. The names indicating the vertexes, therefore, are assigned a "(provisional)" symbol. Numerical values of the correlation magnitude between vertexes are stored in the coupling strength column 65. The selected state column 66, in which the selected state is stored as a candidate for the cause of quality variation, remains empty as of step 4.

Next, step 5 is explained.

(Step 5)

At step 5 (25 in FIG. 2) of the quality variation cause analysis process shown in FIG. 2, the causation analysis module of quality variation (142 in FIG. 1) of the causation analysis apparatus of quality variation (140 in FIG. 1) extracts the inter-process variation propagation relation. The detailed process of extracting the inter-process variation propagation, i.e. the cause and effect between a variation-transmitting process which causes a quality variation and a variation-receiving process which receives the quality variation based on the graph coupling strength (the inter-process mutual correlation magnitudes $r_{AB \cdot CD}$, $r_{AC \cdot BD}$, $r_{AD \cdot BC}$, $r_{BC \cdot DA}$, $r_{BD \cdot AC}$, $r_{CD \cdot AB}$) of the causal network model is explained in detail with reference to FIG. 15. According to this embodiment, assume that the following relation holds between the inter-process mutual correlation magnitudes $r_{AC \cdot BD}$, $r_{AC \cdot BD}$, $r_{AD \cdot BC}$, $r_{BC \cdot DA}$, $r_{BD \cdot AC}$, $r_{CD \cdot AB}$, although the invention is not limited to this relation:

$$r_{BD \cdot AC} \cong r_{AC \cdot BD} >> r_{AB \cdot CD} \cong r_{BC \cdot DA} \cong r_{CD \cdot AB} \cong r_{AD \cdot BC} \qquad (8).$$

This relation shows that, of all the six inter-process correlation magnitudes, the correlation magnitude $r_{BD \cdot AC}$ between process B432 and process D434 and the correlation magnitude $r_{AC \cdot BD}$ between process A431 and process C433 are about the same and sufficiently larger than the other correlation magnitudes, while the correlation magnitude $r_{AB \cdot CD}$ between process A431 and process B432, the mutual correlation magnitude $r_{BC \cdot DA}$ between process B432 and process C433, the mutual correlation magnitude $r_{CD \cdot AB}$ between process C433 and process D434 and the mutual correlation magnitude $r_{AD \cdot BC}$ between process A431 and process D434 are about the same and sufficiently smaller than the other correlation magnitudes. The relative magnitude can be automatically determined quantitatively by setting an appropriate threshold value.

At step 5 (25 in FIG. 2), the causation analysis module of quality variation 142, to determine the inter-process variation propagation relation, first extracts a partial graph of variation propagation from the causal network model based on the graph coupling strength (inter-process correlation magnitudes).

From the relative magnitude of the inter-process correlation magnitudes, the edge 442 between process. A431 and C433 and the edge 452 between process B432 and D434 are extracted out of all the six edges 441, 442, 443, 451, 452, 461 of the quality variation causal network model, as a partial undirected graph indicating the inter-process variation propagation (designated by solid line in FIGS. 14A, 14B).

As shown in FIG. 6B, the "○ (correlation)" state is noted in the selected state column 66 of the edges No. 2 (442) and No. 5 (441) of the quality variation causation graph data table 60.

On the other hand, the edge 441 between process A431 and B432, the edge 451 between process B432 and C433, the edge 461 between process C433 and D434 and the edge 443 between process A431 and D434 are deleted as a partial undirected graph indicating no inter-process variation propagation (shown by dashed line in FIG. 15), and the "X (no relation)" state is noted in the selected state column 66 of edges No. 1 (441), No. 3 (443), No. 4 (451) and No. 6 (461) of the quality variation causation graph data table 60 as shown in FIG. 6B.

Next, the causation analysis module of quality variation 142, to determine the causation direction of the undirected graph showing the inter-process variation propagation, converts the undirected graph of variation propagation into a directed graph indicating the causation direction based on the manufacturing sequence information. In sequence to covert the undirected graph into a directed graph of the quality variation causal network model, the causation analysis module of quality variation 142 acquires the manufacturing sequence information and automatically determines the direction of the graph by translating the time priority (which process is executed before which process) between the process.

Which process is executed or which process is executed before which process is defined for each product type and may be different for a different product type, and therefore cannot be stored beforehand in the causation analysis module of quality variation 142. Instead, the manufacturing sequence information is required to be acquired for each product type flowing on the production line.

According to this embodiment, the causation analysis module of quality variation 142 is configured to acquired the manufacturing sequence information (131 in FIG. 1) for each product type from the manufacturing sequence information management apparatus (130 in FIG. 1). In the case where each product in progress is automatically analyzed as a simple component unit making up a product, the manufacturing sequence information management apparatus may be implemented as a part of a product design system (not shown) to acquire the design BOM (bill of material) always prepared as a part of the product design information at the time of product design.

As an alternative, in the case where automatic analysis is conducted for each part having a complicated manufacturing process, on the other hand, the manufacturing sequence information management apparatus may be implemented as a part of a process design system (not shown) to acquire a manufacturing BOM prepared from a design BOM as a part of the process design information at the time of process design.

In the process of producing a key device such as the semiconductor wafer of a system LSI, the display panel or the head of a hard disk drive, the process design information controlled under the name of "process flow" may be acquired.

An example of the manufacturing BOM corresponding to the production line 1 of FIG. 1 is shown in FIG. 4. The manufacturing BOM 40 has a data structure and expression of a tree structure in which a product is manufactured from bottom up. Individual materials, parts, products in progress or products are indicated in rectangular boxes, while processing means for processing and assembly are shown in circles. In association with the production line 1 shown in FIG. 1, the component part box 41 in the lowermost layer of the manufacturing BOM 40 represents a material, and the intermediate component part boxes 43, 45, 47 the products in progress A, B, C processed at process A42, B44, C46, respectively. The product in progress C in the component part box 47 is processed at process D48 and becomes the end product in the component part box 49 in the uppermost layer.

The production line 1 shown in FIG. 1 represents a processing line and is expressed in a chain of serially-connected process. In the case of an assembly line, the assembly of parts is expressed by merging parallel process. The sequence of the process is changed or a specified process is omitted depending on the product type, and therefore the information expressed in the manufacturing BOM 40 is switched by the product type tags 40a, 40b, 40c.

The causation analysis module of quality variation 142 acquires the manufacturing BOM (40 in FIG. 4) as the manufacturing sequence information 131, and the undirected graph (FIG. 14A) of the quality variation causal network model is automatically converted into a directed graph (FIG. 14B) having a definite causation direction by an inter-process time priority translation processing unit (not shown) following the process described below.

First, the inter-process time priority translation processing unit, from the acquired manufacturing BOM 40 shown in FIG. 4, extracts the fact that process A42 for processing the material in the component part box 41 in the lowermost layer into the product in progress A in the component part box 43 is the uppermost process and has the highest time priority. Thus, an arrow directed from process A431 toward process B432 is automatically assigned as a causation direction of the edge 441 shown in FIG. 14A. In similar fashion, an arrow directed from process A431 toward process C433 is automatically assigned as a causation direction of the edge 442, and an arrow directed from process A431 toward process D434 as a causation direction of the edge 443 (FIG. 14B).

The process executed by the computer is explained specifically. A computer 940 implementing the causation analysis module of quality variation 142 searches the starting point column 63 and the final point column 64 of the quality variation causation graph data table 60 as a data operation to express a graph and thus extracts the edge No. 1 (441), the edge No. 2 (442) and the edge No. 3 (443) as edges containing process A431, as shown in FIG. 7A. Process A431, if included in the final point column 64, is replaced horizontally with the vertex name (process name) in the starting point column 63. Now, the causation direction is determined, and therefore the term "(provisional)" is deleted from the vertex name and a symbol indicating a directed graph with a definite causation direction is stored in the graph type column 62.

Next, the selected state column 66 is searched for the extracted three edges, and the edge No. 2 (442) in "○ (correlation)" state but not in "X (no relation)" state is extracted. The causatio direction of the edge No. 2 (442) is already determined, and therefore the "○ (correlation)" state in the selected state column 66 is rewritten into the "causation" state.

The inter-process time priority translation processor extracts, from the acquired manufacturing BOM 40 shown in FIG. 4, the fact that process B44 to process the product in progress A in the component part box 43 into the product in progress B in the next component part box 45 is temporally ahead of the processing process C46, D48 in lower layers of the hierarchy. Thus, an arrow directed from process B432 toward process C433 is automatically assigned as a causation direction of the edge 451 shown in FIG. 14A, and an arrow directed from process B432 toward process D434 is automatically assigned as a causation direction of the edge 452 (FIG. 14B).

Specifically, the computer 940 implementing the causation analysis module of quality variation 142 searches the starting point column 63 and the final point column 64 of the quality variation causation graph data table 60 as a data operation to express a graph and thus extracts the edge No. 4 (451) and the edge No. 5 (452) containing process B432. At the same time, process B432, if included in the final point column 64, is replaced horizontally with the vertex name (process name) in the starting point column 63. Now, the causation direction is determined, and therefore the term "(provisional)" is deleted from the vertex name and a symbol indicating a directed graph with a definite causation direction is stored in the graph type column 62.

Next, the selected state column 66 for the two extracted edges is searched, and the edge No. 5 (452) not in "X (no relation)" state but in "○ (correlation)" state is extracted. Since the causation direction of the edge No. 5 (452) is already determined, the "○ (correlation)" state in the selected state column 66 is rewritten into the "causation" state.

From the acquired manufacturing BOM 40 shown in FIG. 4, the inter-process time priority translation processor extracts the fact that process C46 to process the product in progress B in the component part box 45 into the product in progress C in the component part box 47 is temporally ahead of the process D48 in a lower layer of the hierarchy. Thus, an arrow directed from process C433 toward process D434 is automatically assigned as a causation direction of the edge 461 shown in FIG. 14B (FIG. 14B).

Specifically, the computer 940 implementing the causation analysis module of quality variation 142 searches the starting point column 63 and the final point column 64 of the quality variation causation graph data table 60 as shown in FIG. 8, and extracts the edge No. 6 (461) containing process C433. At the same time, process C433, if included in the final point column 64, is replaced horizontally with the vertex name (process name) in the starting point column 63.

Now that the causation direction is determined, the term "(provisional)" is deleted from the vertex name and a symbol indicating a directed graph with a definite causation direction is stored in the graph type column 62. The selected state column 66 is searched for the extracted edge, and since the edge not in "X (no relation)" state but in "○ (correlation)" state cannot be extracted, the process is terminated.

Finally, the inter-process time priority translation processor, from the acquired manufacturing BOM 40 shown in FIG. 4, extracts the fact that process. C48 to process the product in progress C in the component part box 47 into the end product in the component part box 49 is the processing process in the lowermost layer of the hierarchy and temporally ahead of none of the other process. Thus, the process of automatic translation and extraction of the causation direction is ended.

Figure 14A:
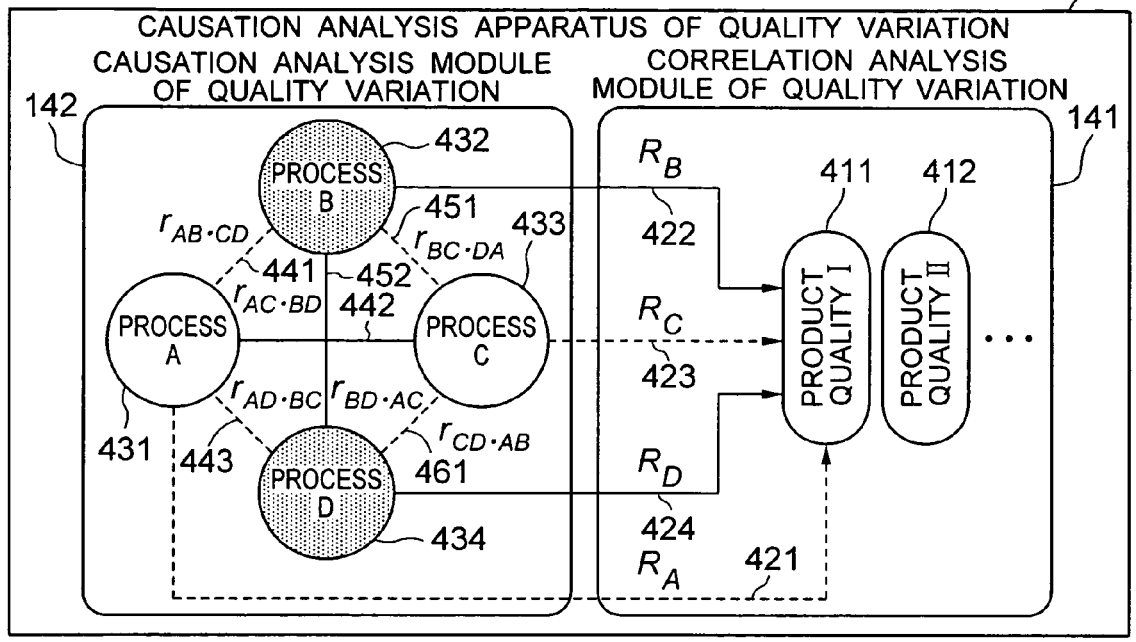
FIGS. 14A, 14B are diagrams for explaining the extraction of the inter-process causation connection using a causal network model.
Figure 14B:
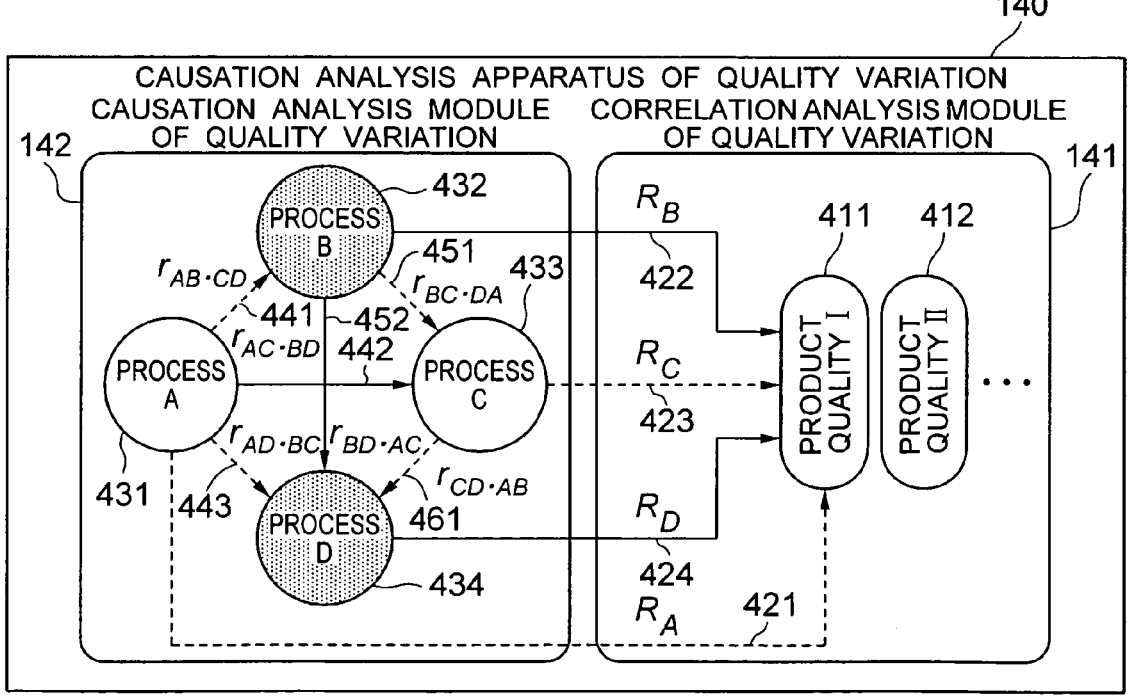
Figure 15:
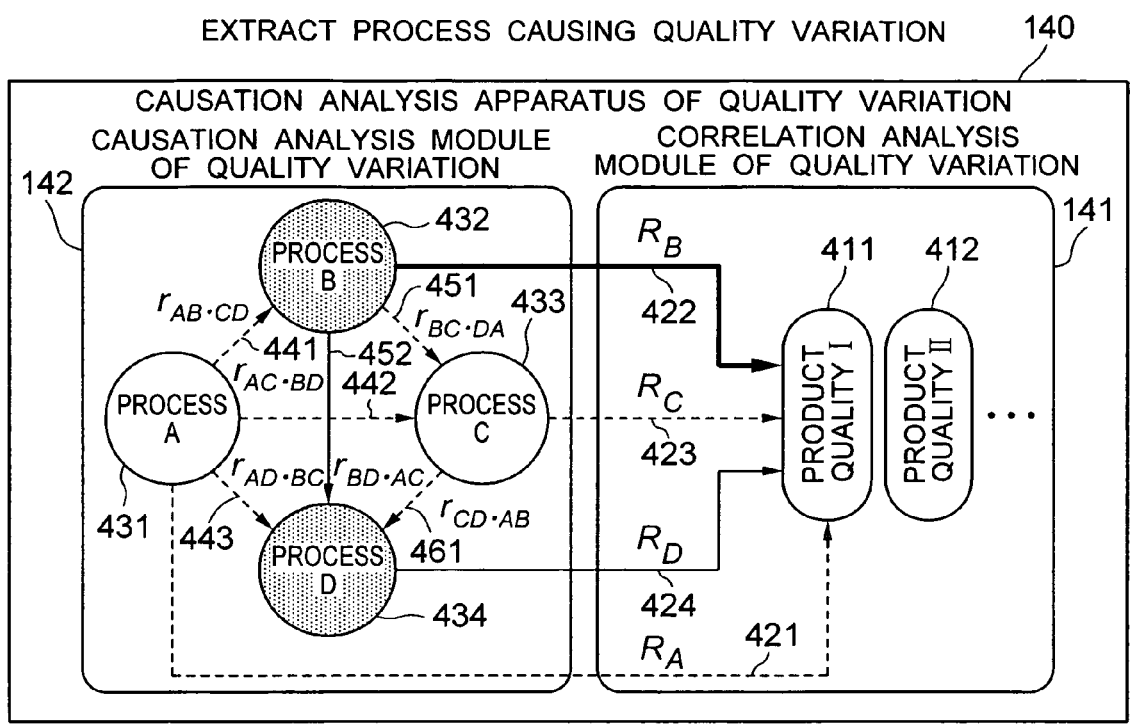
FIG. 15 is a diagram for explaining the extraction of the process causing the quality variation.
Figure 16:
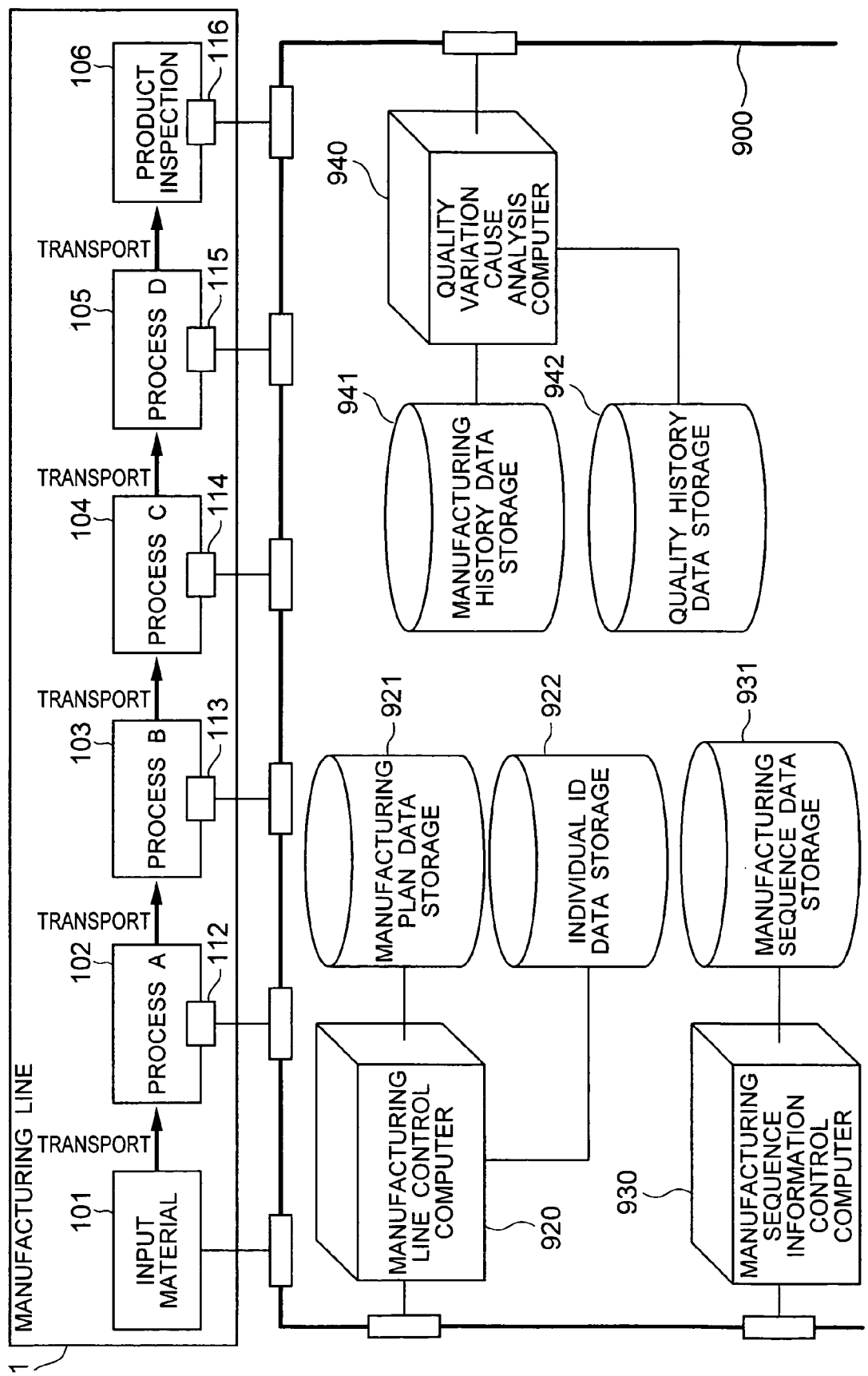
FIG. 16 is a diagram showing a computer system for realizing the functions of the product quality control system.

As the result of the aforementioned process of extracting the causation direction by the time priority translation of the manufacturing BOM 40 in the inter-process time priority automatic translation processor (not shown), the causation analysis module of quality variation 142 converts the quality variation causal network model shown in FIG. 15 from the undirected graph of FIG. 14A to the directed graph of FIG. 14B.

The extraction of a partial graph of variation propagation in first subprocess (1) and the conversion to the directed graph indicating the causation in second subprocess (2) of process 5 of the causation analysis apparatus of quality variation shown in FIG. 2 can be conducted in reverse order without any problem. Also, the generation and analysis of the correlation network model at steps 2 to 3 of the process in the causation analysis apparatus of quality variation shown in FIG. 2 and the generation and analysis of the causal network model at steps 4 to 5 can be conducted in reverse order with equal effect.

Next, step 6 is explained.

(Step 6)

At step 6 (26 in FIG. 2) of the process of the causation analysis apparatus of quality variation shown in FIG. 2, the causation analysis apparatus of quality variation (140 in FIG. 1) automatically determines the process causing the quality variation. The detailed operation to automatically determine the manufacturing process constituting the fundamental cause of quality variation by tracing the directed graph of the correlation network model and the causal network model from the product quality is explained with reference to FIGS. 8, 9, 10, 15.

Figure 10:
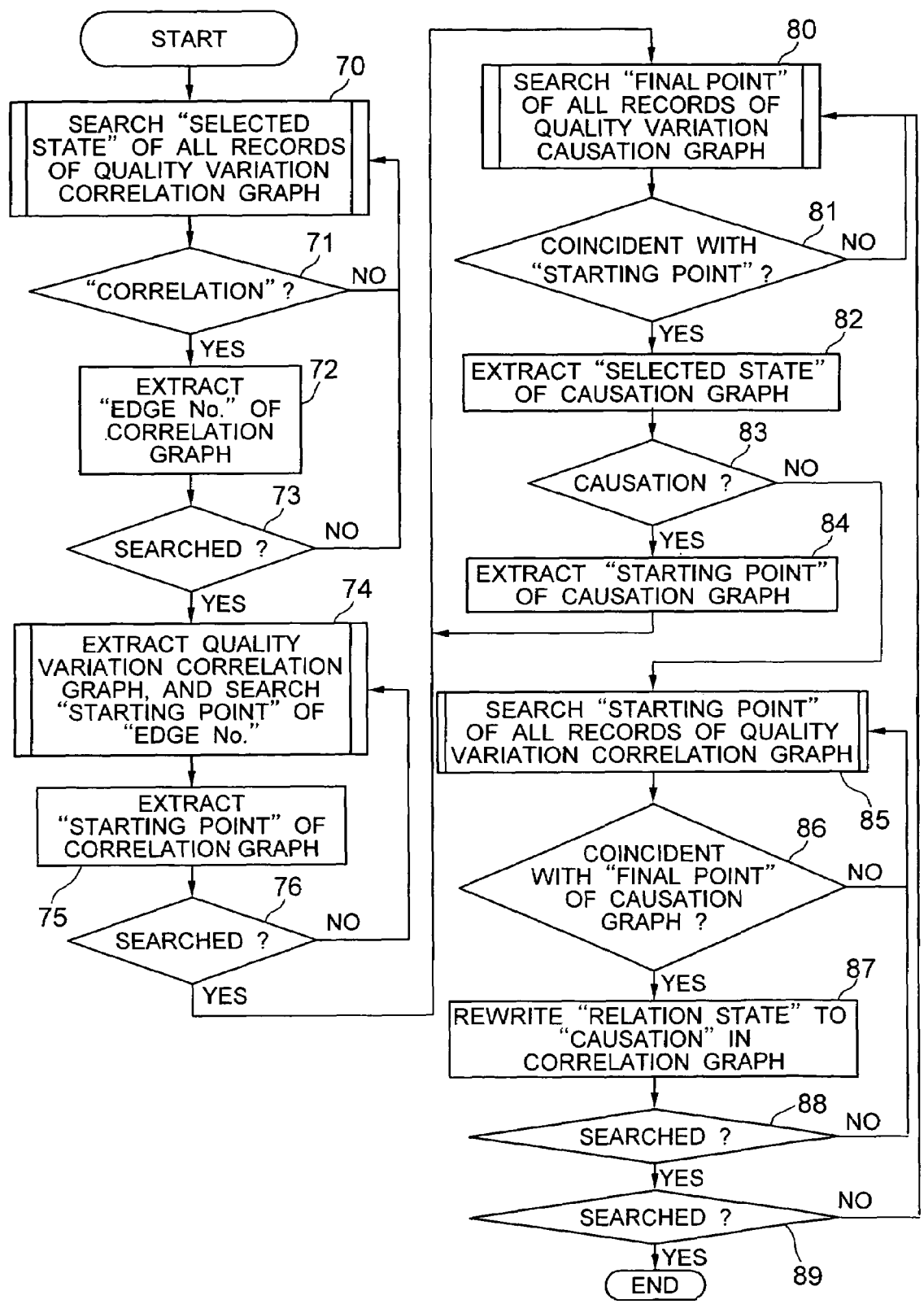
FIG. 10 is a diagram for explaining the internal expression of the correlation network model graph in a computer and the steps of determining the process causing the quality variation.

FIG. 8 is a diagram for explaining the quality variation causation graph data table. FIG. 9 is a diagram for explaining the quality variation correlation graph data table. FIG. 10 is a diagram for explaining the algorithm for automatically determining the manufacturing process causing the quality variation. FIG. 15 is a diagram for explaining the state of the network model after automatically determining the process causing the quality variation.

First, the causation analysis apparatus of quality variation 140 traces back the partial directed graph extracted from the correlation magnitudes in the correlation network model. All the candidate production process that may have caused the product quality variation are automatically traced back from the product quality. The edge 422 is traced back from the product quality 411 of the correlation network model generated at step 3 to automatically extract process B432, and also the edge 424 is traced back from the product quality 411 to automatically extract process D434.

As a specific operation of the computer, the computer 940 implementing the causation analysis module of quality variation 142 searches the selected state column 56 of the quality variation correlation graph data table 50 shown in FIG. 5B (steps 70, 73 in FIG. 10) and extracts the edge No. 2 (422) and the edge No. 4 (424) in "○ (correlation)" state (steps 71, 72 in FIG. 10). The starting point column 53 of the two edges thus extracted is searched (steps 74, 76 in FIG. 10), and process B432 at the starting point of the edge No. 2 (422) and process D434 at the starting point of the edge No. 4 (424) are extracted (step 75 in FIG. 10).

Next, the causation analysis apparatus of quality variation 140 rows upstream the partial directed graph extracted from the mutual correlation magnitudes in the causal network model automatically up to the production process providing the fundamental cause of quality variation from an arbitrary production process. Of the two candidates for the variation causing process of the causal network model generated at step 5, the edge 452 is traced back from process D434 to automatically extract process B432.

On the other hand, the absence of an edge that can be traced back from process B432 is detected. In this way, the fact that the process providing the fundamental cause of variation of the product quality 411 is process B432 is automatically determined. It is also automatically determined that the route from process B432 through the edge 422 to the product quality 411 constitutes a direct variation pass, and the route from process B432 through the edge 452 to process D434 and further through the edge 424 to the product quality 411 makes up an indirect variation pass.

As a specific computer operation, the computer 940 implementing the causation analysis module of quality variation 142 searches the final point column 64 of the quality variation causation graph data table 60 shown in FIG. 8 (steps 80, 89 in FIG. 10), and extracts the edge No. 1 (441) with the final point at process B432 and the edge No. 3 (443), the edge No. 5 (452) and the edge No. 6 (461) with the final point at process D434 (step 81 in FIG. 10).

First, the selected state column 66 of the edge No. 1 (441) with the final point at process B432 is searched, and "X (no relation)" state is extracted (step 82 in FIG. 10). Also, the absence of another edge that can be traced back from process B432 is detected (step 83 in FIG. 10). The final point traced to from the product quality 411 is process B432, and therefore, the quality variation causation analysis computer 940, as shown in FIG. 9, notes the "causation" state in the selected state column 56 of the edge No. 2 (422) of the quality variation correlation graph data table 50 (steps 85, 86, 87, 88 in FIG. 10).

Next, the selected state column 66 of the edge No. 3 (443), the edge No. 5 (452) and the edge No. 6 (451) with the final point at process D434 is searched, and the edge No. 3 (443) is extracted as "X (no relation)" state, the edge No. 5 (452) as "causation" state and the edge No. 6 (461) as "X (no relation)" state (step 82 in FIG. 10).

Thus, the edge No. 5 (452) is extracted as an edge that can be traced back from process D434, and the starting point column 63 thereof is searched to extract process B432 (step 84 in FIG. 10). As described above, the absence of an edge that can be traced back from process B432 is detected again (steps 80, 81, 82, 83 in FIG. 10) thereby ending the tracing back.

As described above, the final point traced to from the product quality 411 is only process B432, and therefore the quality variation causation analysis computer 940, as shown in FIG. 9, notes (overwrites) the "causation" state in the selected state column 56 of the edge No. 2 (422) of the graph data table 50 (steps 85, 86, 87, 88 in FIG. 10).

Finally, the quality variation causation analysis computer 940, searching the selected state column 56 of the graph data table 50, extracts all the edges in "causation" state, and then searching the starting point column 53 thereof, extracts all the process considered to cause the quality variation. The result of this extraction is transmitted to the worker by display on the screen or to another system (not shown) such as an equipment control system.

In this way, the causation analysis apparatus of quality variation 140 shown in FIG. 1 is configured to include the causation analysis module of quality variation 142 in addition to the correlation analysis module of quality variation 141, and the causation analysis module of quality variation 142 is configured to have the feature of automatically generating and analyzing the quality variation causal network model in accordance with the product type based on the inter-process time priority translation from the manufacturing sequence information 131 externally generated and stored. Thus, the process providing the cause of product quality variation can be automatically determined and extracted.

Embodiment 2

The product quality control system according to a second embodiment of the invention is explained below with reference to FIGS. 17 to 30. The second embodiment deals with the process of the invention for analyzing an actual product.

Figure 18A:
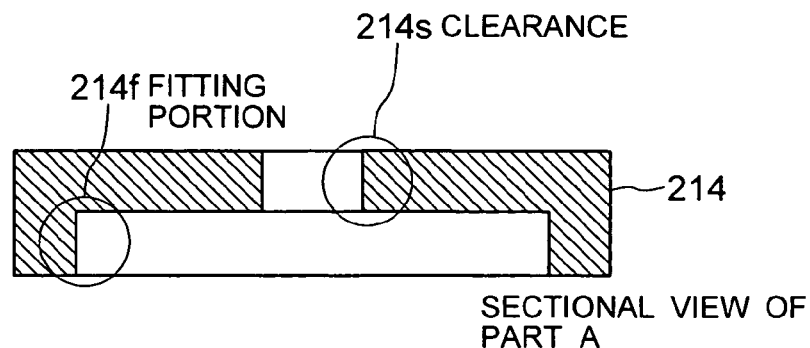
FIGS. 18A, 18B, 18C are schematic diagrams showing a cross section of a product.
Figure 18B:
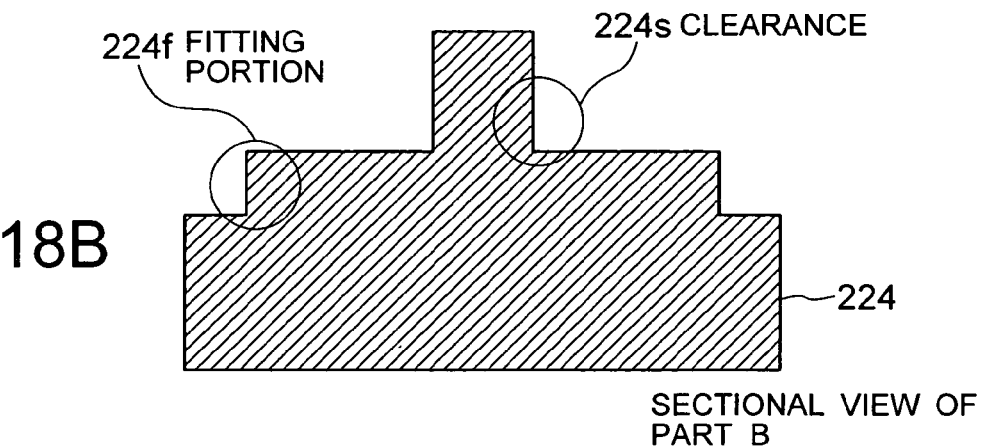
Figure 18C:
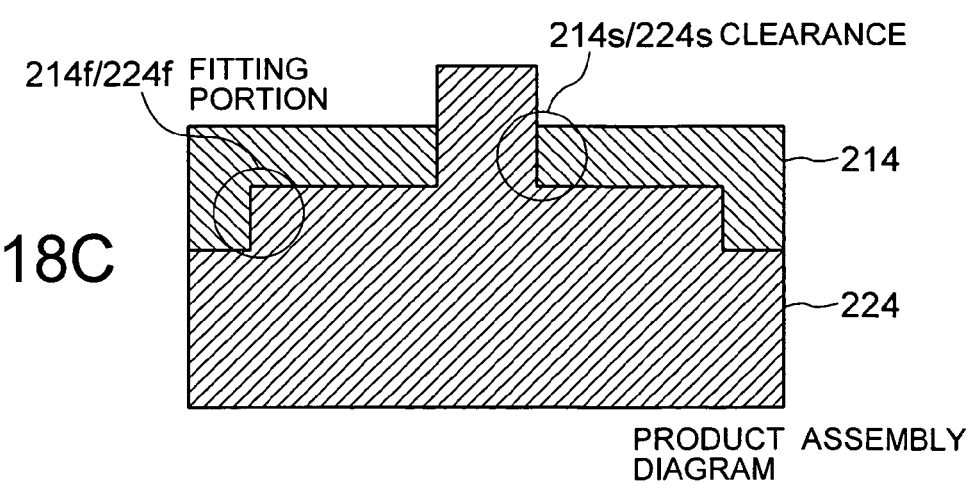

FIGS. 17 and 18A to 18C are diagrams for explaining a product subjected to quality variation cause analysis according to the invention. FIG. 17 shows the appearance of the product. FIG. 18A is a sectional view of a part A214, FIG. 18B a sectional view of a part B224, and FIG. 18C a diagram for explaining the assembly of a product 232.

The product 232 is assembled by fitting the part A214 and the part B224 with each other. The concave portion 214f of the part A214 and the convex fitting portion 224f of the part B224 constitute fitting portions, while the hole 214s of the part A214 and the convex portion (shaft) 224s of the part B224 make up clearance portions.

Specifically, when the fitting portions 214f, 224f are set in position, the clearance portions 214s, 224s require a predetermined gap, and the size of this gap is regarded as the quality of the product 232. The product 232 is shown in simplified form for the convenience of explanation. Assuming that the part A214 is a cover flange and the part B224 as an integrated part of a rotor and a stator fixed on the body, a simplified motor assembly results.

FIGS. 19A to 19C are diagrams for explaining the processing of the part A214. FIG. 19A shows the stock A210 of the part A214, FIG. 19B an intermediate part A212 after boring, and FIG. 19C a completed part A214 after cutting the fitting portions.

Figure 20A:
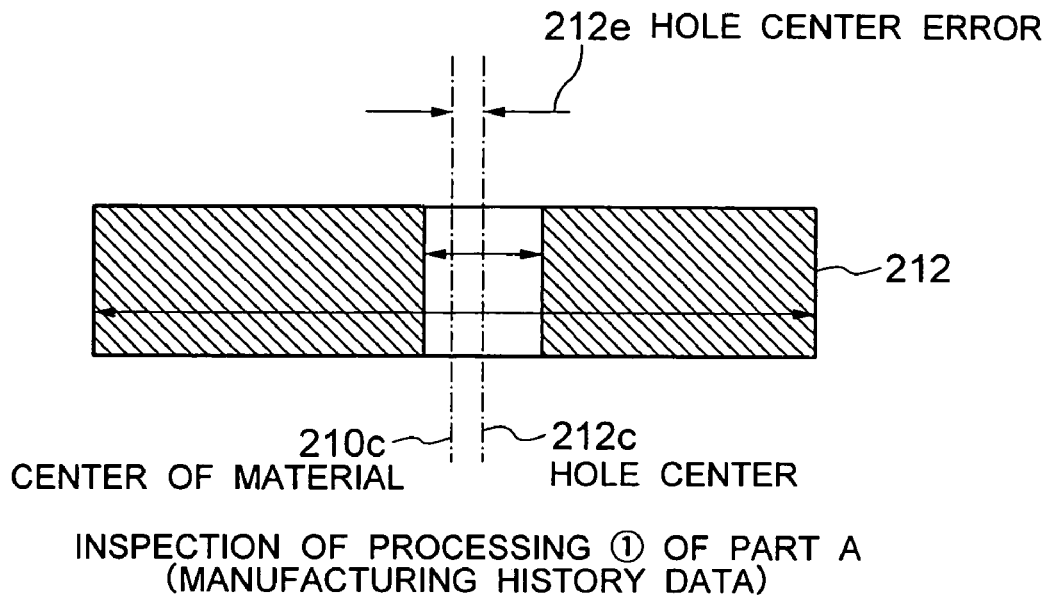
FIGS. 20A, 20B are diagrams showing the inspection items as the manufacturing history data of the part A.
Figure 20B:
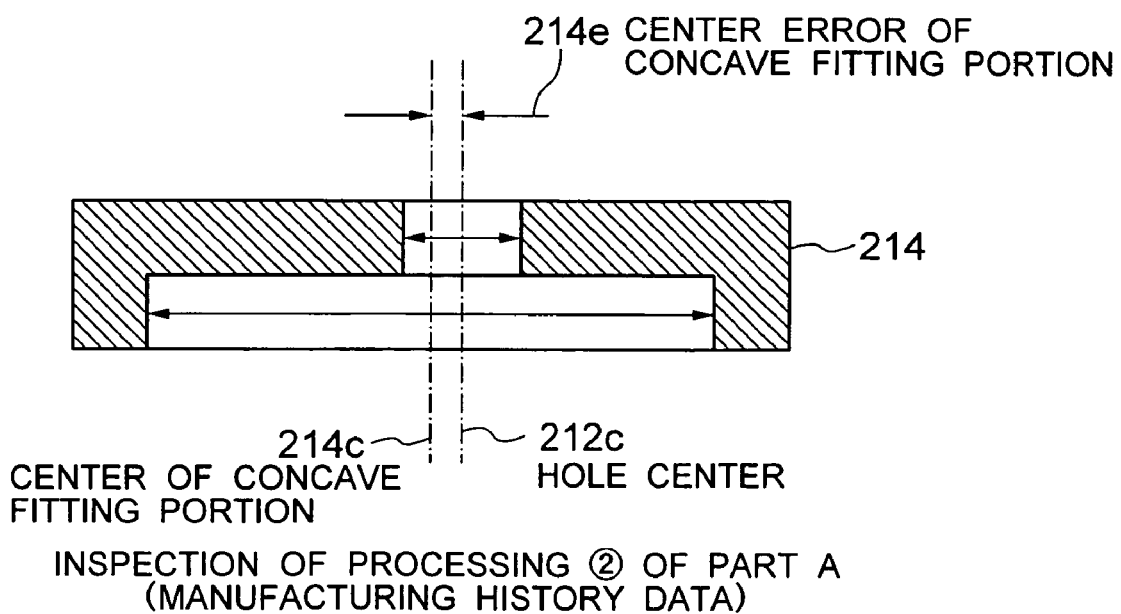

FIGS. 20A, 20B are diagrams for explaining the individual inspection items providing the manufacturing history data of the intermediate part A212 and the completed part A214. FIG. 20A shows the specifics of inspection of the boring process for the intermediate part A212, in which the error 212e of the hole center 212c from the contour center 210c is inspected. FIG. 20B shows the specific of inspection of the cutting process for the fitting portions of the completed part A214, in which the error 214e of the fitting portion center 214c from the hole center 212c is inspected.

FIGS. 21A, 21B, 21C are diagrams for explaining the processing of the part B224. FIG. 21A shows a stock B220 of the part B224, FIG. 21B an intermediate part B222 after cutting the convex portion, and FIG. 21C a completed part B224 after cutting the fitting portions.

Figure 22A:
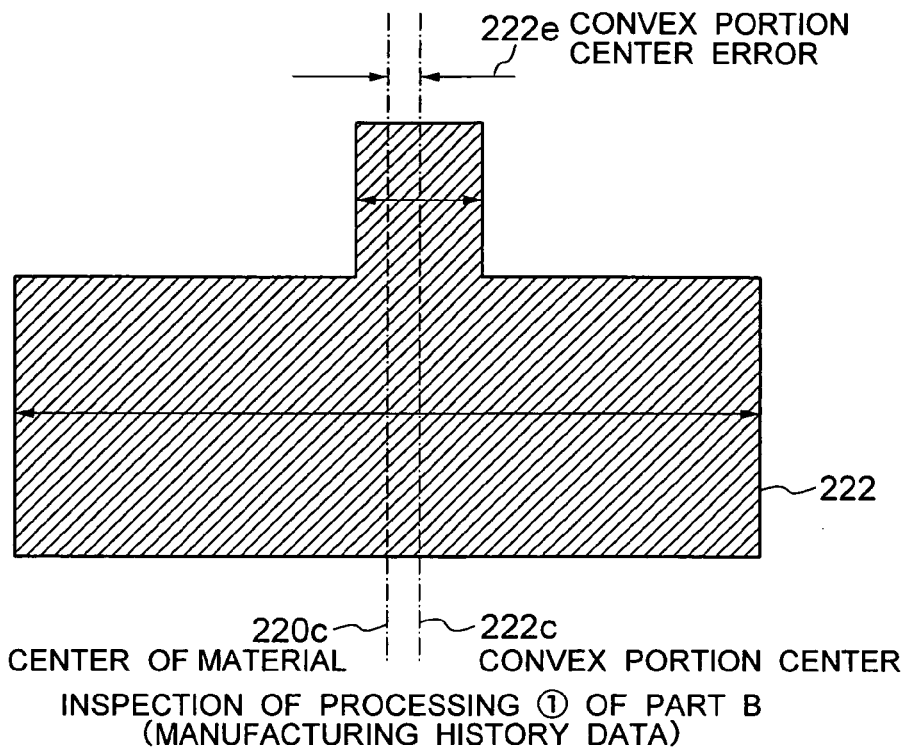
FIGS. 22A, 22B are diagrams showing the inspection items as the manufacturing history data of the part B.
Figure 22B:
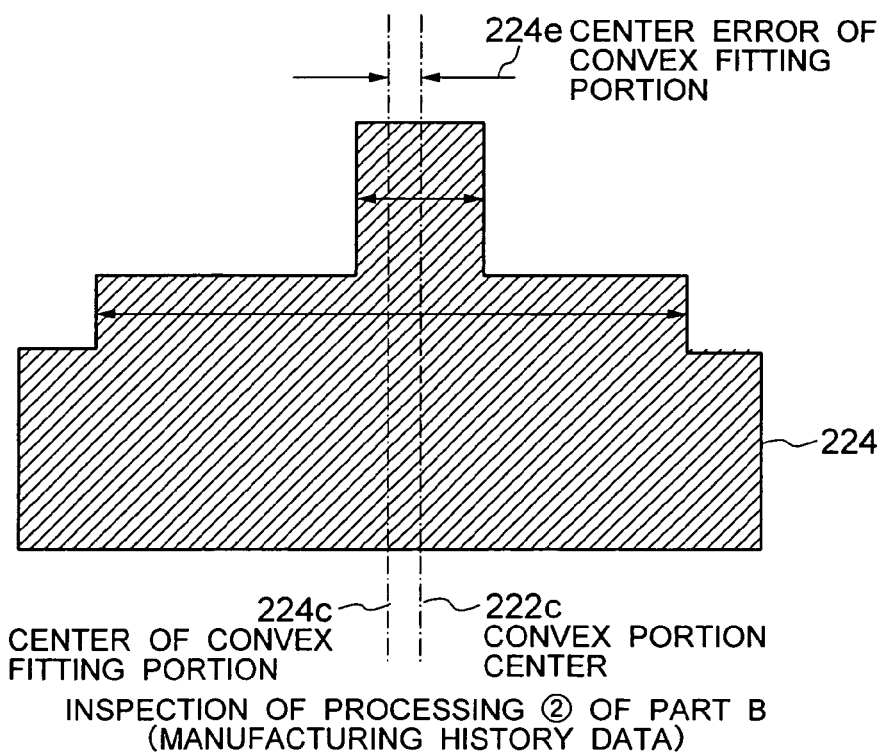

FIGS. 22A, 22B are diagrams for explaining the individual inspection items providing the manufacturing history data of the intermediate part B222 and the completed part B224. FIG. 22A shows the specifics of the inspection of the process of cutting the convex portion of the intermediate part B222, in which the error 222e of the convex portion center 222c from the contour center 220c is inspected. FIG. 22B shows the specifics of inspection of the process of cutting the fitting portions of the completed part B224, in which the error 224e of the fitting portion center 224c from the convex portion center 222c is inspected.

Figure 23:
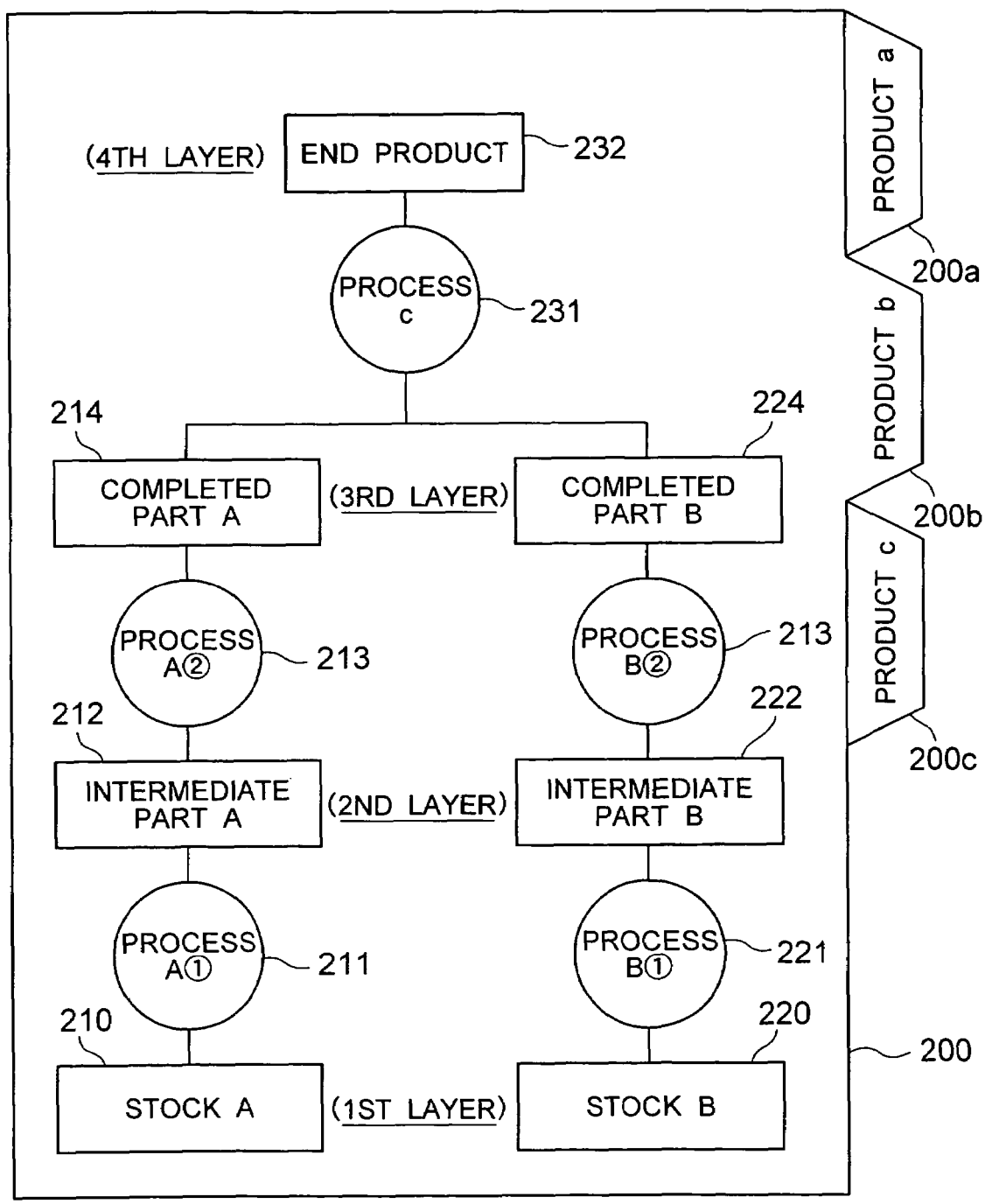
FIG. 23 is a diagram showing a manufacturing BOM.

FIG. 23 is a diagram for explaining the manufacturing BOM (bill of material) of the product 232 shown in FIG. 17. The manufacturing BOM 200 is stored in the manufacturing sequence information management apparatus (130 in FIG. 1) for each product type, and selectable by the tags 200a, 200b, 200c. In the manufacturing BOM, time is generally advanced from bottom up, and process are described from the stock, processing, assembly and the product in that order.

The manufacturing BOM shown in FIG. 23 contains the following description. The stock A210 and stock B220 are described in the lowermost first layer, and being passed through process A(1) (boring) 211 and process B(1) (cutting convex portion) 221, processed into an intermediate part A212 and an intermediate part B222, respectively, in the second layer. The intermediate part A212 and the intermediate part B222 in the second layer, through process A(2) (cutting concave fitting portion) 213 and process B(2) (cutting convex fitting portion) 223, are processed into a completed part A214 and a completed part B224, respectively, in the third layer. The completed part A214 and the completed part B224 in the third layer, through process C (assembly) 231, are completed into the end product 233 in the fourth layer.

FIGS. 24A, 24B, 25A, 25B are diagrams for explaining the temporal transition (or individual work transition) of the manufacturing history data of four processes 211, 213, 221, 223 of the manufacturing BOM (200 in FIG. 23). The manufacturing history data is arbitrary one liable to change during the production. According to this embodiment, however, all of them are the individual inspection information explained above.

Figure 24A:
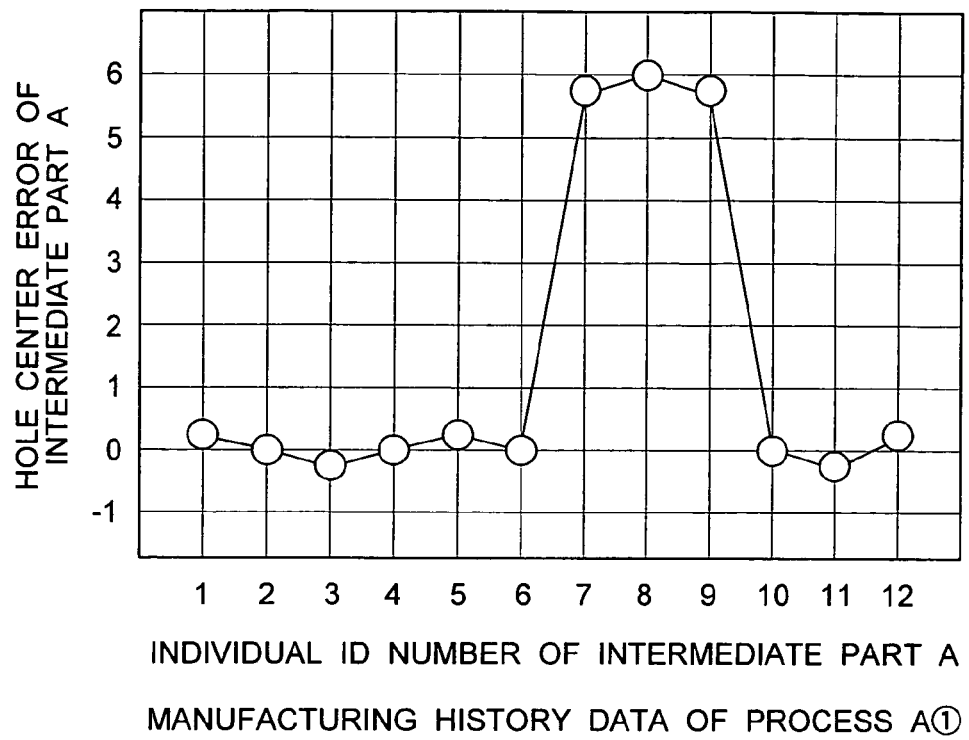
FIGS. 24A, 24B are diagrams showing the time-series manufacturing history of the processing steps of the part A.

FIG. 24A shows the manufacturing history data at the boring process A(1) 211 to produce the intermediate part A212 from the stock A210, i.e. the hole center error (212e in FIG. 20) from the contour center of the stock. The manufacturing history data of process A(1) 211 is changed at individual identification numbers 7, 8, 9 of the intermediate part A212.

Figure 24B:
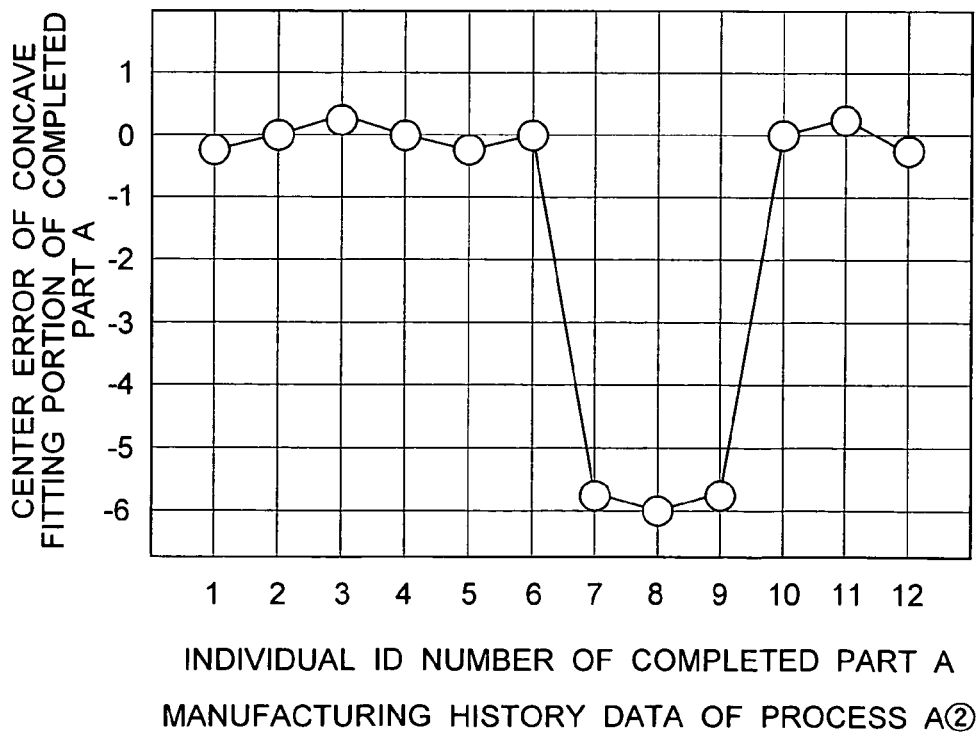

FIG. 24B shows the manufacturing history data of the concave fitting portion cutting process A(2) 213 to produce the complete part A214 from the intermediate part A212, i.e. the center error of the concave fitting portion (214e in FIG. 20) from the hole center. The manufacturing history data of process A(2) 213 is changed at the individual identification numbers 7, 8, 9 of the completed part A214.

Figure 25A:
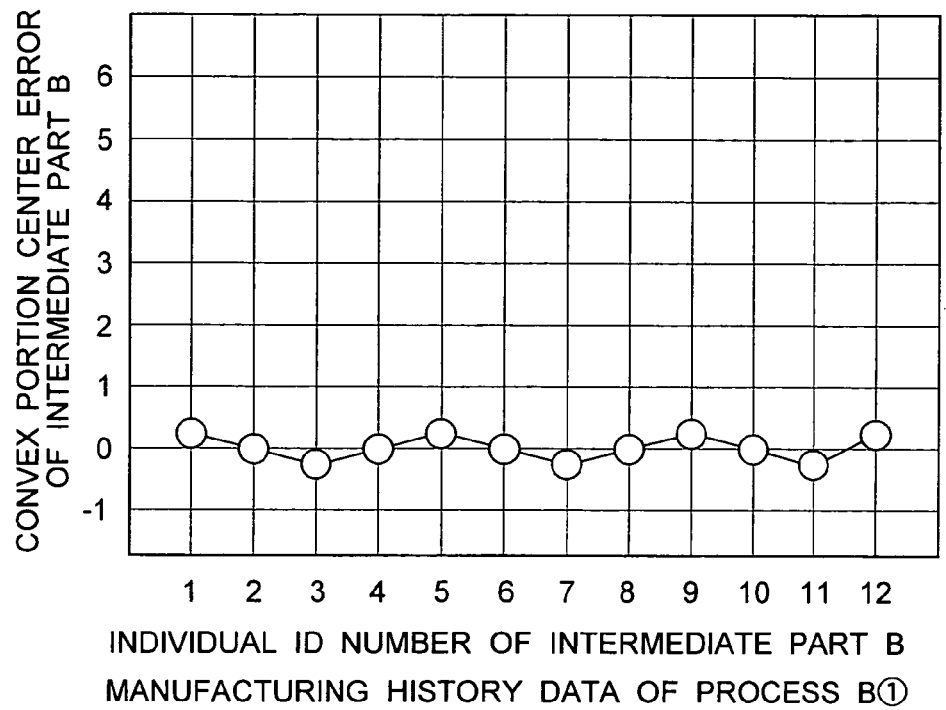
FIGS. 25A, 25B are diagrams showing the time-series manufacturing history of the processing steps of the part B.

FIG. 25A shows the manufacturing history data of the convex portion cutting process B(1) 221 to produce the intermediate part B222 from the stock B220, i.e. the convex portion center error (222e in FIGS. 22A, 22B) from the contour center of the stock. The manufacturing history data of process B(1) 221 is not significantly changed except that it is varied from one individual intermediate part B222 to another (identification numbers 1 to 12).

Figure 25B:
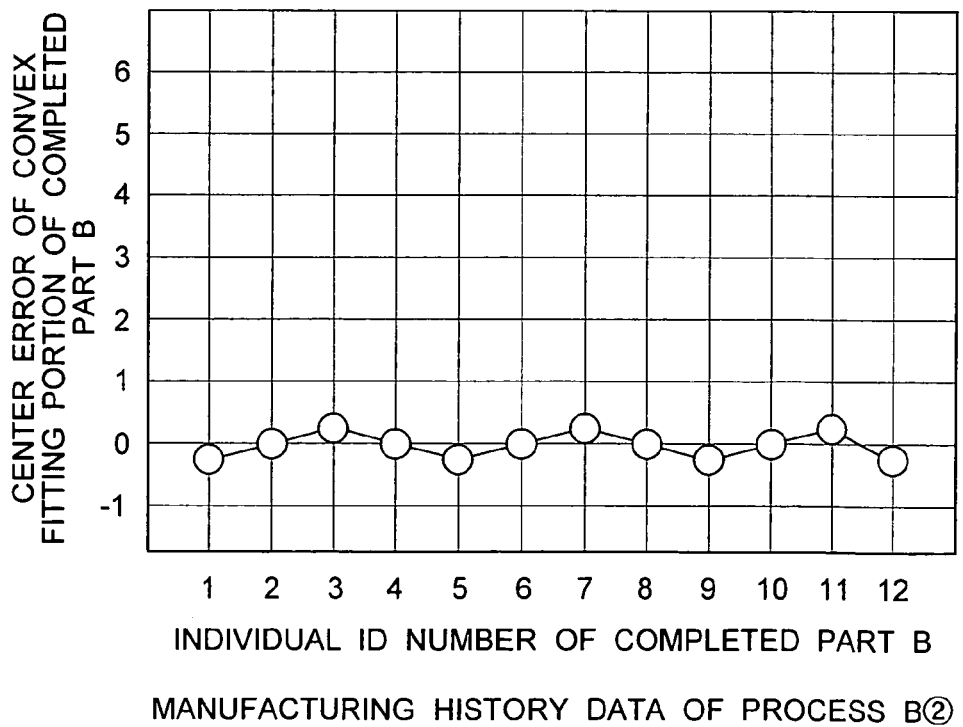

FIG. 25B shows the manufacturing history data of the convex fitting portion cutting process B(2) 223 to produce the completed part B224 from the intermediate part B222, i.e. the center error of the convex fitting portion (224e in FIG. 22) from the convex portion center. The manufacturing history data of process B(2) 223 is not significantly changed except that it is varied over the whole individual completed parts B224 (identification numbers 1 to 12).

Figure 26:
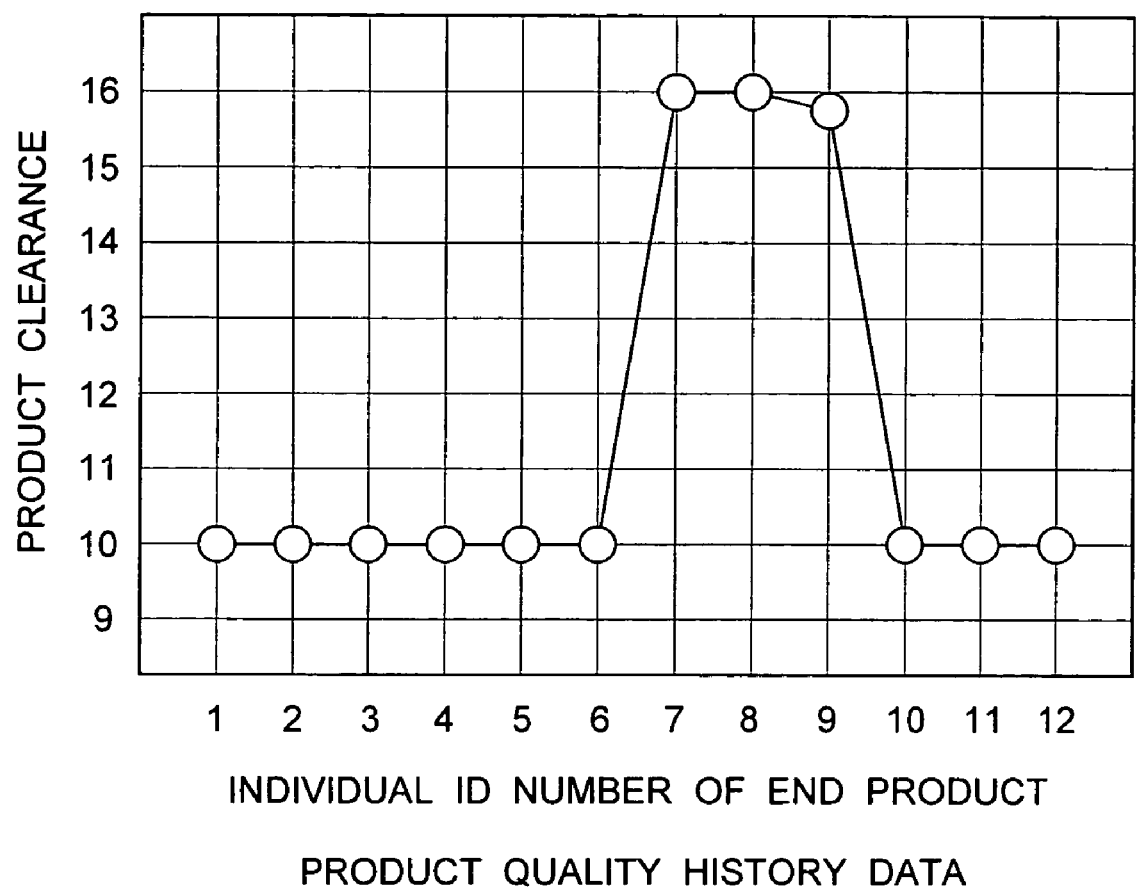
FIG. 26 is a diagram showing the time-series quality history of a product.

FIG. 26 is a diagram for explaining the temporal transition (or individual work transition) of the product quality history data collected at the assembly process C231 to produce the end product 232 by assembling the completed parts A214 and B224. The quality of the end product 232 is provided by the clearance portion (214s/224s in FIG. 18) described above. The product quality information of process C231 is changed at the individual identification numbers 7, 8, 9 of the end product 232.

Figure 27:
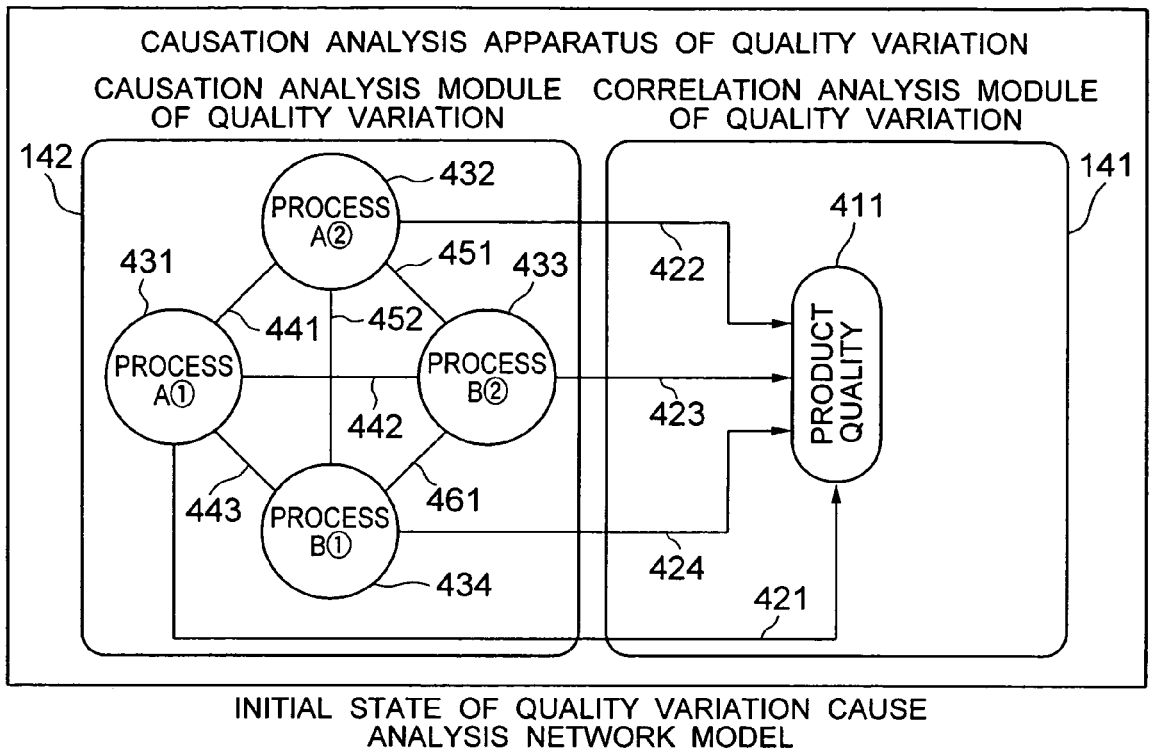
FIG. 27 is a diagram showing the initial state of the network model for analyzing the cause of quality variation.

FIGS. 27 to 30 are diagrams for explaining the result of the quality variation causation analysis conducted according to this embodiment of the invention. FIG. 27 is a diagram for explaining the initial state of the network model for quality variation causation analysis. To manufacture the intended products (232 in FIGS. 17, 18), the five processes (211, 213, 221, 223, 231 in FIG. 23) shown in the manufacturing BOM (200 in FIG. 23) are required. In view of the fact that the final assembly process (231 in FIG. 23) collects the product quality information, however, the manufacturing history data are collected for the four processes (211, 213, 221, 223 in FIG. 23), and the analysis network model according to this embodiment assumes the same form as that shown in FIG. 1 according to the first embodiment.

The vertexes 431, 432, 433, 434 indicating the four processes correspond to the boring process A(1) (211 in FIG. 23), the concave fitting portion cutting process A(2) (432 in FIG. 23), the convex portion cutting process B(1) (221 in FIG. 23) and the convex fitting portion cutting process B(2) (223 in FIG. 23), respectively. The edges 421, 422, 423, 424 directed from the vertexes 431, 432, 433, 434 indicating the four processes of the correlation network model toward the vertex 411 of the product quality information are accompanied by the arrows indicating the direction from the cause to the result in the product manufacture.

Any arrow indicating the direction from the cause to the result, which is not yet determined in the initial state, is attached to the edges 441, 442, 443, 451, 452, 461 connecting the vertexes 431, 432, 433, 434 indicating the four processes of the causal network model.

Figure 28:
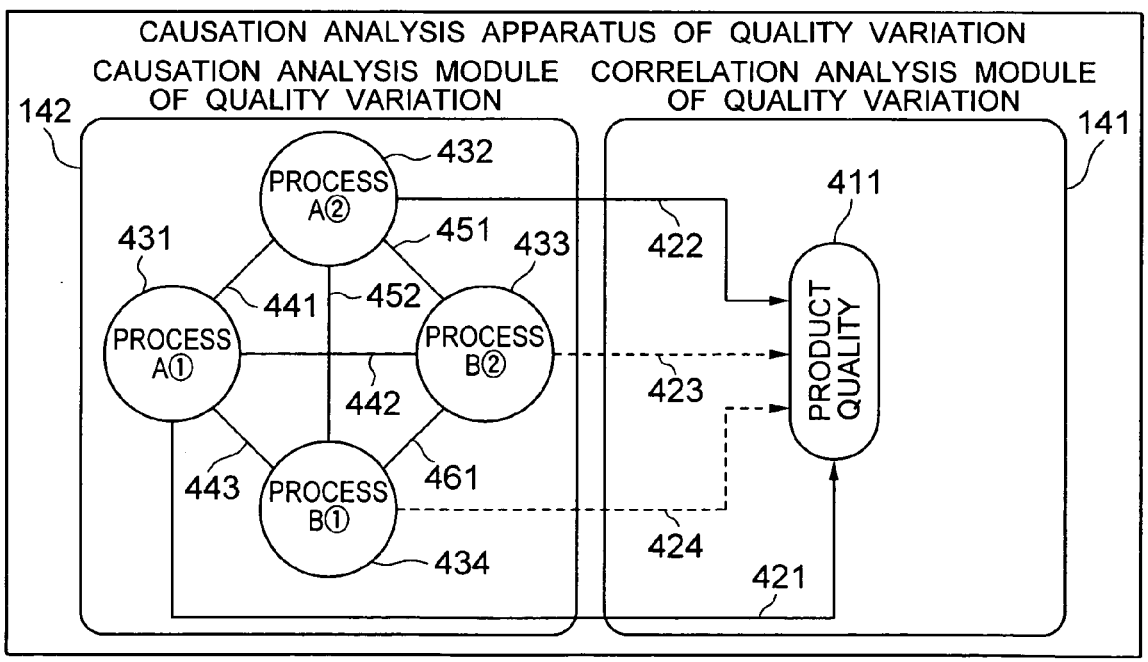
FIG. 28 is a diagram for explaining the generation of a causal network model for analyzing the causation connection of quality variation and the selection of candidates for the process causing the quality variation.

FIG. 28 is a diagram for explaining the state in which the correlation network model connecting the manufacturing processes and the vertexes of the product quality is completed by the correlation analysis module of quality variation 141 and the candidates for the processes causing the quality variation are extracted completely. The correlation analysis module of quality variation (141 in FIG. 1) making up the causation analysis apparatus of quality variation (140 in FIG. 1) determines by calculation that the correlation magnitude between the product quality history data (FIG. 26) and the manufacturing history data of process A(1) (FIG. 24A) is large, and selects the edge 421 connecting the vertex 431 of process A(1) and the product quality vertex 411 as a "○ (correlation)" (solid line in FIG. 28). Also, the correlation analysis module of quality variation determines by calculation that the correlation magnitude between the product quality history data (FIG. 26) and the manufacturing history data (FIG. 24B) of process A(2) is large, and selects the edge 422 connecting the vertex 432 of process A(2) and the product quality vertex 411 as a "○ (correlation)" (solid line in FIG. 28).

Conversely, the correlation analysis module of quality variation determines by calculation that the correlation magnitude between the product quality history data (FIG. 26) and the manufacturing history data of process B(1) (FIG. 25A) is small, and sets the edge 424 connecting the vertex 434 of process B(1) and the product quality vertex 411 in "X (no relation)" state (dashed line in FIG. 28). Also, the correlation analysis module of quality variation determines by calculation that the correlation magnitude between the product quality history data (FIG. 26) and the manufacturing history data of process B(2) (FIG. 25B) is also small, and sets the edge 432 connecting the vertex 433 of process B(2) and the product quality vertex 411 in "× (no relation)" state (dashed line in FIG. 28).

Figure 29:
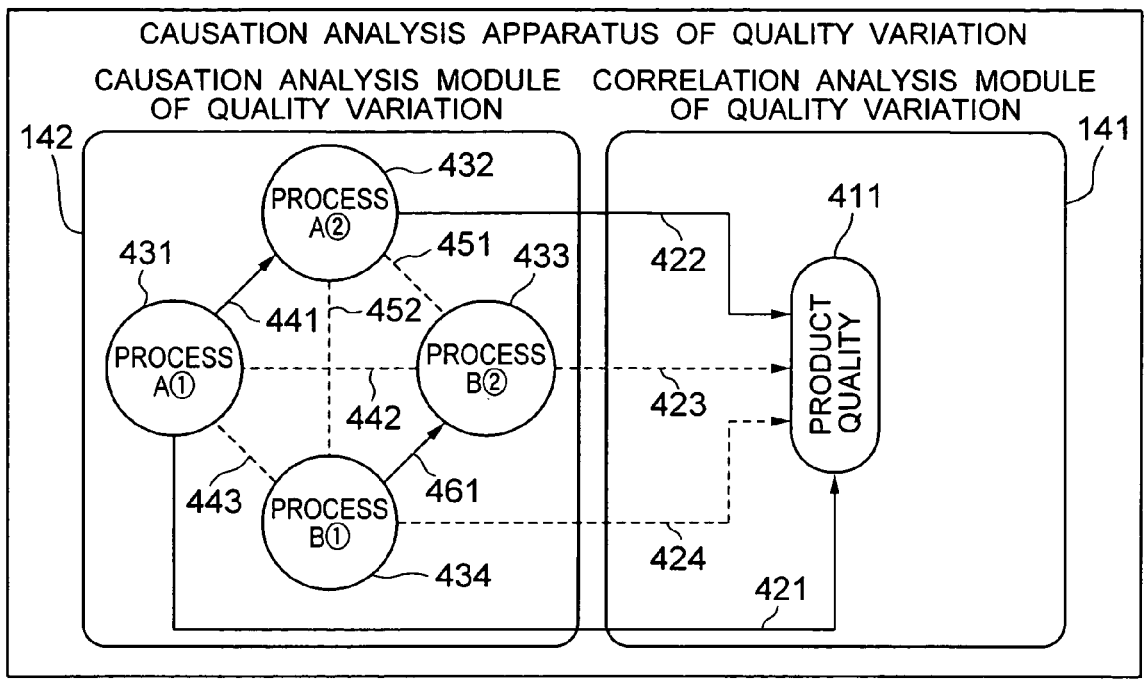
FIG. 29 is a diagram for explaining the generation of a causal network model for analyzing the causation connection of quality variation and the extraction of an inter-process mutual causation connection.

FIG. 29 is a diagram for explaining the state in which the causal network model connecting the manufacturing processes and the product quality vertexes is completed by the causation analysis module of quality variation 142 and the inter-process causation correlation is determined. The causation analysis module of quality variation (142 in FIG. 1) making up the causation analysis apparatus of quality variation (140 in FIG. 1) determines by calculation that the correlation magnitude between the manufacturing history data (FIG. 24A) of process A(1) and the manufacturing history data (FIG. 24B of process A(2) is large, and selects the edge 441 connecting the vertex 431 of process A(1) and the vertex 432 of process A(2) is as "○ (correlation)" state (solid line in FIG. 29). The causation analysis module of quality variation also determines by calculation that the correlation magnitudes between other processes are small and set the edges 442, 443, 451, 452, 461 in "X (no relation)" state (dashed line in FIG. 29).

As of this stage, the causation arrow is not yet determined, and therefore the causation analysis module of quality variation 142 acquires the manufacturing BOM (FIG. 23) as manufacturing sequence information and attaches a causation arrow. The priority of process A(1) (211 in FIG. 23) over process A(2) (213 in FIG. 23) is translated from the manufacturing BOM, and an arrow indicating the direction from the vertex 431 of process A(1) toward the vertex 432 of process A(2) is attached to the edge 441.

Also, the priority of process B(1) (221 in FIG. 23) over process B(2) (223 in FIG. 23) is translated from the manufacturing BOM, and an arrow indicating the direction from the vertex 434 of process B(1) toward the vertex 433 of process B(2) is attached to the edge 461. With regard to the other edges, the absence of the time priority restriction between the processes of the manufacturing BOM (FIG. 23) is translated, and no causation arrow is attached.

Figure 30:
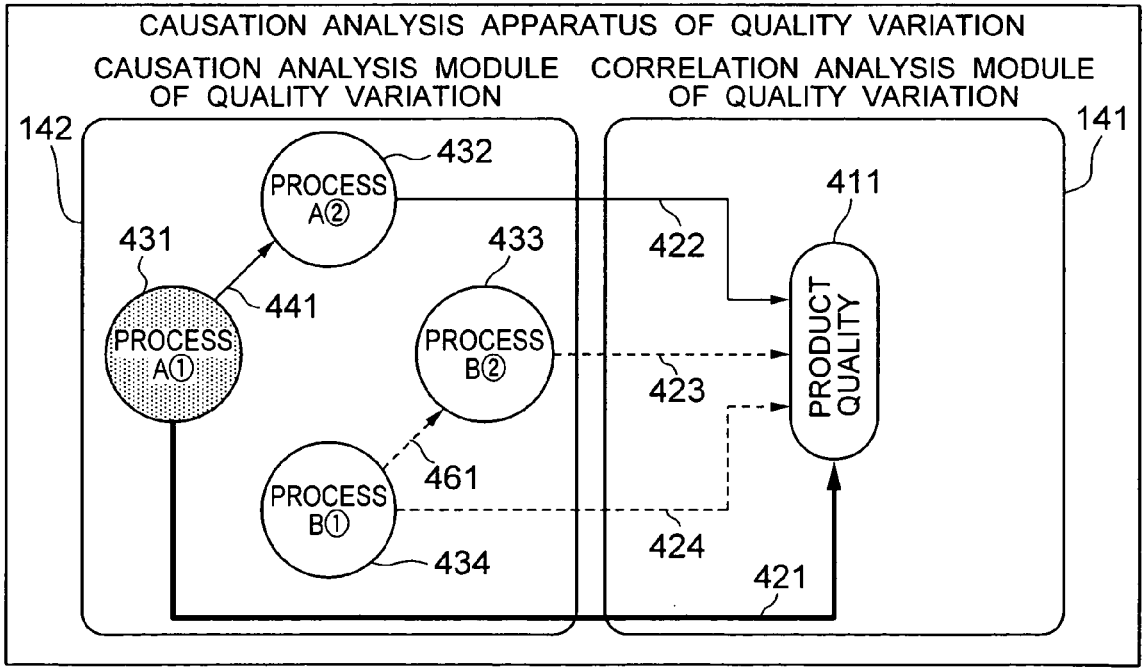
FIG. 30 is a diagram for explaining the extraction of the process causing the quality variation.

FIG. 30 is a diagram for explaining the determination of the quality variation causing process from the causal network model by the causation analysis module of quality variation 142. The edges are traced back from the product quality to determine the final vertex. Two routes are available to trace back. First, the edge 421 is traced back to reach process A(1) of the vertex 431. This route cannot be traced back any further, and therefore the vertex 431 is the final one.

By tracing back the edge 422, on the other hand, process A(2) of the vertex 432 is reached. Further, process A(1) of vertex 431 is reached by tracing back the edge 441. This route cannot be traced back any further, and therefore the vertex 431 provides the final vertex.

In this way, the causation analysis module of quality variation 142 determines process A(1) of the vertex 431 as a final vertex shared by the two routes. Specifically, it is determined that the fundamental cause of variation of the product clearance (214s/224s in FIG. 18) is the variation in the hole center error (212e in FIG. 20) at the boring process A(1), and the variation in the hole center error (212e in FIG. 20) has propagated resulting in the variation in the center error of the concave fitting potion (214e in FIG. 20).

Embodiment 3

A product quality control system according to a third embodiment of the invention is explained with reference to FIGS. 31 to 39. The third embodiment represents a case in which the manufacturing equipment causing the product quality variation is extracted automatically from a plurality of manufacturing equipments using only the input result information to each equipment.

Figure 31:
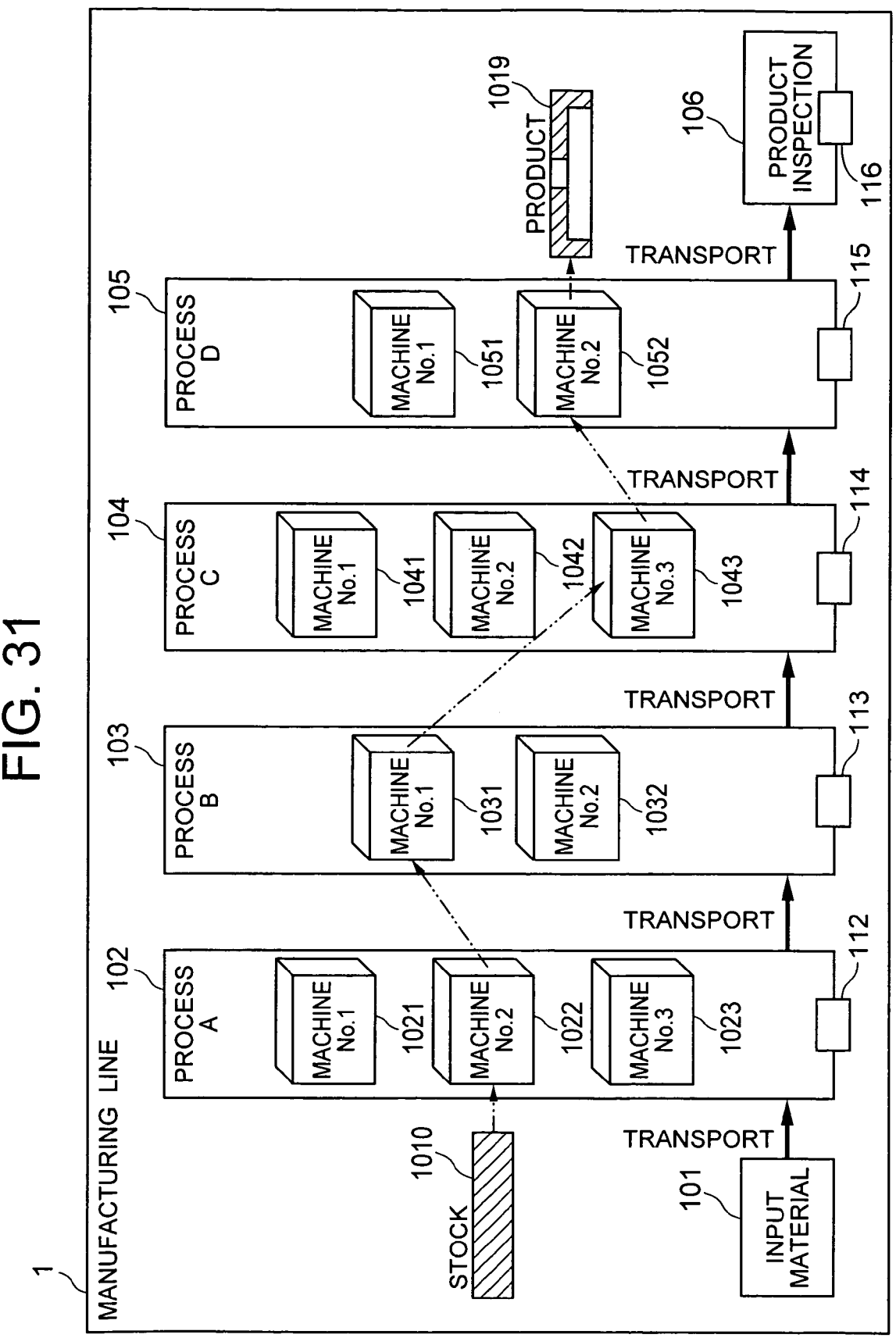
FIG. 31 is a diagram showing the machine numbers of a plurality of manufacturing equipments included in the manufacturing process.
Figure 32:
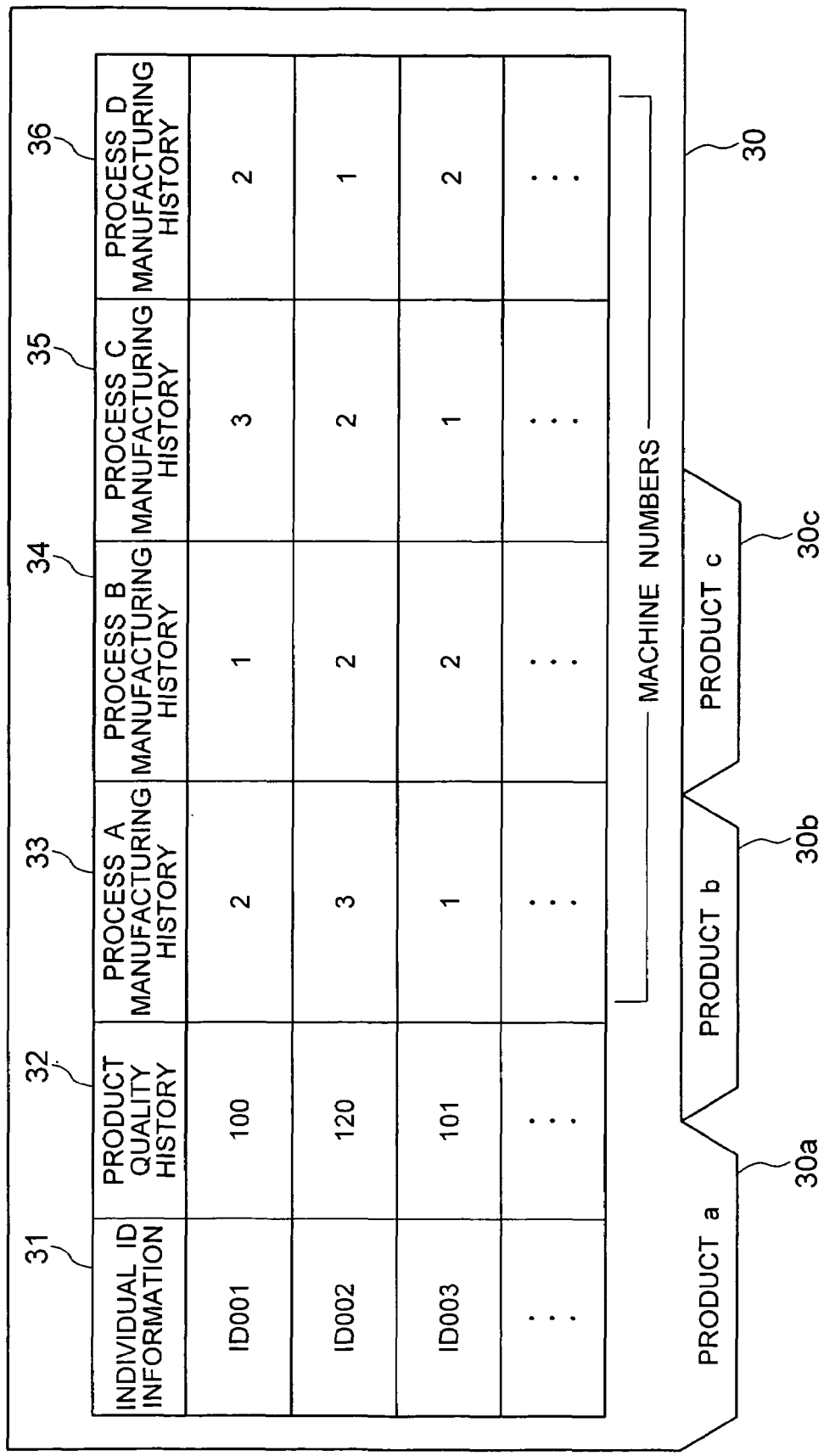
FIG. 32 is a diagram showing a comparison table for collating the product quality history with the machine numbers of the manufacturing equipment.
Figure 33:
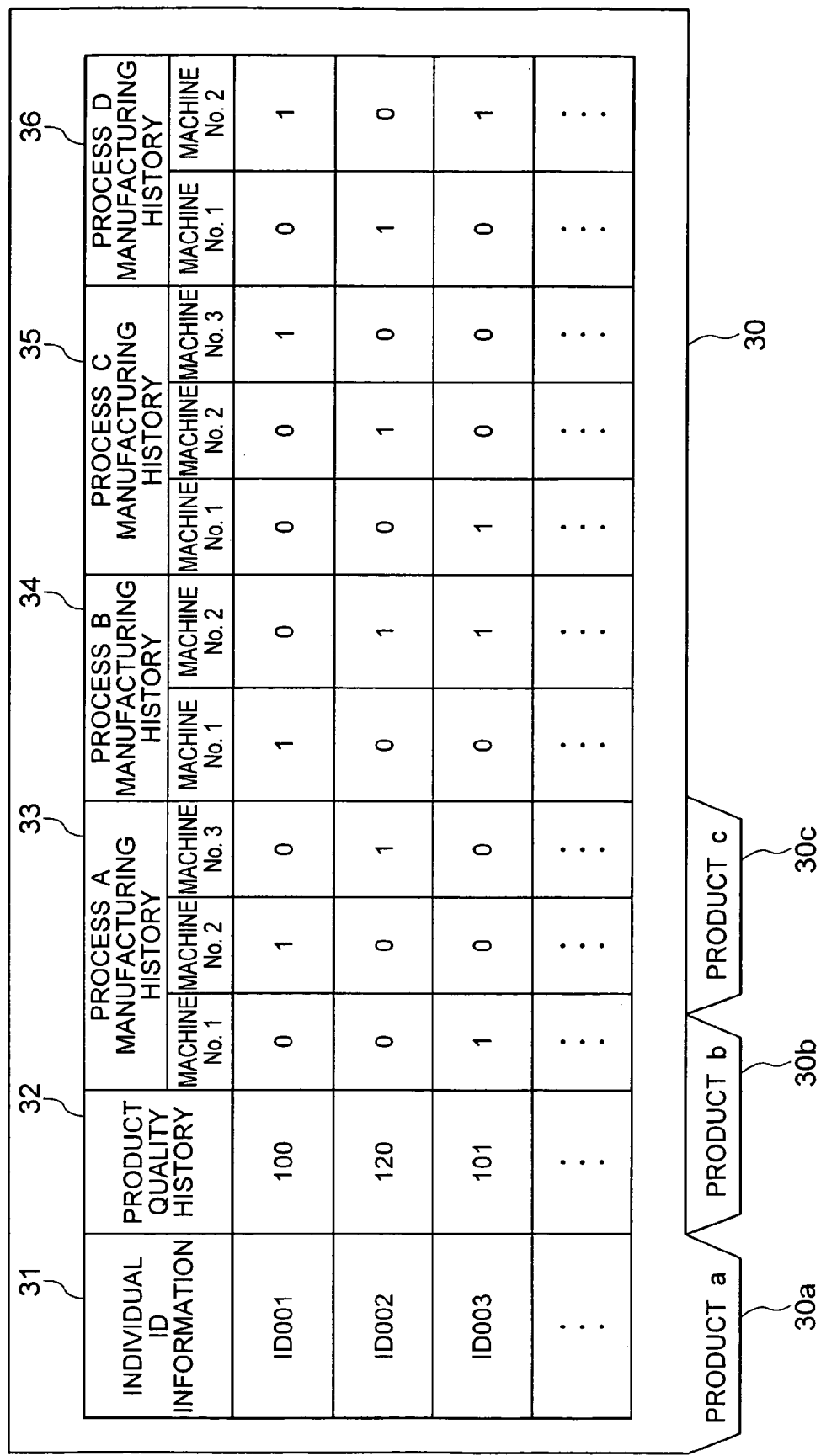
FIG. 33 is a diagram showing a comparison table for collating the product quality history with the manufacturing execution equipment route information as manufacturing history.

FIG. 31 is a diagram showing the route of the manufacturing equipments used in each manufacturing process for a given product. FIG. 32 is a comparison table of the product quality history and the manufacturing equipment route information configured of the equipment identification numbers of the manufacturing equipments through which the individual material, part, product in progress or the product is passed. FIG. 33 is a comparison table of the manufacturing history data and the product quality history generated by conversion to permit calculation of the correlation magnitude or mutual correlation magnitude from the manufacturing execution equipment route information.

In manufacturing an industrial product, an arbitrary one of a plurality of equipments may be used in a given process. The plurality of equipments are not necessarily of the same type and may be different types of equipment capable of carrying out the same process. In the case where different types of equipment usable coexist in one process, the manufacturing history data of the same specification may not be collected. In such a case, the type of the variate of the manufacturing history data varies from one individual to another, and therefore the correlation magnitude for analysis of the cause of quality variation cannot be calculated. Also, an equipment from which the manufacturing history data cannot be collected may exist.

In such a case, the cause of quality variation can be analyzed by identifying the manufacturing equipment causing the quality variation using the equipment number information of the manufacturing equipment. For this purpose, first, as shown in FIG. 31, a unique machine number is assigned to each of a plurality of equipments used in each process. Of all the selectable equipments used in process A102, for example, machine No. 1 is assigned 1021, machine No. 2 1022, machine No. 3 1023, and so forth. A similar machine number is also assigned to each equipment in other processes.

Assume that a given stock 1010 is passed through machine No. 2 1022 at process A102, machine No. 1 1031 at process B103, machine No. 2 1042 at process C104 and machine No. 2 1052 at process D105 into a product 1019. Also assume that the individual identification number of the product 1019 is ID001. The manufacturing history data including the manufacturing execution equipment route information and the product quality history as a comparison record for the individual identification number ID001 is shown on the first data line in FIG. 32. In the table of FIG. 32, the digits of the equipment numbers included in the manufacturing equipment route information 33, 34, 35, 36 making up the manufacturing history data are not numerical values but names. To make possible the calculation of the correlation magnitude between the manufacturing history data and the product quality history data 32 or the mutual correlation magnitude between the manufacturing history data themselves, therefore, these information are converted to a binary map as shown in the manufacturing history data 33, 34, 35, 36 in FIG. 33.

In the manufacturing history data 33, 34, 35, 36 shown in FIG. 33, a column is created for the equipment of each machine number in each process, and "1" is set in the cell of the equipment through which the individual on each data line is passed, while "0" is noted in the cell of the equipment through which no individual is passed. The manufacturing history data 33, 34, 35, 36 in FIG. 33 is expressed in a binary digit, and therefore the correlation magnitude between the manufacturing history data and the product quality history data 32 or the mutual correlation magnitude between the manufacturing history data themselves can be calculated using the projection method.

As described above, the aforementioned operation of the correlation analysis module of quality variation and the causation analysis module of quality variation making up the causation analysis apparatus of quality variation makes it possible to determine the equipment causing the quality variation.

Figure 34:
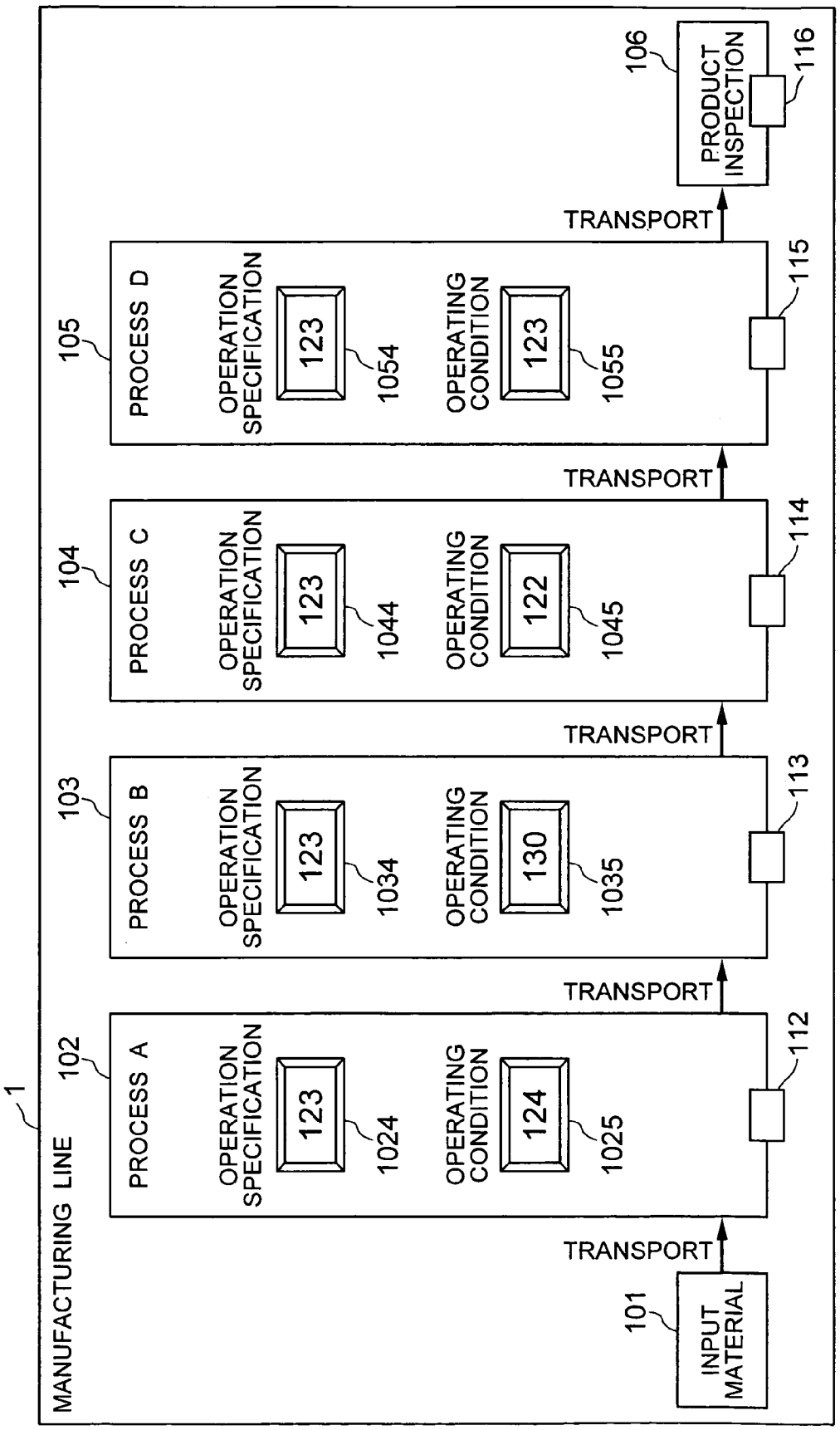
FIG. 34 is a diagram showing the operation specification and the operating condition of the manufacturing equipment.
Figure 35:
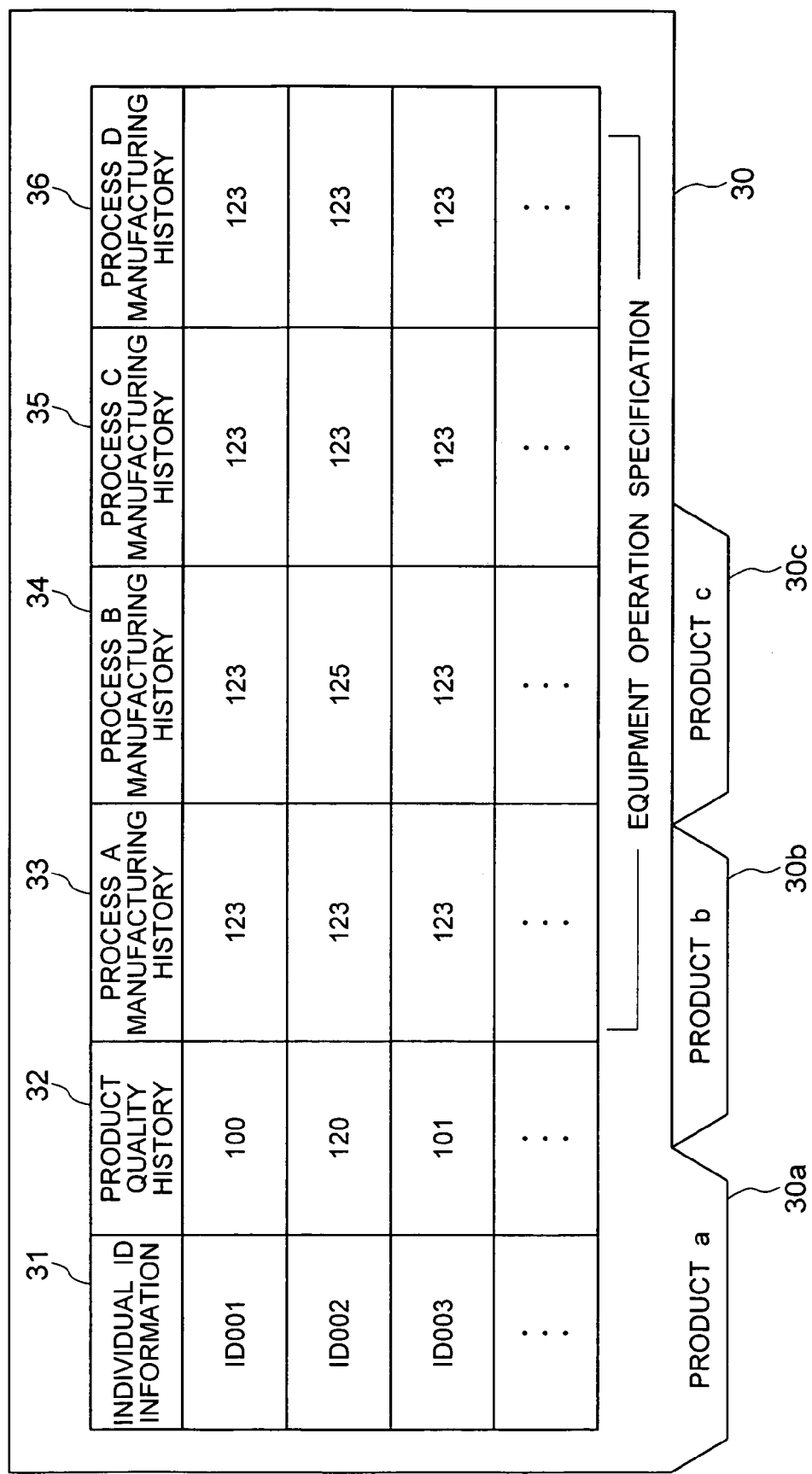
FIG. 35 is a diagram showing a comparison table for collating the product quality history with the operation specification of the manufacturing equipment.
Figure 36:
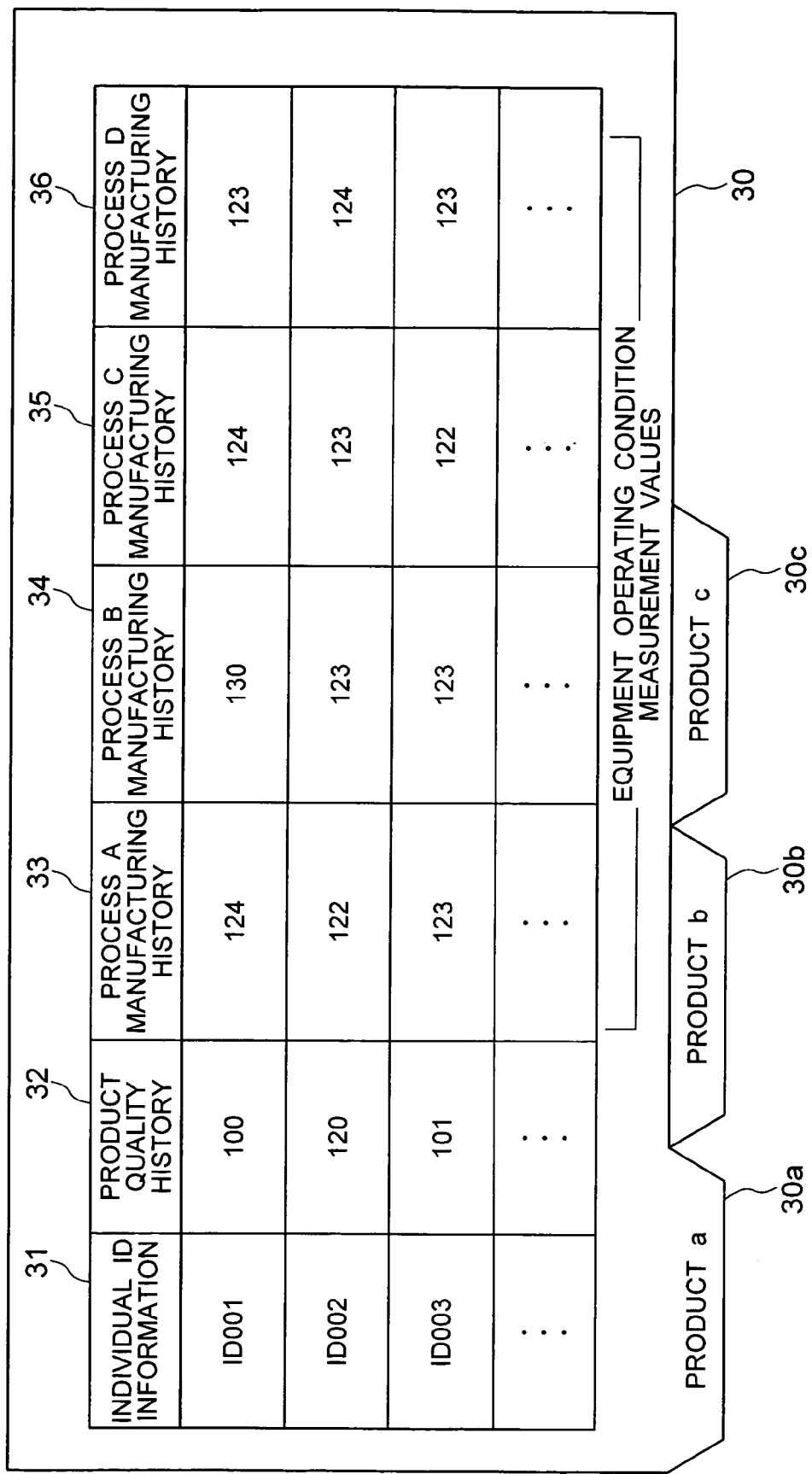
FIG. 36 is a diagram showing a comparison table for collating the product quality history with the operation specification of the manufacturing equipment.

Also, as shown in FIG. 34, with a configuration in which the operation specification designated for the manufacturing equipment of each process or the actual operating condition of the manufacturing equipment is used as the manufacturing history data, the cause of quality variation hidden in the manufacturing history data can be identified using the product quality control system according to the invention. As long as the manufacturing equipment continues to run without variation as designated in the operation specification, a comparison table between the operation specification as the manufacturing history data and the product quality shown in FIG. 35 is prepared. Then, the operation specification causing the quality variation can be identified by the analysis operation of the causation analysis apparatus of quality variation.

Figure 40:
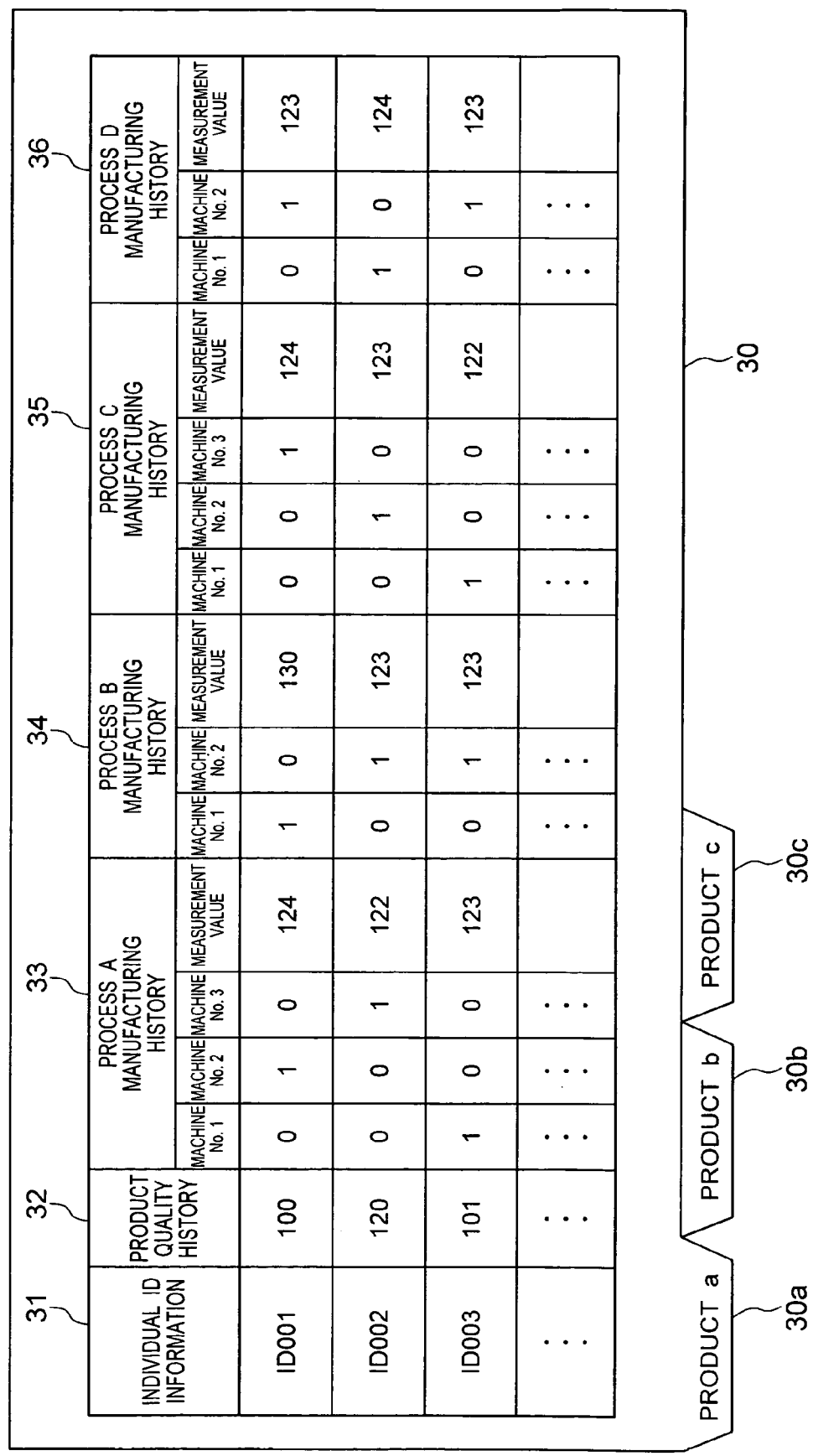
FIG. 40 is a diagram showing a comparison table for collating the product quality history with a combination of the manufacturing equipment route information and the operating condition of the manufacturing equipment as manufacturing history.

Further, as shown in the comparison table of FIG. 40, the operating condition measurement values are combined with the binary map of the manufacturing execution equipment route information in the manufacturing history data 33, 34, 35, 36 for each process. Then, the operating condition of the equipment for the process causing the quality variation including the equipment status difference apparent in the operating condition measurement values can be identified.

Figure 37:
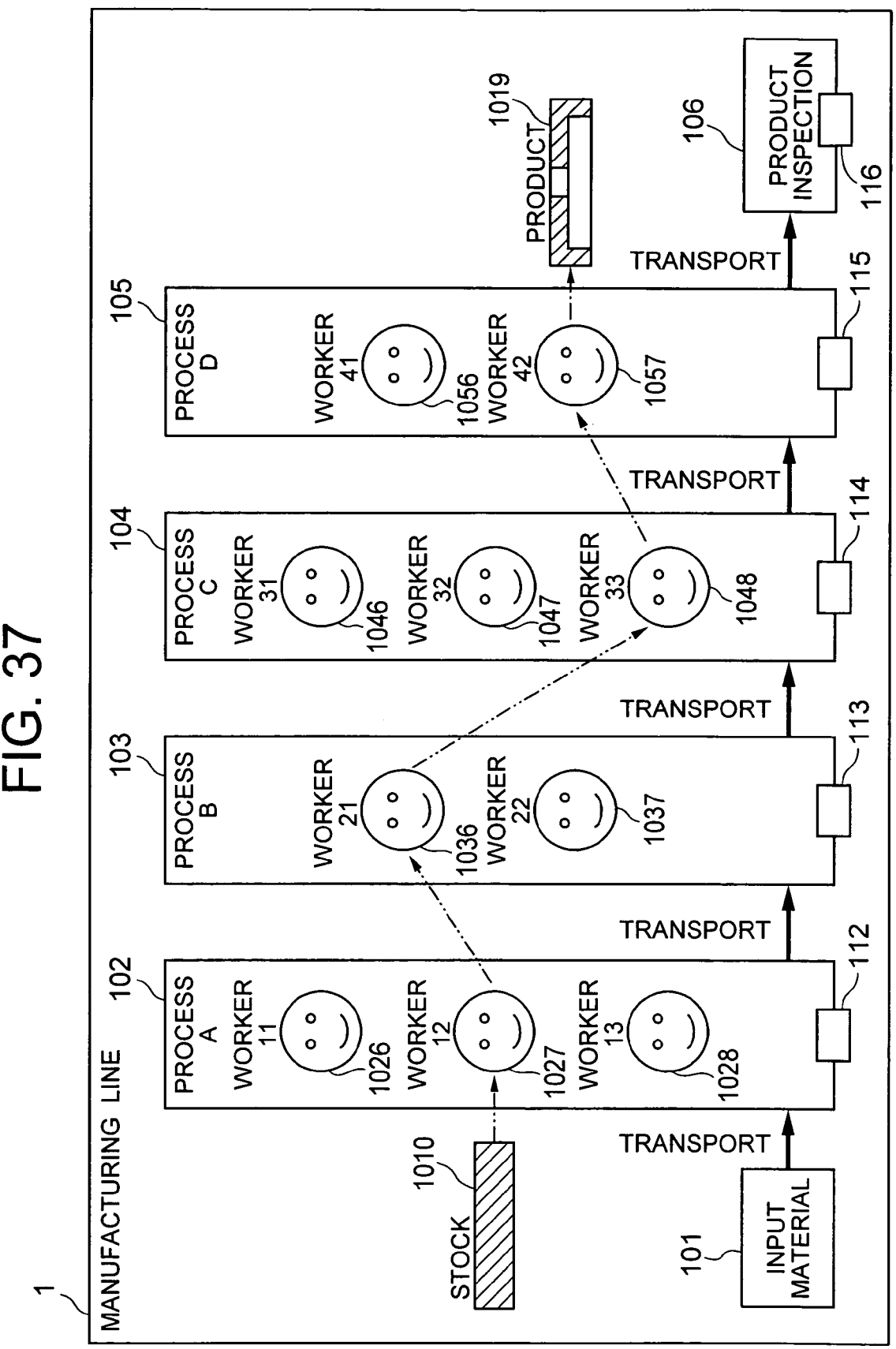
FIG. 37 is a diagram showing a plurality of workers in charge of the manufacturing processes.
Figure 38:
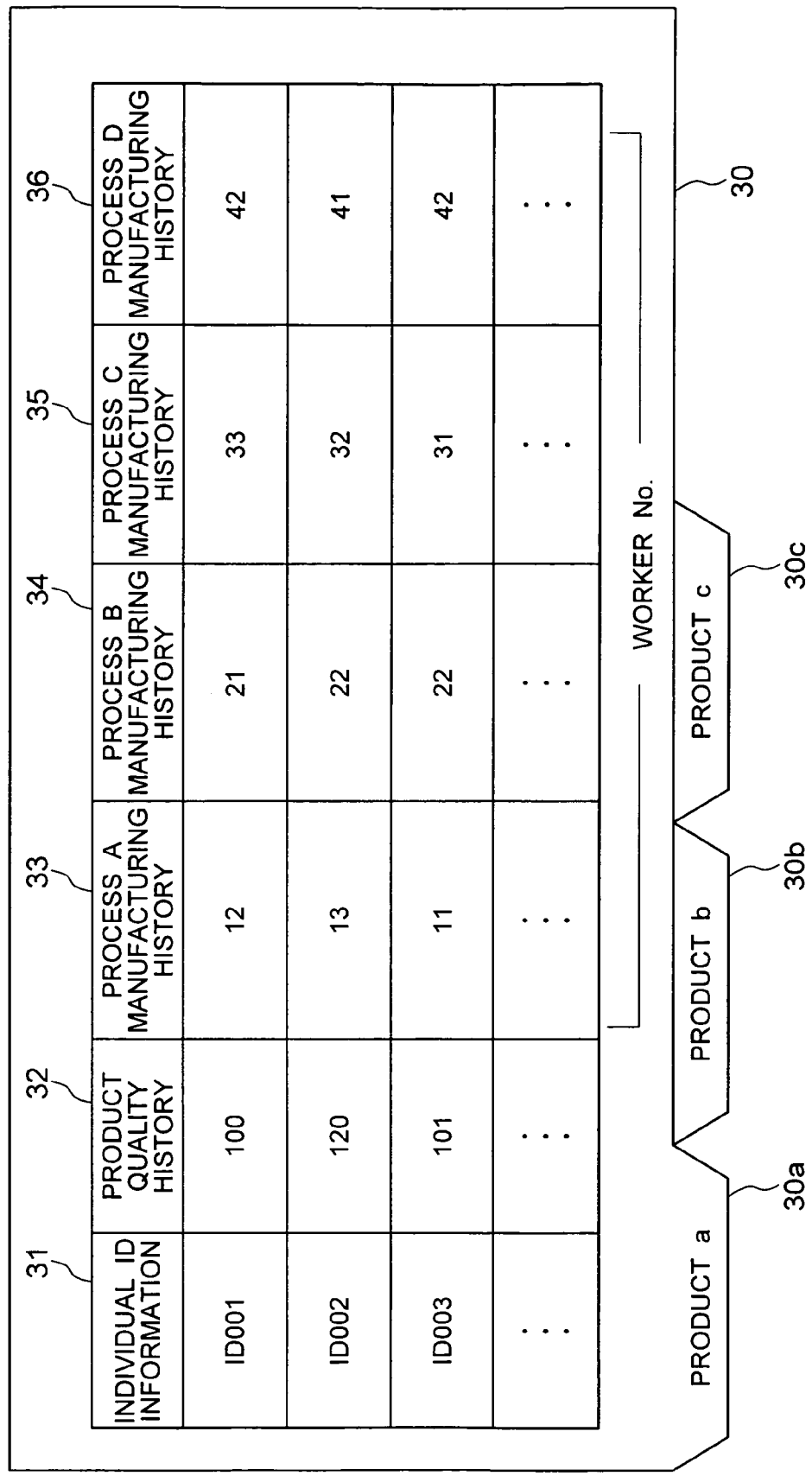
FIG. 38 is a diagram showing a comparison table for collating the product quality history with the workers.

Also, the identification number of the manufacturing equipment in each process shown in FIG. 31 is replaced with the identification number of the worker in charge of the particular process as shown in FIG. 37. Further, the comparison table of the product quality history and the manufacturing execution equipment route information configured of the equipment identification number of FIG. 32 or 33 is replaced with a comparison table of the product quality history and the worker route information configured of the worker identification number shown in FIG. 38 or 39. Then, the aforementioned operation of the correlation analysis module of quality variation and the causation analysis module of quality variation making up the causation analysis apparatus of quality variation according to the invention makes it possible to trace the cause of the product quality variation which may occur in accordance with the worker skill.

Embodiment 4

Figure 41:
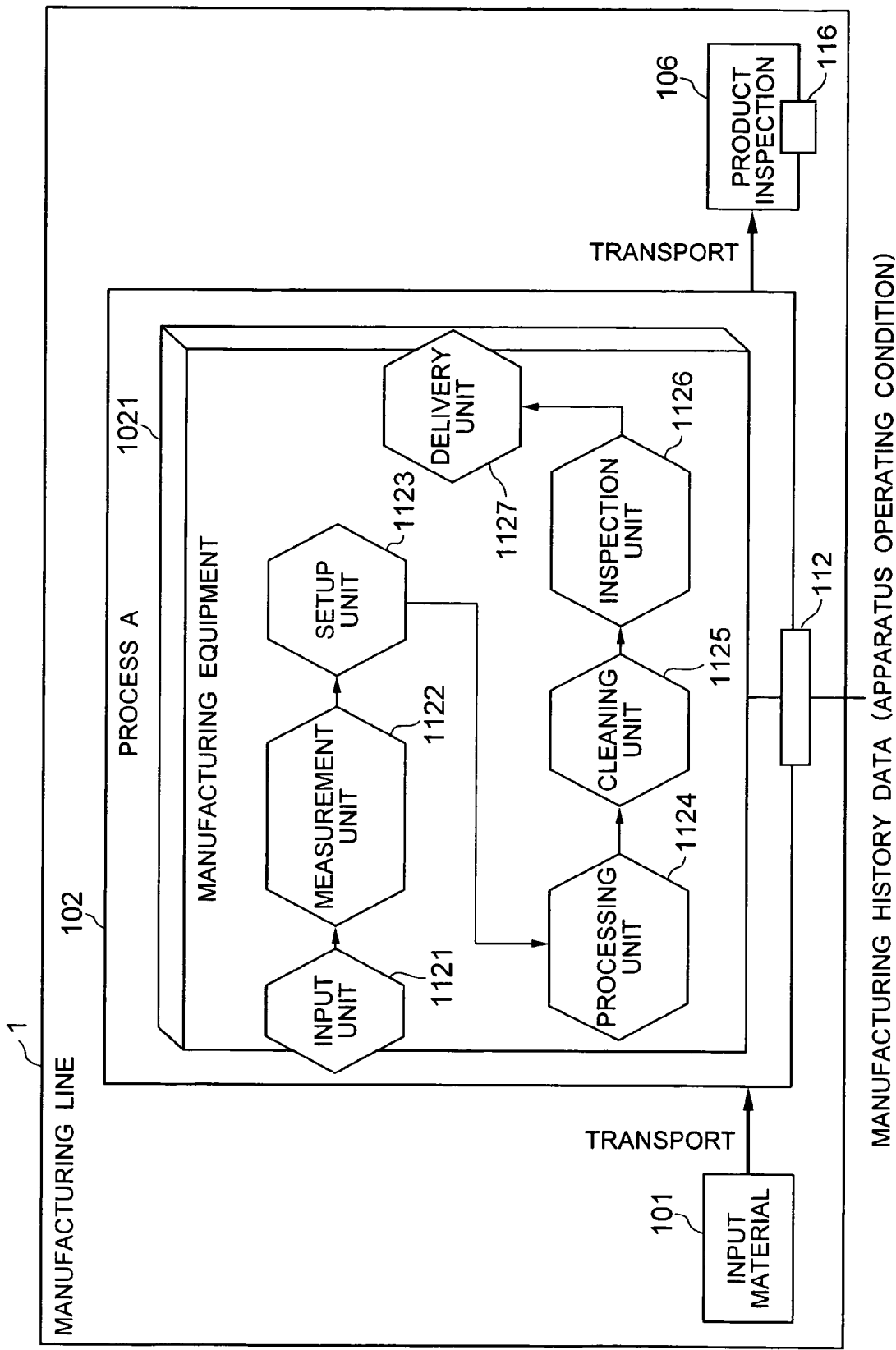
FIG. 41 is a diagram showing the element units in the manufacturing equipment.

Next, an embodiment in which an element unit causing the product quality variation is identified from two or more element units in the manufacturing equipment is explained as a fourth embodiment shown in FIG. 41. FIG. 41 is a diagram for explaining the process to identify the element unit causing the product quality variation from two or more element units in the manufacturing equipment.

In FIG. 41, a product is manufactured from a material using a single manufacturing equipment 1021 at a single process A102. Therefore, the cause of a product quality variation, if any, lies within the manufacturing equipment 1021. The manufacturing equipment 1021 has seven element units. In this embodiment, they specifically include an input unit 1125, a measurement unit 1126, a setup unit 1123, a processing unit 1124, a cleaning unit 1125, an inspection unit 1126 and a delivery unit 1127. The accurate position and posture of the material (not shown) input into the equipment by the input unit 1121 are measured by the measurement unit 1122 and controlled by the setup unit 1123. The material is then processed by the processing unit 1124, cleaned by the cleaning unit 1125, inspected by the inspection unit 1126 and delivered out of the equipment by the delivery unit 1127.

The order in which the element units of the manufacturing equipment are operated is stored beforehand in the manufacturing sequence information management apparatus of the product quality control system according to this embodiment. The physical quantity measurement values indicating the operating condition of each element unit are collected as the manufacturing history data, so that an element unit in the manufacturing equipment causing the product quality variation can be identified.

The operation of the correlation analysis module of quality variation and the causation analysis module of quality variation making up the causation analysis apparatus of quality variation is described above. Specifically, the statistical correlation magnitude between the time-series quality history data acquired from the quality history data collection apparatus and the time-series physical quantity measurement values of the operating condition of the element units of the manufacturing equipment acquired from the manufacturing history data collection apparatus are calculated by collation in the correlation analysis module of quality variation using the accompanying individual identification information. Based on the statistical correlation magnitude thus obtained, at least one candidate for the element unit in the manufacturing equipment causing the quality variation is automatically listed.

The statistical correlation magnitude between the physical measurement values of the operating condition of at least two element units of the manufacturing equipment is calculated by collation in the causation analysis module of quality variation using the accompanying individual identification information. Based on the statistical correlation magnitude thus obtained and the order in which the element units of the manufacturing equipment operate, as acquired from the manufacturing sequence information management apparatus, a connecting structure model between the element units of the manufacturing equipment is acquired and the element unit of the manufacturing equipment providing the fundamental cause of the product quality variation is determined from the candidates described above.

Although FIG. 41 shows a case in which the element units of the manufacturing equipment 102 are defined by the order in which the input material passes through them, the element units may alternatively be defined by the order in which the processing energy is generated, and regulated to process the material.

Embodiment 5

Next, a fifth embodiment is explained in which elements making up a part or product supply chain instead of the manufacturing processes are analyzed to trace the cause of quality variation hidden in the component elements of the supply chain.

Figure 42:
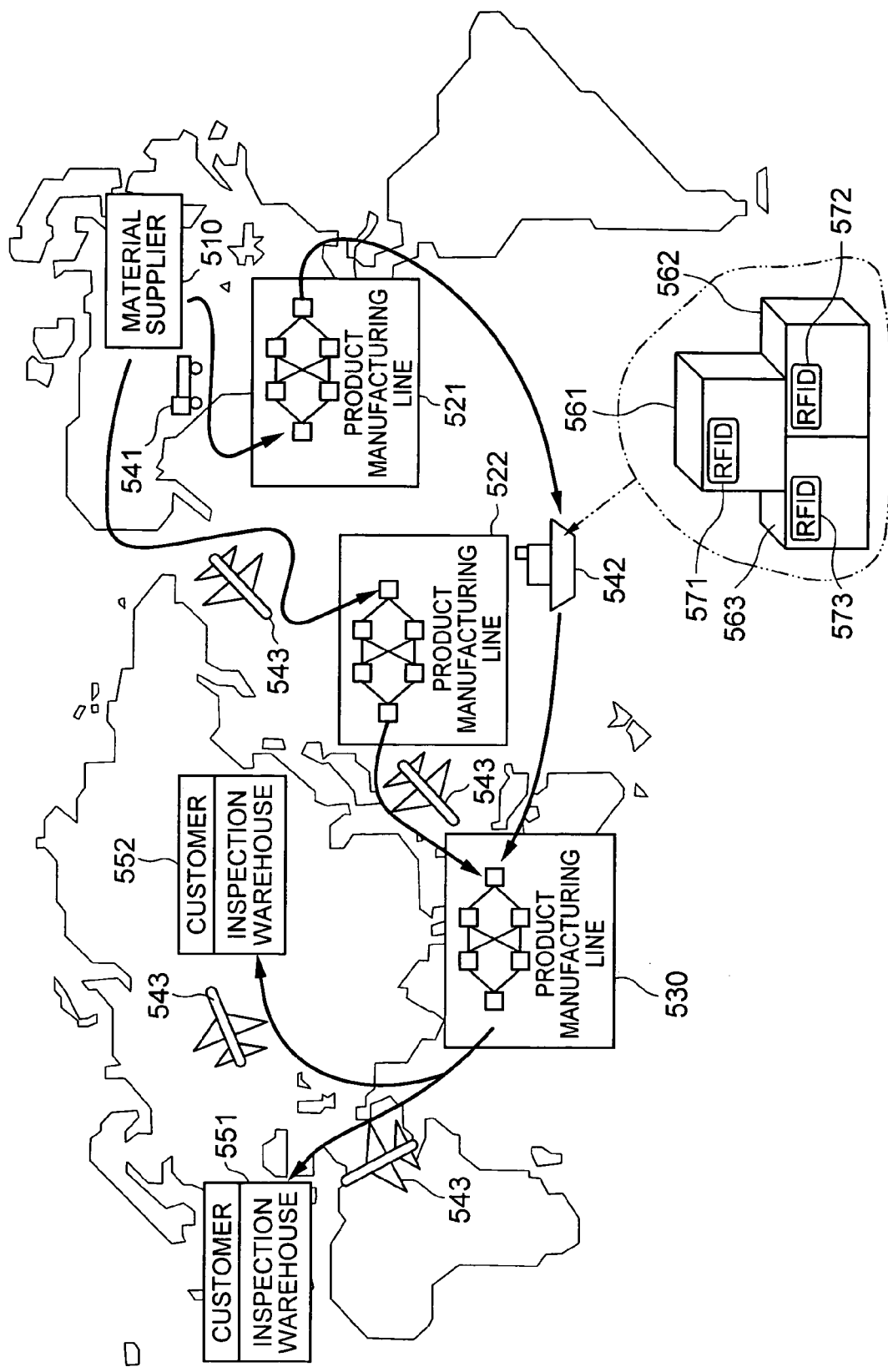
FIG. 42 is a diagram showing the component elements of the supply chain.

FIGS. 42, 43 are diagrams for explaining the process of tracing the cause of quality variation hidden in the component elements of the supply chain using the product quality control system according to the invention.

According to this embodiment in which the elements making up the part or product supply chain instead of the manufacturing processes are analyzed, the supply chain component elements through which each individual material, part, product in progress and the product passes is assigned an identification number. As manufacturing history data, the supply chain route information configured of the identification numbers assigned is used. The order in which the supply chain component elements are passed through is stored in advance in the manufacturing sequence information management apparatus.

The processes of tracing the cause of quality variation hidden in the supply chain component elements using the product quality control system according to this embodiment are explained below.

The supply chain component elements specifically include the manufacturing factory or the manufacturing line for processing and assembling the materials, parts or products in progress, or transportation means or route for transporting the materials, parts or products in progress.

In FIG. 42, the parts (not shown) are produced through two production routes. In the first route, a material (not shown) is supplied to a parts manufacturing line 521 by a vehicle 541 as a transportation means from a material supplier 510, and the parts thus produced (not shown) are supplied to the product manufacturing line 1 by a vessel 542 as a transportation means. In the second route, the material (not shown) is supplied from the material supplier 510 to a parts manufacturing line 522 by an airplane 543 as a transportation means, and the parts thus produced (not shown) are supplied to the parts manufacturing line 1 by the airplane 543 as a transportation means.

A product (not shown) is supplied also through any one of two routes. In the first route, the product (not shown) is supplied to an inspection warehouse 51 by the airplane 543 as a transportation means from the product manufacturing line 1. In the second route, the product (not shown) is supplied to the inspection warehouse 52 by the airplane 543 as a transportation means from the product manufacturing line 1.

FIG. 43 is a table showing the comparison between the supply chain route information as manufacturing history data and the product quality history data. The supply chain component elements include the maker identification number and the transportation means identification number. Each identification number is not a numerical value but nominal information, and therefore, the supply chain route information is converted into binary numerical information by a similar method to the conversion of the manufacturing execution equipment route information as shown in FIGS. 32, 33 (not shown).

In the process, the correlation analysis module of quality variation (5-1) making up the causation analysis apparatus of quality variation (5) calculates by collation, using the accompanying individual identification information, the correlation magnitude between the time-series quality history data acquired from the quality history data collection apparatus and the time-series supply chain route information acquired from the manufacturing history data collection apparatus. Based on the statistical correlation magnitude thus acquired, at least one candidate for the supply chain component element causing the quality variation is automatically listed. The causation analysis module of quality variation (5-2), on the other hand, calculates by collation, using the accompanying individual identification information, the statistical correlation magnitude between the supply chain route information for each of at least two supply chain component elements.

Based on the statistical correlation magnitude thus obtained and the order in which the supply chain component elements are passed through, as obtained from the manufacturing sequence information management apparatus, a connecting structure model between the component elements of the supply chain is acquired, and the supply chain component element providing the fundamental cause of product quality variation is determined and automatically extracted from the candidates.

In the process, an RF ID tag (571, 572, 573 in FIG. 51) having a sensor built therein is attached to the individual materials, parts, the products in progress and the products (561, 562, 563 in FIG. 51). Thus, the environmental information such as the temperature, humidity, atmosphere or the vibration of or the time elapsed by the supply chain component elements are collected as manufacturing history data.

Then, the environmental variation of the supply chain component element causing the product quality variation can be determined and automatically extracted.

Embodiment 6

Finally, an embodiment in which the product quality variation described above is analyzed and extracted in stages from high to low ranks is explained as a sixth embodiment.

Figure 44:
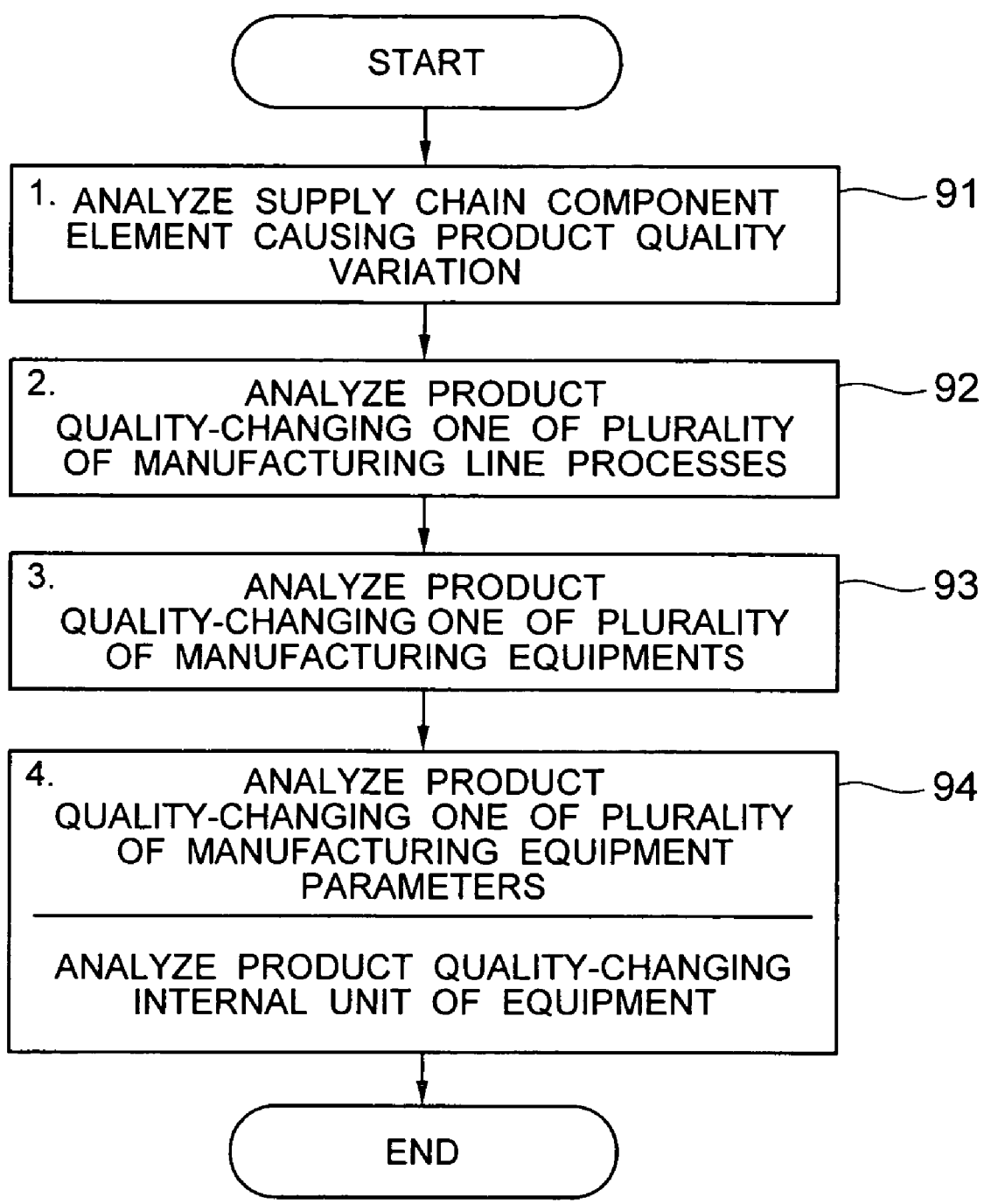
FIG. 44 is a diagram for explaining the steps of internal top-down analysis of the system from the supply chain to the system interior.

FIG. 44 is a diagram showing the processes of analyzing and extracting the cause of product quality variation in stages from high to low ranks as described above.

First, a variation-causing component element of the supply chain is analyzed and extracted. Next, in the case where a given manufacturing line constituting a component element of the supply chain causes the variation, the process causing the variation is analyzed and extracted from a plurality of processes of the particular manufacturing line. Next, one of a plurality of manufacturing equipments causing the quality variation in the particular process is analyzed and extracted. Then, only for the equipment causing the quality variation, the parameter causing the quality variation is analyzed and extracted from a plurality of parameters of the particular manufacturing equipment, or one of internal units of the equipment causing the variation is analyzed and extracted from the equipment.

In this way, the cause of product quality variation is analyzed in multiple stages, and thus the range of data to be studied in one analysis session can be reduced, thereby making possible highly accurate analysis.

While we have shown and described several embodiments in accordance with our invention, it should be understood that disclosed embodiments are susceptible of variations and modifications without departing from the scope of the invention. Therefore, we do not intend to be bound by the details shown and described herein but intend to cover all such variations and modifications a fall within the ambit of the appended claims.

The inverntion claimed is:

1. A product quality control method for controlling the quality of a product manufactured through a plurality of manufacturing processes and including means for collecting manufacturing history data and quality inspection means for inspecting a quality of an end product in a production line, the method comprising the steps of:
   (a) collecting quality inspection information for the end product and manufacturing history data for each manufacturing process performed on the product, and calculating a statistical correlation magnitude between the quality inspection information and the manufacturing history data;
   (b) generating a correlation network model having edges connecting the quality inspection process and all of the manufacturing processes to each other, wherein a graph coupling strength for each edge is represented by the calculated correlation magnitude;
   (c) leaving the edges connecting product quality variation and candidates of processes causing the product quality variation in the correlation network model by using said correlation magnitude, and deleting other edges from the correlation network model;
   (d) calculating mutual correlation magnitudes between the manufacturing history data of two different manufacturing processes in every manufacturing process;
   (e) adding edges having graph coupling strengths corresponding to the calculated mutual correlation magnitudes to said mutual correlation network model to generate a causal network model;
   (f) leaving the edges connecting manufacturing processes having inter-process variation propagation in the causal network model in the form of an undirected graph, and deleting other edges from the causal network model, based on the graph coupling strength;
   (g) converting the undirected graph to a directed graph in the causal network model obtained at the step (f) based on manufacturing sequence information management apparatus which has been previously provided; and
   (h) extracting a process causing the product quality variation on the end product by tracing the directed graph of the causal network model from information regarding product quality of said end product, and
   displaying information corresponding to the extracted process on an output device.

2. A product quality control method according to claim 1, wherein the manufacturing history data concerns the processing and assembling in a manufacturing process, and includes selected one of the quality measurement values and the inspection values of selected one of a part and a product in progress processed in the manufacturing process.

3. A product quality control method according to claim 1, wherein the manufacturing process has at least one manufacturing equipment for executing a manufacturing process, each manufacturing equipment corresponds to a unique machine number, and the manufacturing history data concerns the processing and assembling in the manufacturing process and includes the manufacturing execution equipment route information based on the machine number of the manufacturing equipment through which selected one of the part, the product in progress and the product is passed in each of the manufacturing processes.

4. A product quality control method according to claim 1, wherein the manufacturing history data concerns the processing and assembling in a manufacturing process, and includes a designated set value of the operation specification of the manufacturing equipment used in the manufacturing process.

5. A product quality control method according to claim 1, wherein the manufacturing history data concerns the processing and assembling in a manufacturing process, and includes the physical quantity measurement values of the operating condition of the manufacturing equipment used in the manufacturing process.

6. A product quality control method according to claim 1, wherein the manufacturing history data concerns the processing and assembling in a manufacturing process, and includes a combination of selected one of the designated set value of the operating condition and the physical quantity measurement value of the operating condition of the manufacturing equipment used in the manufacturing process on the one hand and the manufacturing equipment route information based on the machine number of the manufacturing equipment through which selected one of the material, the part, the product in progress and the product is passed in the manufacturing process on the other hand.

7. A product quality control method according to claim 1, wherein the manufacturing history data concerns the processing and assembling in a manufacturing process, and a manufacturing worker identification number for identifying the worker in charge of the processing or assembling in the manufacturing process is determined in advance, and wherein the manufacturing history data includes the manufacturing worker route information based on the manufacturing worker identification number of the worker who has processed selected one of the material, the part, the product in progress and the product in the manufacturing process.

8. A product quality control method according to claim 1, wherein said manufacturing history data is physical quantity measurement values of operating conditions of at least two units of manufacturing which constitute manufacturing equipment used for the manufacturing process, the manufacturing sequence information is previously stored in said manufacturing sequence information management apparatus, and then the unit of manufacturing which causes product quality variation is extracted.

9. A product quality control method according to claim 1, wherein said manufacturing process includes a process in a manufacturing factory, a transportation means for transporting the product, or a transportation route for the product which constitutes a product supply chain, said manufacturing history data is a supply chain route information consisting of identification numbers previously assigned to the units of the supply chain through which the product is passed, and passage sequence information of the units of the supply chain is stored beforehand in the manufacturing sequence information management apparatus, and then the process which causes product quality variation is extracted.

10. A product quality control method according to claim 9, wherein the manufacturing history includes the environmental information of the supply chain component elements collected by a measuring unit attached to selected one of the material, the part, the product in progress and the product, and wherein the causation analysis apparatus of quality variation includes:

a correlation analysis module of quality variation for calculating by collation the statistical correlation magnitude between the quality history data and the environmental information of the supply chain component elements using the individual identification information, and automatically extracting the candidates for the supply chain component elements causing the quality variation based on the statistical correlation magnitude, and a causation analysis module of quality variation for calculating by collation the statistical correlation magnitude between the component elements of the supply chain using the individual identification information and acquiring the connecting structure information between the supply chain component elements based on the statistical correlation magnitude and the order in which the supply chain component elements are passed through, thereby automatically extracting the supply chain component element causing the product quality variation from the candidates.

* * * * *